(12) United States Patent
Ohta

(10) Patent No.: US 7,157,665 B2
(45) Date of Patent: Jan. 2, 2007

(54) HEAT DEVELOPMENT APPARATUS AND METHOD

(75) Inventor: Yasunori Ohta, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 235 days.

(21) Appl. No.: 10/930,747

(22) Filed: Sep. 1, 2004

(65) Prior Publication Data

US 2005/0064348 A1    Mar. 24, 2005

(30) Foreign Application Priority Data

Sep. 3, 2003   (JP) ............... P.2003-311546
Jul. 2, 2004   (JP) ............... P.2004-196850

(51) Int. Cl.
  *G03D 9/00*    (2006.01)
  *G03D 13/00*   (2006.01)
  *G03C 5/16*    (2006.01)

(52) U.S. Cl. ............... 219/216; 219/469; 399/279; 396/575; 480/350; 480/354

(58) Field of Classification Search ............... 399/279, 399/386; 396/575
  See application file for complete search history.

(56) References Cited

U.S. PATENT DOCUMENTS 3,621,201 A * 11/1971 Crane et al. ............... 219/388
4,435,633 A *  3/1984 Stryjewski ............... 219/216
5,572,285 A    11/1996 Takagi
6,007,971 A * 12/1999 Star et al. ............... 430/350
6,114,660 A *  9/2000 Donaldson et al. ......... 219/216
6,265,693 B1   7/2001 Okada
6,288,370 B1*  9/2001 Ogawa et al. ............... 219/469
6,297,476 B1* 10/2001 Kashino et al. ............... 219/216
2002/0135661 A1 9/2002 Torisawa

FOREIGN PATENT DOCUMENTS

GB         958963 A      5/1964
JP       63226656 A  *  9/1988
JP      2000-98576 A     4/2000

OTHER PUBLICATIONS

European Search Report dated Jan. 11, 2005.

* cited by examiner

*Primary Examiner*—Joseph Pelham
(74) *Attorney, Agent, or Firm*—Sughrue Mion, PLLC

(57) ABSTRACT

A heat development apparatus for heat developing a heat-developable recording material from one surface side by a heating unit, while transporting the heat-developable recording material by a transportation unit, the apparatus comprising: a transportation path from a beginning end to a terminal end of a heating region in which the heat developing is made by the heating unit, the transportation path being formed in an annular path having a substantially equal length with a transportation length of the heat-developable recording material, so that the beginning end and the terminal end of the heating region are arranged in proximity with each other.

15 Claims, 6 Drawing Sheets

HEAT DEVELOPMENT APPARATUS AND METHOD

FIELD OF THE INVENTION

The present invention relates to a heat development apparatus and method for performing a heat development processing on a recording layer of a sheet-like heat-developable recording material. More particularly, it relates to an improvement for implementing the reduction in size of the apparatus and implementing the heat development of a heat-developable recording material having recording layers on its opposite sides at a low cost.

BACKGROUND OF THE INVENTION

As an image recording apparatus for recording a medical image, such as a digital radiographic system, CT, or MR, a wet system in which an image is photographed or recorded on a silver salt photographic light-sensitive material, and then wet processed to obtain a reproduced image, has been conventionally used. In contrast, in recent years, a recording apparatus by a dry system using a photothermographic material (heat development recording apparatus) has attracted attention.

FIG. 6 shows a conventional example of this kind of a heat development recording apparatus.

The heat development recording apparatus 100 includes: a recoding material supply unit A accommodating sheet-like heat-developable recording materials 21; an image exposure unit B for performing an exposure processing based on image data on the heat-developable recording material 21 supplied from the recording material supply unit A; a heat development unit C for performing a heat development processing by a prescribed heating on the heat-developable recording material 21 which has gone through the exposure processing at the image exposure unit B; a cooling unit D for cooling and discharging the heat-developable recording material 21 which has gone through the heat development processing; a power source/control unit E for supplying a power to the respective units and controlling the operations of the respective units; and a transportation unit for feeding the heat-developable recording material 21 at the recording material supply unit A to the cooling unit D via the image exposure unit B and the heat development unit C sequentially (e.g., see, JP-A-2000-98576).

The heat-developable recording material 21 is prepared by providing a recording layer having light sensitivity and heat sensitivity on one side of a base film. Specifically, a photothermographic material or a light-sensitive heat-sensitive recording material is used according to the features of the recording layer.

The recording layer of the photothermographic material is a recording material which records an image thereon as a latent image by exposure with a light beam (e.g., a laser beam), and is then allowed to develop its color by heat development.

On the other hand, the recording layer of the light-sensitive heat-sensitive recording material records an image as a latent image thereon by exposure with a light beam, and then is heat developed and is allowed to develop its color, or records an image thereon by a heat mode (heat) of a laser beam, and simultaneously therewith, is allowed to develop its color, followed by image fixing thereon through light exposure.

In the recording material supply unit A of the example shown, recording paper accommodating cases (magazines) 15a, 15b, and 15c are disposed vertically at three stages. The respective recording paper accommodating cases 15a, 15b, and 15c are each capable of accommodating a large number (e.g., 150 sheets) of the sheet-like heat-developable recording materials 21 in stacked form. Then, feed roller pairs 13a, 13b, and 13c for feeding out and transporting the heat developable recording materials 21 in the cases, one by one, are provided at the outlet side of the respective recording paper accommodating cases 15a, 15b, and 15c, respectively.

The heat-developable recording materials 21 fed out from the respective recording paper accommodating cases 15a, 15b, and 15c by the feed roller pairs 13a, 13b, and 13c, respectively are fed to the image exposure unit B by a transportation unit 22 provided on the top end thereof.

The image exposure unit B includes: a transportation unit 27 having driving rollers 31 and 33 and a guide plate 35, and transporting the heat-developable recording materials 21 supplied from the recording material supply unit A at a prescribed speed; and a beam emission means 29 for performing scanning by a light beam (laser beam) 28 in a direction or thogonal to the transportation direction on the heat-developable recording materials 21 transported by the transportation unit 27. The scanning direction by the beam emission means 29 is set as a main scanning direction, and the transportation direction of the transportation unit 27 is set as a sub-scanning direction. Thus, the image exposure unit B performs main/sub-scanning by the light beam 28 on the recording layer of the heat-developable recording material 21 based on the recording image data supplied from an image information source such as CT or MR, thereby performing an exposure processing in accordance with an image to be recorded, and recording a latent image on the recording layer of the heat-developable recording material 21.

The heat development unit C is configured to include: a transportation unit 36 for transporting the heat-developable recording material 21 subjected to the exposure processing at the image exposure unit B through an arc-like path; and a heating unit 37 provided along the transportation path by the transportation unit 36, for performing a prescribed heat processing on the recording layer of the heat-developable recording material 21 being transported by the transportation unit 36.

The transportation unit 36 transports the heat-developable recording material 21 through the arc-like path by a plurality of presser rollers 41 driven in rotation following a gear 43, and a supply roller pair 39 disposed closer to the image exposure unit B.

The heating unit 37 is configured to include a plurality of plate heaters 37a, 37b, and 37c arranged along the arc-like transportation path of the transportation unit 36. The heat-developable recording material 21 is transported with the recording layer facing the side of the plate heaters 37a, 37b, and 37c.

The foregoing heating unit 37 increases the temperature of the recording layer of the heat-developable recording material 21 to a prescribed heat development temperature (e.g., 120° C.), thereby to develop/fix the latent image recorded on the heat-developable recording material 21 as a visible image with a prescribed concentration.

The cooling unit D is mounted partway along a discharge-side transportation route 50 extending horizontally from the terminal end of the heat development unit C, and cools the heat-developable recording material 21 after the development processing supplied via a delivery roller 45 by heat dissipation during transportation by means of an appropriate number of cooling roller pairs 47 to an appropriate temperature such as ordinary temperature.

The cooled heat-developable recording material 21 is discharged to a discharge tray 17 via an inducing path by a guide plate 49 and a transportation roller pair 51.

SUMMARY OF THE INVENTION

However, for a heat development unit C of a conventional heat development recording apparatus 100, the transportation route formed in an arc is set within the region roughly about one-half the circumference along which presser rollers 41 are arranged due to the restriction on the layout for arranging an image exposure unit B, and the like. This forces about the half of the circumference to cover the length necessary and sufficient for the heating processing of a heat-developable recording material 21. This has eventually required the measure of enlarging the diameter of the pitch circle along which the presser roller 41 are arranged in order to perform a satisfactory heating processing.

For this reason, a transportation unit 36 for supporting a plurality of the presser rollers 41 on a prescribed pitch circle increases in size, causing an increase in size of the apparatus.

Further, a discharge-side transportation route 50 horizontally extending from the terminal end of the heating region in the heat development unit C also requires another occupying space separately from the heat development unit C. This causes an increase in size of the apparatus.

Whereas, in recent years, there is a demand for immediately performing a heat development processing of, and seeing the recorded image photographed using a heat-developable recording material having recording layers on opposite sides of the base film, without carrying out a wet development processing in the medical site.

However, a conventional heat development recording apparatus is based on the use of a heat-developable recording material having a recording layer on its one side. The heat development unit C adopted therein is equipped with a heating unit 37 only on the one side of the heat-developable recording material transported.

For this reason, when the heat-developable recording material having recording layers formed on its opposite sides is used, the recording layer on one side can be heated to a prescribed heat development temperature, but the recording layer on the other side cannot be subjected to a sufficient heat development processing due to the insufficient heating.

Under such circumstances, a measure has been proposed that the conventional apparatus is additionally equipped with another heating unit for heating the other side of the heat-developable recording material. However, such a measure unfavorably has incurred an increase in manufacturing cost due to an increase in size of the apparatus and an increase in power source capacitance with the addition of the heating unit.

The invention has been completed for the purpose of solving the foregoing problem. It is an object of the invention to provide a heat development apparatus and method capable of achieving the reduction in size of the apparatus, and further, implementing the heat development of a heat-developable recording material having recording layers on its opposite sides at a low cost.

The aforesaid object is achieved by the following constitution:

(1) A heat development apparatus for heat developing a sheet-like heat-developable recording material from one surface side by a heating unit, while transporting the heat-developable recording material by a transportation unit, the apparatus which comprises:

a transportation path from the beginning end to the terminal end of a heating region by the heating unit, the transportation path being formed in an annular path having a substantially equal length with the transportation length of the heat-developable recording material, so that the beginning end and the terminal end of the heating region are arranged in proximity with each other.

(2) The heat development apparatus as in (1), which further comprises, at the terminal end of the heating region by the heating unit, an inversion processing mechanism for inverting the heat-developable recording material transported by the transportation unit, and returning it to the beginning end of the heating region; and a transportation route switching unit for selectively switching the route of the heat-developable recording material transported by the transportation unit to the inversion processing mechanism side or the discharge-side transportation route.

(3) The heat development apparatus as in (1) or (2), wherein the discharge-side transportation route connected to the terminal end of the heating region is equipped with a cooling unit communicating therewith through outside the beginning end of the heating region, and longitudinally mounted in the rear of the annular transportation path, thereby for cooling the heat-developable recording material after heat development.

(4) The heat development apparatus as in any of (1) to (3), wherein a recording paper accommodating case in which the heat-developable recording paper before a heat development processing is accommodated is utilized as a temporary storage part for the heat-developable recording material to be inverted by the inversion processing mechanism.

(5) The heat development apparatus as in any of (2) to (4), wherein the transportation unit has been configured to be speed-adjustable, and the heating unit has been configured to be output-adjustable.

(6) A heat development method for heat developing a sheet-like heat-developable recording material having recording layers on its opposite sides, using the heat development apparatus described in any of (2) to (5), the method which comprises:

inverting, the heat-developable recording material subjected to a heat development processing on its one side by the heating unit, with the inversion processing mechanism, and returning it to the beginning end of the heating region by the heating unit, also subjecting the heat-developable recording material to a heat development processing on its other side by means of the operations of the transportation unit and the heating unit, and then discharging it.

(7) The heat development method as in (6), wherein for the heat development processing of the other side of the heat-developable recording material subjected to the heat development processing on its one side, the heat development is carried out by increasing the transportation speed by the transportation unit higher than with the heat development of the one side, or reducing the heating amount by the heating unit smaller than with the heat development of the one side.

(8) The heat development method as in (6) or (7), wherein the heat development processing is repeatedly carried out by allowing the heat-developable recording material to pass through the heating region plural times.

With the heat development apparatus described in (1), the arc-like transportation path for carrying out a heating processing on the heat-developable recording material is set in an annular path having a substantially equal length with the transportation length of the heat-developable recording material. For example, the diameter of the pitch circle along which the presser rollers are arranged for transporting the heat-developable recording material can be simply reduced to about ½ as compared with the conventional apparatus adopting an arc-like transportation path with a length of about ½ the circumference. Thus, the reduction in size of the transportation unit can achieve the reduction in size of the apparatus.

Whereas, with the heat development apparatus described in (2), by carrying out the heat development method described in (6), it is possible to implement the proper heating processing not causing insufficient heating on the opposite sides of the heat-developable recording material. Therefore, it is possible to obtain high-concentration and concentration inconsistency-free sharp image recording by adopting a heat-developable recording material having recording layers formed on its opposite sides.

Further, the apparatus is only required to undergo a small scale modification in which only an inversion processing mechanism and a transportation route switching unit are added to a conventional heat development apparatus intended for the development processing of a heat-developable recording material having a recording layer on only its one side. Thus, the addition of a heating unit with a large power consumption is not required. As a result, it is possible to eliminate an increase in manufacturing cost due to the increase in size of the apparatus and the increase in power source capacitance, and the like.

Namely, the apparatus is only required to undergo a slight improvement of a conventional apparatus, and it is capable of implementing the heat development of a heat-developable recording material having recording layers formed on its opposite sides at a low cost.

Further, with the heat development apparatus described in (3), the dead space formed in the rear of the annular transportation path is usefully utilized as the mounting space of the discharge-side transportation route connected to the terminal end of the heating region of the heat development unit, and the cooling unit mounted at the discharge-side transportation route.

For this reason, it is possible to implement a further reduction in size of the apparatus by the synergy with the reduction in size by the transportation unit.

Whereas, with the heat development apparatus described in (4), when the temporary storage part of a heat-developable recording material for the adjustment of the time required for the heat development processing in the heating region and the time required for the inversion processing, and the like becomes necessary, the already-existing recording accommodating case is usefully utilized as the temporal storage part. This eliminates the necessity of additionally mounting a specific tray, or the like. Thus, it is possible to inhibit the addition of other constituent components, resulting in a simplification of the configuration of the apparatus, and a reduction of the manufacturing cost.

With the heat development apparatus described in (5), as shown in (7), it becomes possible to implement a heat development method such that when the heat-developable recording material which has gone through the heat development processing on one side is subjected to the heat development processing on the other side, the transportation speed by the transportation unit is increased higher than with the heat development of the one side, or the heating amount is reduced.

This results in an increase in speed of the processing, and simultaneously prevents the excessive heating due to the effect of the remaining heat from the time of the heat development processing of the one side. As a result, it becomes possible to ensure high quality heat development on the heat-developable recording material having recording layers on its opposite sides of a base film.

BRIEF DESCRIPTION OF THE DRAWINGS

FIGS. 4A to 4C are longitudinal cross sectional views of the heat development apparatus in accordance with the invention, wherein FIG. 4A shows a structure including a plurality of plate heaters arranged along an arc-like transportation path; FIG. 4B, a structure of a heating drum system; and FIG. 4C, a belt type transportation structure including a pair of endless belts interposing a photothermographic material therebetween;

DESCRIPTION OF REFERENCE NUMERALS AND SIGNS

| | |
|---|---|
| 71 | Heat-developable recording material |
| 73 | Recording paper accommodating case |
| 77 | Transportation unit |
| 77a | Lead-in guide part |
| 77b | Cylindrical roller guide |
| 77c | Presser roller |
| 79 | Heating unit |
| 81 | Cooling unit |
| 83 | Apparatus housing |
| 85 | Discharge tray |
| 88 | Vacant space |
| 110 | Inversion processing mechanism |
| 113 | Guide plate for temporal storage |
| 115 | Counter feed roller pair |
| 117 | Route switching unit |
| 120A | Transportation route switching unit |
| 120B | Transportation route switching unit |
| 130 | Discharge-side transportation route |
| 200, 211, and 221 | Heat development apparatus |

DETAILED DESCRIPTION OF THE INVENTION

Below, preferred embodiments of a heat development apparatus in accordance with the invention will be described in details by reference to the accompanying drawings.

Figure 1:
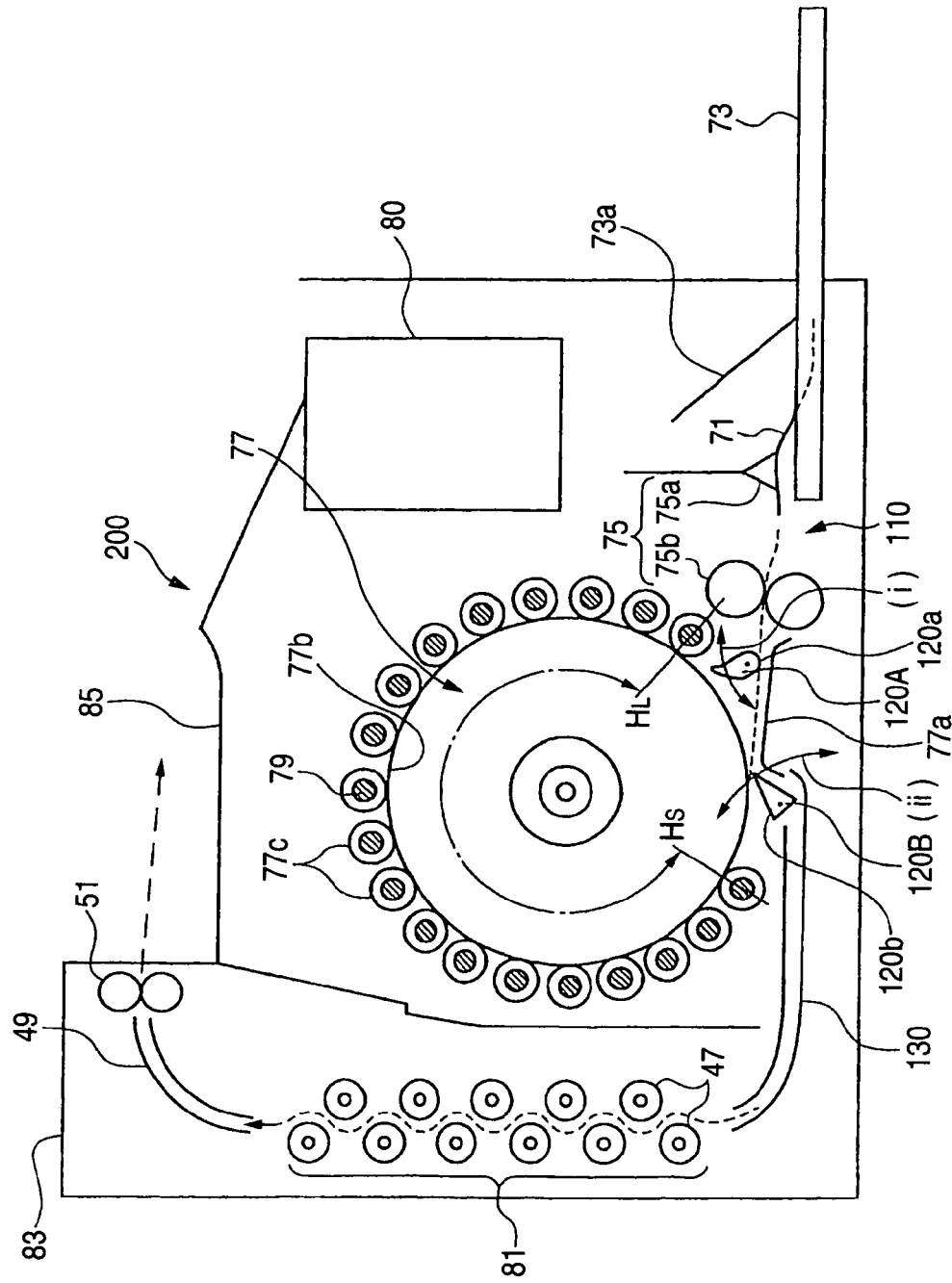
FIG. 1 is a longitudinal cross sectional view of a first embodiment of a heat development apparatus in accordance with the invention.

FIG. 1 is a longitudinal cross sectional view of a first embodiment of the heat development apparatus in accordance with the invention.

A heat development apparatus 200 of the first embodiment is usable as a heat development unit of a heat development recording apparatus for use in medical image recording as a dry system, and includes: a recording paper accommodating case (cassette) 73 for accommodating sheet-like heat-developable recording materials 71 on each of which a latent image has already been formed by an exposure processing; a feed mechanism 75 for feeding the heat-developable recording materials 71 accommodated in the cassette 73 one by one out of the cassette 73; a transportation unit 77 for transporting the heat-developable recording materials 71 fedout of the cassette 73 by the feed mechanism 75 along a circumferential transportation path; a heating unit 79 mounted along the transportation path, for performing a prescribed heating processing on the heat-developable recording material 71 from its one surface side; a power source/control unit 80 for controlling the operations of respective driving units and the heating unit; and an inversion processing mechanism 110, and first and second transportation route switching unit 120A and 120B mounted at the terminal end of the heating region by the heating unit 79. With this configuration, the heat development apparatus 200 performs a heat development processing on the recording layers of the heat-developable recording material 71.

The first transportation route switching unit 120A is mounted between the terminal end of the circumferential transportation path by the transportation unit 77 and a lead-in guide part 77a described later. It selectively switches the route of the heat-developable recording material 71 discharged from the terminal end of the heating region which is the terminal end of the transportation path to either side of the inversion processing mechanism 110 or the lead-in guide part 77a.

Specifically, the first transportation route switching unit 120A switches the orientation of a rotatable guide piece 120a as indicated with an arrow (ii), and thereby selectively switches the route of the heat-developable recording material 71 transported by the transportation unit 77 to the inversion processing mechanism 110 side or the lead-in guide part 77a side.

The second transportation route switching unit 120B is mounted between the beginning end of the circumferential transportation path by the transportation unit 77 and the lead-in guide part 77a. It selectively switches the route of the heat-developable recording material 71 which has entered the lead-in guide part 77a to either side of the beginning end of the circumferential transportation path or the discharge-side transportation route 130.

Specifically, the second transportation route switching unit 120B switches the orientation of a rotatable guide piece 120b as indicated with an arrow (ii), and thereby selectively carries out the switching between allowing the heat-developable recording material 71 which has entered the lead-in guide part 77a to run as it is to the beginning end side of the heating region, or feeding it to the discharge-side transportation route 130 side.

Incidentally, guide pieces 120a and 120b are switched through driving of a solenoid not shown.

The discharge-side transportation route 130 is equipped at the some midpoint with a cooling unit 81 for cooling the heat-developable recording material 71 subjected to the heat development down to a low temperature range allowing the discharge. Whereas, an apparatus case 83 for accommodating therein the cassette 73, the feed mechanism 75, the transportation unit 77, the heating unit 79, and the cooling unit 81 is equipped on the top with a discharge tray 85 for mounting thereon the heat-developable recording material 71 which has gone through cooling.

For this embodiment, the discharge-side transportation route 130 is configured to include a cooling unit 81 which communicates therewith through the outside side (bottom side) of the beginning end of the heating region, the outside side being in an area nearer to the beginning end than to the terminal end of the heating region, and is longitudinally mounted in the rear of the annular transportation path by the transportation unit 77, for cooling a heat-developable recording material after heat development.

The cooling unit 81 mounted at the midpoint along the discharge-side transportation route 130 cools the heat-developable recording material 71 to an appropriate temperature such as ordinary temperature by heat dissipation during transportation by means of an appropriate number of cooling roller pairs 47. The cooled heat-developable recording material 71 is discharged to a discharge tray 85 through the inducing path by guide plates 49 and a transportation roller pair 51.

The cassette 73 is configured such that the top at the front end accommodated in the apparatus is reclosable by a reclosable door 73a.

The feed mechanism 75 is composed of a take-out head 75a for adsorbing thereon the sheet-like heat-developable recording material 71 before the heat development processing accommodated in the cassette 73 and taking it outside, and a send roller pair 75b for sending the heat-developable recording material 71 taken out by the take-out head 75a to a lead-in guide part 77a at the beginning end of the transportation unit 77.

The transportation unit 77 includes the lead-in guide part 77a for guiding the tip of the heat-developable recording material 71 fed by the feed mechanism 75 to a prescribed position, a cylindrical roller guide 77b of which the circumferential surface of the outer periphery serves as the transportation plane of the heat-developable recording material 71, and presser rollers 77c arranged in plural numbers along the outer periphery of the cylindrical roller guide 77b, for pressing the heat-developable recording material 71, and simultaneously performing heat development by a heating unit 79 included therein.

A plurality of the presser rollers 77c are arranged at a given pitch along the portion covering roughly one circumference of the outer periphery of the cylindrical roller guide 77b. Thus, these form an annular path having a substantially equal length with the transportation length of the heat-developable recording material 71. The annular path may also be formed, for example, in the elliptical shape or in the polygonal shape, other than in the circular shape as shown in FIG. 1. When it is formed in the elliptical shape, the setting space in the direction of the ellipse's minor axis can be reduced. Whereas, when it is formed in the polygonal shape, the interference with each member in the apparatus can be avoided with high efficiency, which allows the improvement of the setting efficiency.

Each presser roller 77c is driven in rotation by a driving mechanism not shown, and transports the heat-developable recording material 71.

Whereas, in the case of this embodiment, the transportation unit 77 is configured to be speed-adjustable.

For this embodiment, each heating unit 79 is a halogen lamp, and as already described, mounted in such a form as to be included in each presser roller 77c.

Therefore, the heating region by the heating unit 79 is equal to the distribution region H of a plurality of the presser rollers 77c on the outer periphery of the cylindrical roller guide 77b. The beginning end of the heating region corresponds to the mounting position HS of the forefront presser roller 77c, and the terminal end of the heating region corresponds to the mounting position HL of the rearmost presser roller 77c.

The heating region is set from the practical viewpoint so as to cover ⅚ or more of one circumference provided by the cylindrical roller guide 77b. Thus, it is configured such that the beginning end and the terminal end of the heating region are arranged in proximity with each other.

Incidentally, for this embodiment, the heating amount by the heating unit 79 is also configured to be adjustable.

The inversion processing mechanism 110 inverses the heat-developable recording material 71 transported by the transportation unit 77, and returns it to the beginning end HS of the heating region.

Specifically, the inversion processing mechanism 110 takes the heat-developable recording material 71 transported to the terminal end of the heating region in the side of the cassette 73 by the switching operation of the first transportation route switching unit 120A and the counter-rotatable driving of the send roller pair 75b, and thereby inverts the heat-developable recording material 71.

Then, the inverted heat-developable recording material 71 is sent to the lead-in guide part 77a through the feed mechanism 75 to be returned to the beginning end of the heating region.

Whereas, the inversion processing mechanism 110 utilizes the cassette 73 as the temporal storage part of the inverted heat-developable recording material, and thereby adjusts the length of time required for the inversion processing.

With the foregoing heat development apparatus 200, the sheet-like heat-developable recording material 71 having recording layers on its opposite sides is subjected to a heat development processing in the following manner.

First, the heat-developable recording material 71 subjected to the heat development processing on its one side by the heating unit 79 is inverted by the first transportation route switching unit 120A and the inversion processing mechanism 110, and accommodated in the cassette 73. Then, it is returned again by the feed mechanism 75 to the beginning end of the heating region by the heating unit 79. Then, the heat-developable recording material 71 is also subjected to a heat development processing on its other side by means of the operations of the transportation unit 77 and the heating unit 79. Then, the heat-developable recording material 71 is discharged to the discharge-side transportation route 130 by the first and second transportation route switching unit 120A and 120B. Thus, the recording layers on the opposite sides of the heat-developable recording material 71 are heat developed.

Then, when the heat-developable recording material 71 which has gone through the heat development processing on one side is subjected to a heat development processing on its other side, the transportation speed by the transportation unit 77 is increased higher than with the heat development of the one side, or the heating amount by the heating unit 79 is reduced smaller than with the heat development of the one side. This prevents the excessive heating due to the effect of the remaining heat from the time of the heat development of the one side.

In the heat development apparatus 200 of the first embodiment described up to this point, the arc-like transportation path for performing a heat processing on the heat-developable recording material 71 is set in an annular path having a substantially equal length with the transportation length of the heat-developable recording material corresponding to roughly one circumference of the cylindrical roller guide 77b. Therefore, for example, the diameter of the pitch circle for arranging the presser rollers 77c for transporting the heat-developable recording material 71 can be reduced to about ½ as compared with a conventional apparatus in which an arc-like transportation path having a length corresponding to about ½ of the circumference is set. For this reason, it is possible to achieve the reduction in size of the apparatus by the reduction in size of the transportation unit.

Whereas, in the heat development apparatus 200 of this embodiment, the dead space in the rear of the annular transportation path is usefully utilized as the setting space of the discharge-side transportation route 130 connected to the terminal end of the heating region, and the cooling unit 81 mounted at the discharge-side transportation route 130.

For this reason, it is possible to achieve a further reduction of the size of the apparatus by synergy with the reduction in size of the transportation unit 77.

Whereas, with the heat development apparatus 200 of this embodiment, the heat-developable recording material 71 having recording layers formed on it opposite sides is subjected to a heat development processing on its front surface. Then, the heat-developable recording material 71 is inversed, and subjected to a heat development processing on its rear surface. As a result, it is possible to implement the proper heating not causing insufficient heating or the like on the opposite sides of the heat-developable recording material 71. Therefore, it is possible to implement high-concentration and concentration inconsistency-free sharp image recording by adopting a heat-developable recording material 71 having recording layers formed on its opposite sides.

Further, the apparatus is only required to undergo a small scale modification in which only an inversion processing mechanism 110 and a transportation route switching unit 120 are added to a conventional heat development apparatus intended for the development processing of a heat-developable recording material having a recording layer on only its one side. Thus, the addition of a heating unit with a large power consumption is not required. As a result, it is possible to eliminate an increase in manufacturing cost due to the increase in power source capacitance.

Namely, the apparatus is only required to undergo a slight improvement of a conventional apparatus, and it is capable of implementing the heat development of a heat-developable recording material having recording layers formed on its opposite sides of the base film at a low cost only.

Of course, the heat development apparatus of this embodiment is also capable of carrying out the development of a heat-developable recording material having a recording layer on only one side as in the prior art in the following manner. Namely, the heat development processing is set as follows: after the heat development processing of the recording layer on one side, the heat-developable recording material is not allowed to pass through the inversion processing mechanism 110, but directly discharged to the cooling unit 81.

Whereas, with the heat development apparatus 200, the transportation unit 77 is configured to be speed-adjustable. Therefore, it is possible to implement a heat development method such that when the heat-developable recording material 71 which has gone through the heat development processing on its front surface is subjected to the heat development processing on its rear surface, the transportation speed by the transportation unit 77 is increased higher than with the heat development of its front surface. Further, the heating unit 79 is configured to be output-adjustable. Therefore, it is possible to implement a heat development method such that when the heat-developable recording material which has gone through the heat development processing on the one surface is subjected to the heat development processing on the other surface, the heating amount by the heating unit 79 is reduced smaller than with the heat development of the one surface.

This results in an increase in speed of the processing, and simultaneously prevents the excessive heating due to the effect of the remaining heat from the time of the heat development of the one side. As a result, it becomes possible to ensure high quality heat development on the heat-developable recording material 71 having recording layers on its opposite sides.

Whereas, in the heat development apparatus 200 of this embodiment, the already-existing cassette 73 is usefully utilized as the temporal storage part required for the inversion processing of the heat-developable recording material 71. This eliminates the necessity of additionally mounting a specific tray, or the like. Accordingly, it is possible to inhibit the addition of other constituent components, resulting in a simplification of the configuration of the apparatus, and a reduction of the manufacturing cost.

Incidentally, in the case of the configuration that the cassette 73 is utilized as the temporal storage part for the inversion processing as in this embodiment, a lock mechanism for restricting the insertion and extraction of the cassette 73 to and from a housing 83 is desirably mounted at the cassette 73 and the housing 83 in order to prevent the exchange of the cassette 73 or the like from being carried out during the heat development processing.

Figure 2:
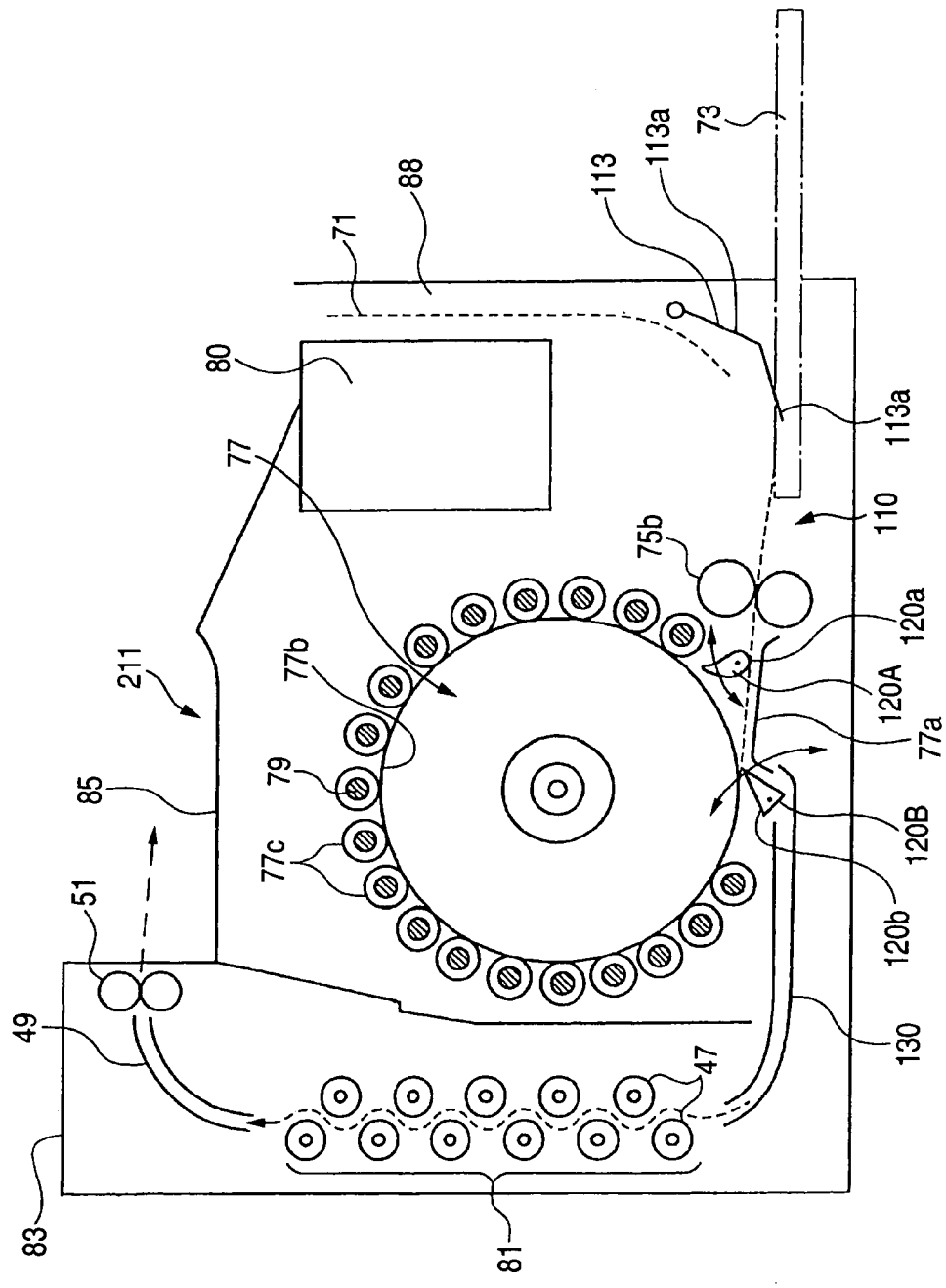
FIG. 2 is a longitudinal cross sectional view of a second embodiment of the heat development apparatus in accordance with the invention.

FIG. 2 shows a longitudinal cross sectional view of a second embodiment of the heat development apparatus in accordance with the invention.

The heat development apparatus 211 of the second embodiment is formed by improving the inversion processing mechanism 110 shown in the first embodiment. A guide plate 113 for temporal storage is additionally mounted above the mounting position of the cassette 73 in the housing 83, and a vacant space 88 formed in the side portion of a power source/control unit 80 serves as the temporal storage part of the inverted heat-developable recording material 71. In other words, the heat development apparatus 211 is similar in configuration to the first embodiment except for the additional mounting of the guide plate 113 for temporal storage. The same numerals are given to the same configuration, and the description thereon is omitted.

The guide plate 113 for temporal storage is rotatably mounted on top of the cassette 73. Thus, when the cassette 73 is taken out of the housing 83, the guide plate 113 for temporal storage moves downwardly by rotation, and also functions as a light-shielding plate for preventing the entering of an external light from the cassette mounting port opened in the housing 83.

The guide plate 113 for temporal storage is configured to include a tip drawing part 113a for receiving the tip of the heat-developable recording material 71 drawn toward the cassette 73 by the rotation of the first transportation route switching unit 120A, and a guide part 113b extending from the terminal end of the tip drawing part 113a toward the vacant space 88. This ensures a specific temporal storage part required for the inversion processing of the heat-developable recording material 71.

The vacant space 88 is set in proximity to the power source/control unit 80 so as to be available for the heat insulation of the heat-developable recording material 71 temporarily storing the generated heat of the power source/control unit 80.

With the heat development apparatus 211 thus configured, the heat-developable recording material 71 which has passed through the guide plate 113 for temporal storage, and has been stored in the vacant space 88 by the inversion processing mechanism 110 is prevented from being lowered in temperature through heating by the heat generation of the power source/control unit 80. As a result, it is possible to keep the temperature of the heat-developable recording material 71 itself with stability until the start of the heat development processing of the other side again.

Therefore, when the heat-developable recording material 71 which has gone through the heat development processing on its one side (e.g., front surface) is inverted by the inversion processing mechanism 110, and subjected to a heat development processing on the remaining other side (e.g., rear surface), the heating amount by the heating unit 79 for the heat development processing can be more reduced than the heating amount during the heat development processing on the front surface, which can suppress the power consumption.

Further, it is possible to eliminate variations in temperature of the heat-developable recording material 71 when the heat development of the rear surface is started. For this reason, it is possible to inhibit the occurrence of uneven heating causing deficiencies such as uneven concentration. This can implement high-concentration high-quality image recording.

Incidentally, when the amount of heat generated by the power source/control unit 80 is small, it is also conceivable that a plate heater, or the like is added to the vacant space 88 to prevent the lowering in temperature of the heat-developable recording material 71.

Whereas, the heat development apparatus 211 of the foregoing embodiment is configured such that the inverted heat-developable recording material 71 is guided to the vacant space 88 serving as a temporal storage part with the cassette 73 mounted therein. However, it may also be configured as follows. When the cassette 73 is thus mounted therein, as with the first embodiment, the cassette 73 is utilized as the temporal storage part. Only when the cassette 73 is not mounted therein, the guide plate 113 for temporal storage acts, so that the vacant space 88 serves as the temporal storage part.

Figure 3:
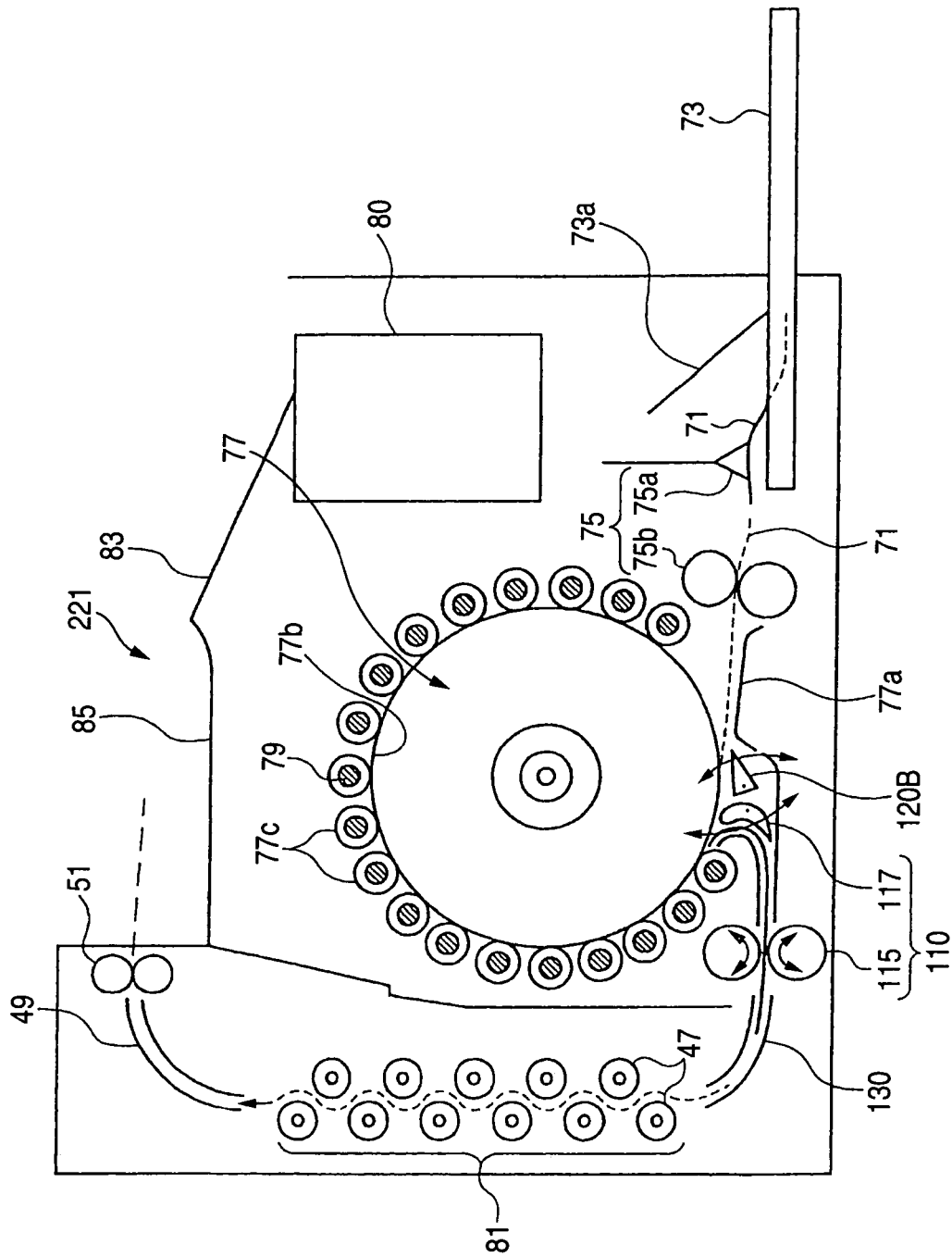
FIG. 3 is a longitudinal cross sectional view of a third embodiment of the heat development apparatus in accordance with the invention.

FIG. 3 shows a longitudinal cross sectional view of a third embodiment of the heat development apparatus in accordance with the invention.

The heat development apparatus 221 of the third embodiment is formed by improving the apparatus of the first embodiment. It is configured such that a part of the discharge-side transportation route 130 branched and connected between the lead-in guide part 77a and the beginning end of the heating region is utilized for the inversion processing of the heat-developable recording material 71.

With the heat development apparatus 221, the inversion processing mechanism 110 of the heat-developable recording material 71 includes a counter feed roller pair 115 for returning the heat-developable recording material 71 which has gone into the discharge-side transportation route 130 to the lead-in guide part 77a side, and a route switching unit 117 for allowing, the heat-developable recording material 71 reversely going through the discharge-side transportation route 130 by the counter feed roller pair 115, to do a U-turn and return to the beginning end side of the heating region, at the subsequent stage of the second transportation route switching unit 120B for allowing, the heat-developable recording material 71 which has gone into the lead-in guide part 77a, to go into the discharge-side transportation-side route 130.

In compensation for having mounted the counter feed roller pair 115 and the route switching unit 117 on the discharge-side transportation route 130, the first transportation route switching unit 120A used in the first embodiment was abandoned.

Thus, even with the configuration in which the discharge-side transportation route 130 includes the counter feed roller pair 115 as the inversion processing mechanism 110 and the route switching unit 117, it is possible to heat develop the opposite sides of the heat-developable recording material 71.

Figure 4A:
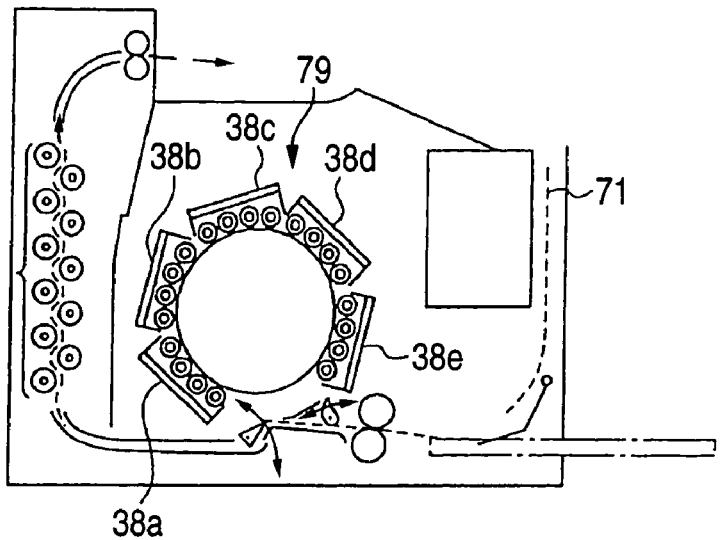

Incidentally, in the foregoing respective embodiments, a halogen lamp was adopted as each heating unit 79, and included in each presser roller 77c. However, the heating unit 79 are not limited to the foregoing embodiments. For example, a plurality of plate heaters 38a, 38b, 38c, 38d, 38e, and the like arranged along an arc-like transportation path as shown in FIG. 4A are also available.

Figure 4B:
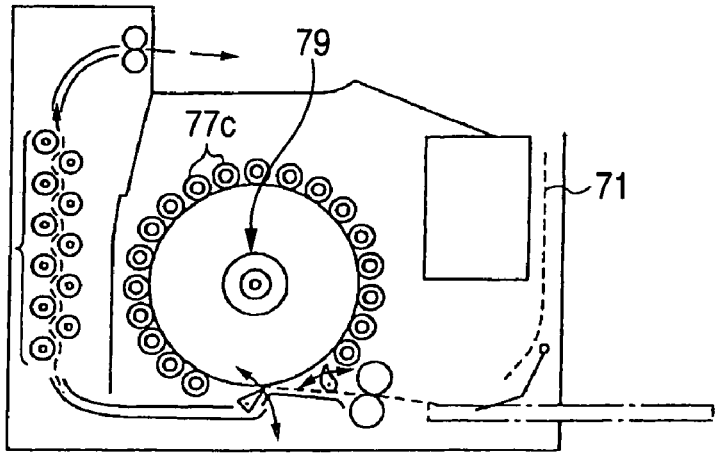

Alternatively, when a heating drum system shown in FIG. 4B is employed, the heating unit 79 is not required to be included in the respective presser rollers 77c dispersed and arranged in plural numbers, and it is only required to be included in the central part of the rotating drum. This enables the simplification of the configuration.

Figure 4C:
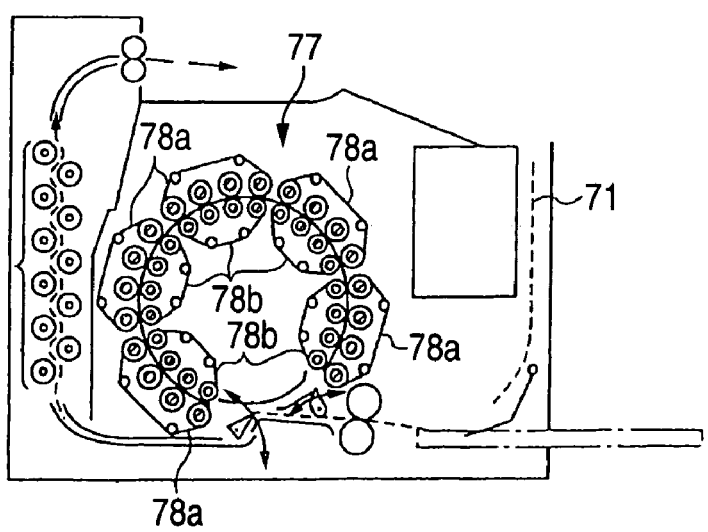

Further, the transportation unit 77 for transporting the heat-developable recording material 71 may also have a belt type transportation configuration such that a pair of endless belts 78a and 78b interposing the heat-developable recording material 71 therebetween run as shown in FIG. 4C. With such a belt type transportation configuration, it is possible to inhibit the occurrence of rubbing at the surface of the heat-developable recording material 71, resulting in a reduction of stains due to rubbing on the recording surface of the heat-developable recording material 71.

Whereas, the foregoing respective embodiments are each configured as follows. The heat-developable recording material 71 goes roughly around the circumferential transportation path, so that the heat development on its one side is carried out. However, the following configuration may also be adopted. The heat-developable recording material 71 is allowed to pass through the heating region over a plurality of times, so that heat development is carried out repeatedly. This can reduce the heat capacity of the heating region, resulting in a reduction of the power source capacitance.

Below, a detailed description will be given to a photothermographic material for use in the heat development recording apparatus in accordance with the invention.

The light-sensitive material for photographing for use in this embodiment is not the one for writing image information thereon through scanning and exposure with a laser light, or the like, but the one for recording images through surface exposure thereon.

It has been commonly used in the field of a wet development light-sensitive material conventionally. There are known direct or indirect X-ray film, a mammograph film, or the like in the medical use, various plate-making films for printing, industrial recording films, films for photographing by common cameras, or the like. For example, patent documents disclose a double-side coating type X-ray photothermographic material utilizing a blue fluorescent intensifying screen (see, e.g., Japanese Patent No. 3229344), a photothermographic material using silver iodobromide tabular grains (see, e.g., JP-A-59-142539), or a medical light-sensitive material prepared by coating the opposite sides of a support with tabular grains having a (100) main plane and a high silver chloride content (see, e.g., JP-A-10-282606). Further, the double-side coating photothermographic materials are also disclosed in other patent documents (see, e.g., JP-A-2000-227642, JP-A-2001-22027, and JP-A-2001-109101, and JP-A-2002-90941) However, in these known examples, when fine-grain silver halide with a grain diameter of 0.1 μm or less is used, the deterioration of the haze is not entailed, but the sensitivity is low. Thus, the material is not capable of standing practical use for photographying. On the other hand, when silver halide grains with a grain size of 0.3 μm or more are used, the deterioration of the image quality due to the deterioration of the haze by the remaining silver halide and the deterioration of the print-out is severe. Thus, the material is not capable of standing practical use.

The light-sensitive materials using silver iodide tabular grains are known in the field of the wet development as silver halide grains (see, e.g., JP-A-59-119344 and JP-A-119350). However, there is no example of its application to the photothermographic material. The reason for this is as follows. Namely, the material is low insensitivity, there is no effective sensitizing means, and the technical barrier is further heightened in heat development.

In order to be used for such a light-sensitive material for photographing, the material is required to have a still higher sensitivity as a photothermographic material. Further, the image quality such as the haze of the resulting image is also required to be at a still more higher level.

As the photothermographic material satisfying the foregoing requirements, the following ones are useful.

1. Photothermographic Material

A photothermographic material of this embodiment has an image forming layer containing a light-sensitive silver halide, a non-light-sensitive organic silver salt, a reducing agent, and a binder on at least one side of a support. Further, it may also preferably have a surface protective layer on the image forming layer, or a back layer, a back protective layer, or the like on the opposite surface.

The configurations of these respective layers, and the preferred components thereof will be described in detail.

(Compound for Substantially Reducing Visible Light Absorption Derived from a Light-sensitive Silver Halide After Heat Development)

In this embodiment, the photothermographic material preferably contains a compound for substantially reducing visible light absorption derived from a light-sensitive silver halide after heat development relative to before heat development.

In this embodiment, a silver iodide complex forming agent is in particular preferably used as the compound for substantially reducing visible light absorption derived from a light-sensitive silver halide after heat development (Explanation of the Silver Iodide Complex Forming Agent)

A silver iodide complex forming agent in this embodiment is capable of contributing to the Lewis acid-base reaction in which at least one of a nitrogen atom or a sulfur atom in the compound donates electrons to silver ions as a coordinating atom (electron donor: Lewis base). The stability of the complex is defined by the stepwise stability constant or the overall stability constant. However, it depends upon the combination of three, i.e., silver ions, iodine ions, and the silver complex forming agent. As a general guideline, it is possible to obtain a large stability constant by the chelate effect resulting from the chelate ring formation in the molecule, or a means such as an increase in acid-base dissociation constant of the ligand.

The mechanism of action of the silver iodide complex forming agent in this embodiment has not been clearly elucidated. However, presumably, by forming a stable complex with at least ternary components including an iodine ion and a silver ion, the silver iodide is made soluble. The silver iodide complex forming agent in this embodiment is poor in capability of making silver bromide or silver chloride soluble. However, it specifically acts on silver iodide.

The details of the mechanism whereby the image storability is improved by the silver iodide complex forming agent in this embodiment is not apparent. However, the mechanism is based on the following fact. At least a part of the light-sensitive silver halide and the silver iodide complex forming agent in this embodiment react with each other during heat development, thereby to form a complex, resulting in a reduction or disappearance of the light sensitivity. Particularly, the image storability under light irradiation is conceivably largely improved. Whereas, simultaneously, it is also a large feature that the reduction of the turbidity of the film due to a silver halide results in a clear high-quality image. The turbidity of the film can be confirmed by the reduction of the ultraviolet visible absorption of the spectral absorption spectrum.

In this embodiment, the ultraviolet visible spectrum of the light-sensitive silver halide can be measured by a transmission process or a reflection process. When the absorption derived from other compounds added to the photothermographic material overlaps with the absorption of the light-sensitive silver halide, means such as the difference spectrum, and removal of the other compounds by a solvent are used alone, or in combination, which allows the observation of the ultraviolet visible absorption spectrum of the light-sensitive silver halide.

The silver iodide complex forming agent in this embodiment is distinctly different from a conventional silver ion complex forming agent in that an iodine ion is essential for forming a stable complex. The conventional silver ion complex forming agent performs a dissolving activity on a salt containing a silver ion such as an organic silver salt including silver bromide, silver chloride, silver behenate, or the like. In contrast, the large feature of the silver iodide complex forming agent in this embodiment resides in that it does not act in the absence of silver iodide.

The specific compounds of the silver iodide complex forming agent in this embodiment are the same as the compounds described in details in Japanese Patent Application Nos. 2002-367661, 2002-367662, and 2002-367663. The specific compound examples described in these patent application specifications may also be cited as the specific examples of the compounds of this embodiment.

In this embodiment, in order that the image storability, particularly, the image storability under light irradiation is largely improved, the absorption intensity of the ultraviolet visible absorption spectrum of the light-sensitive silver halide after heat development is preferably 80% or less, further preferably 40% or less, and in particular preferably 20% or less as compared with before heat development. It is most preferably 10% or less.

The silver iodide complex forming agent in this embodiment maybe incorporated in a coating solution with any process based on a solution form, an emulsified dispersion form, a solid fine particle dispersion form, or the like, and incorporated in the light-sensitive material.

As a well-known emulsification dispersion method, mention may be made of a method in which an emulsified dispersion is mechanically prepared by dissolving the agent with an oil such as dibutyl phthalate, tricresyl phosphate, glyceryl triacetate or diethyl phthalate and with a co-solvent such as ethyl acetate or cyclohexanone.

(Explanation of Light-sensitive Silver Halide)

1) Halogen Composition

It is important that the light-sensitive silver halides usable in this embodiment are the ones of a composition having a silver iodide content of as high as 40% or more and 100 mol % or less. There is no particular restriction on the balance. The silver halides can be selected from silver halides such as silver chloride and silver bromide, or organic silver salts such as silver thiocyanate and silver phosphate, but the silver halide is in particular preferably silver bromide or silver chloride. By using such a silver halide of a composition having a high silver iodide content, it is possible to design a preferred photothermographic material excellent in image storability after heat development, particularly causing a remarkably less increase in fog through light irradiation.

Further, it is very preferable from the viewpoint of the image storability under light irradiation after processing that the silver iodide content is preferably 70% or more and 100 mol % or less, more preferably 80 mol % or more and 100 mol % or less, and further preferably 90 mol % or more and 100 mol % or less.

The distribution of halogen composition in a grain may be uniform, or it may be such that the halogen composition is stepwise changed or continuously changed. Further, silver halide grains having a core/shell structure can also preferably be used. For the structure, a twofold to fivefold structure is preferable. Core/shell grains having a twofold to fourfold structure are more preferably used. A core high silver iodide structure in which the core portion has a high silver iodide content, or a shell high silver iodide structure in which the shell portion has a high silver iodide content is also preferably usable. Whereas, techniques of localizing silver chloride or silver bromide in the form of an epitaxial part on the surface of the grain can also preferably be used.

The silver iodide of this embodiment can assume any given $\beta$ phase and $\gamma$ phase contents. The $\beta$ phase denotes a high silver iodide structure having a wurtzite structure of a hexagonal system, and the $\gamma$ phase denotes a high silver iodide structure having a zinc blend structure of a cubic system. The $\gamma$ phase content herein referred to is determined by a method proposed by C. R. Berry. With this method, the content is determined based on the ratio of peaks resulting from the silver iodide $\beta$ phase (100), (101), and (002), and the $\gamma$ phase (111) according to the powder X-ray diffraction method. As for the details thereof, for example, *Physical Review*, Volume 161, No. 3, p. 848–851, (1967) can serve as a reference.

2) Grain Size

As for the silver halide with a high silver iodide content for use in this embodiment, a sufficiently large grain size required for achieving the high sensitivity may be selected. In this embodiment, the mean sphere equivalent diameter of the silver halide is preferably 0.3 μm or more and 5.0 μm or less, and further preferably 0.5 μm or more and 3.0 μm or less. The sphere equivalent diameter herein referred to denotes the diameter of the sphere with the same volume as the volume of one silver halide grain. It can be determined in the following manner. The grain volume is determined from the individual projection area and thickness observed by means of an electron microscope. Then, it is converted to the sphere with the same volume as the volume.

3) Coating Amount

In general, for a photothermographic material in which the silver halide still remains as it is even after heat development, the increase in coating amount of the silver halide results in the reduction of the transparency of the film. This is undesirable in terms of the image quality. Therefore, there is a demand for enhancing the sensitivity. However, the sensitivity is restricted to a low level in spite of this demand. However, in this embodiment, the heat development can reduce the haze of the film due to the silver halide. Therefore, the silver halide can be applied in a larger amount. In this invention, it is applied in an amount of preferably 0.5 mol % or more and 100 mol % or less, more preferably 5 mol % or more and 50 mol % or less permole of the silver of a non-light-sensitive organic silver salt.

4) Grain Formation Method

The methods for forming the light-sensitive silver halide are well known in the art. For example, methods described in *Research Disclosure* No. 17029, June, 1978, and U.S. Pat. No. 3,700,458 can be used. Specifically, the following method is used. Namely, a silver-supplying compound and a halogen-supplying compound are added into a solution of gelatin or other polymers, thereby to prepare a light-sensitive silver halide. Then, the resulting light-sensitive silver halide is mixed with an organic silver salt. Further, the methods described in paragraph Nos. 0217 to 0224 of JP-A-11-119374, and the methods described in JP-A-11-352627 and JP-A-2000-347335 are also preferred.

As for the methods for forming tabular grains of silver iodide, the methods described in JP-A-59-119350 and JP-A-59-119344 are preferably used.

5) Grain Shape

As the shape of the silver halide grain in the invention, a tabular grain is preferred. Specifically, this includes tabular octahedron grain, tabular tetradecahedron grain and tabular twenty-hedron grain in view of the structure of the lateral planes. Preferred are tabular octahedron grains, and tabular tetrahedron grain. The tabular octahedron referred to herein denote a grain having a {0001}, or {1(-1)00} plane, or a grain having {0001}, {1(-2)10} or {(-1)2(-1)0} plane, and the tabular tetradecahedron particle denotes a grains having {0001}, {1(-1)00}, or {1(-1)01} or a grain having {0001}, {1(-2)10}, {(-1)2(-1)0}, {1(-2)11}, or {(-1)2(-1)1} plane, a grain having {0001}, {1(-1)00}, or {1(-1)0(-1)}, or a grain having {0001}, {1(-2)10}, {(-1)2(-1)0}, {1(-2)1(-1)}, or {(-1)2(-1)(-1)} plane, tabular twenty-hedron grain denotes a grain having {0001}, {1(-1)00}, {1(-1)01}, or {1(-1)0(-1)}, or a grain having {0001}, {1-(-2)10}, {(-1)2(-1)0}, {1(-2)1(-1)11}, {(-1)2(-1)1}, {1(-2)1(-1)}, {(-1)2(-1)(-1)}. Expression such as {0001} represents the crystal plane group having the equivalent plane indices with {0001} plane. Further, tabular grains of other shape than described above can also be used preferably.

Decahedron, tetrahedron and octahedron of silver iodide can be prepared with reference to JP-A Nos. 2002-081020, 2003-287835 and 2003-287836.

Referring to the tabular grain, in the invention, the projection area equivalent diameter of the silver halide is preferably from 0.4 µm or more and 8.0 µm or less and, more preferably, 0.5 µm or more and 3 µm or less. The projection area equivalent diameter means the diameter of a circle having an identical area with the projection area per one grain of silver halide. As the measuring method, this can be obtained by determining the grain area based on individual projection area observed by an microscope and converting the same into a circle having an area identical with the area described above.

The thickness of the light sensitive silver halide grain used in the invention is, preferably 0.3 µm or less, more preferably, 0.2 µm or less and, further preferably, 0.15 µm or less. The aspect ratio is preferably 2 or more and 100 or less and, more preferably, 5 or more and 50 or less.

The silver halide of a composition with a high silver iodide content of this embodiment can assume complex forms. As the preferred form, mention may be made of the form of joined grains as shown in p. 164, FIG. 1 of R. L. JENKINS etal., *J. of Phot. Sci.* Vol. 28 (1980). The tabular grains as shown in FIG. 1 of the same journal may also preferably be used. Silver halide grains with rounded corners can also preferably be used. The plane indices (Miller indices) of outer surface planes of light-sensitive silver halide grains have no particular restriction. However, [100] plane showing a high spectral sensitization efficiency upon adsorption of spectral sensitizing dyes thereon preferably occupies a large proportion. The proportion is preferably 50% or more, more preferably 65% or more, and furthermore preferably 80% or more. The proportion of Miller index [100] plane can be determined by the method described in T. Tani; *J. Imaging Sci.*, 29, 165, (1985), which utilizes the adsorption dependency between [111] plane and [100] plane in the sensitizing dye adsorption.

6) Heavy Metal

The light-sensitive silver halide grains of this embodiment can contain a metal of the Groups 3 to 14 in the Periodic Table (showing the Groups 1 to 18), or a metal complex thereof. A metal of the Groups 8 to 10 in the Periodic Table, or a metal complex thereof are preferable. The metals of the Groups 8 to 10 in the Periodic Table or the central metals of the metal complexes are preferably rhodium, ruthenium, and iridium. These metal complexes may be used alone, or in combination of two or more complexes of the same kind of metals and different kinds of metals. The preferred content is preferably in the range of $1 \times 10^{-9}$ mol to $1 \times 10^{-3}$ mol per mole of silver. These heavy metals, metal complexes, and addition processes thereof are described in JP-A-7-225449, JP-A-11-65021, paragraph Nos. 0018 to 0024, and JP-A-11-119374, paragraph Nos. 0227 to 0240.

In this embodiment, a silver halide grain containing a hexacyano metal complex is preferred. As the hexacyano metal complexes, mention may be made of $[Fe(CN)_6]^{4-}$, $[Fe(CN)_6]^{3-}$, $[Ru(CN)_6]^{4-}$, $[Os(CN)_6]^{4-}$, $[Co(CN)_6]^{3-}$, $[Rh(CN)_6]^{3-}$, $[Ir(CN)_6]^{3-}$, $[Cr(CN)_6]^{3-}$, $[Re(CN)_6]^{3-}$, and the like.

The hexacyano-metal complex may be added by being incorporated in a mixed solvent of water, and in addition, an appropriate organic solvent miscible with water (e.g., alcohols, ethers, glycols, ketones, esters, or amides), or gelatin.

The amount of hexacyano-metal complex to be added is preferably $1 \times 10^{-8}$ mol or more to $1 \times 10^{-2}$ mol or less, and more preferably $1 \times 10^{-7}$ mol or more to $1 \times 10^{-3}$ mol or less per mole of silver.

Further, the metal atoms (e.g., $[Fe(CN)_6]^{4-}$) which can be incorporated in the silver halide grains usable in this embodiment, and a desalting processes or a chemical sensitizing process of a silver halide emulsion are described in JP-A-11-84574, paragraph Nos. 0046 to 0050, JP-A-11-65021, paragraph Nos. 0025 to 0031, and JP-A-11-119374, paragraph Nos. 0242 to 0250.

7) Gelatin

As the gelatins to be incorporated in the light-sensitive silver halide emulsion for use in this embodiment, various gelatins may be used. In order to keep the dispersion state in an organic silver salt-containing coating solution of the light-sensitive silver halide emulsion favorable, gelatin having a low molecular weight of 500 to 60,000 is preferably used. The low molecular weight gelatin may be used for grain formation or for dispersing after desalting treatment, but it is preferably used for dispersing after desalting treatment.

8) Chemical Sensitization

The light-sensitive silver halide for use in this embodiment may be chemically unsensitized. However, it is preferably chemically sensitized by at least one process of a chalcogen sensitization process, a gold sensitization process, and a reduction sensitization process. As the chalcogen sensitization processes, mention may be made of a sulfur sensitization process, a selenium sensitization process, and a tellurium sensitization process.

In the sulfur sensitization, a labile sulfur compound is used. The labile sulfur compounds described in *Chimie et Physique Photographique*, written by P. Grafkides (published by Paul Momtel Co., 1987, the fifth edition), Research Disclosure, Vol. 307, No. 307105, and the like can be used.

Specifically, thiosulfates (e.g., hypo), thioureas (e.g., diphenylthiourea, triethylthiourea, N-ethyl-N'-(4-methyl-2-thiazolyl)thiourea, and carboxymethyltrimethylthiourea), thioamides (e.g., thioacetamide), rhodanines (e.g., diethyl rhodanine, and 5-benzylidene-N-ethyl rhodanine), phosphine sulfides (e.g., trimethylphosphine sulfide), thiohydantoins, 4-oxo-oxazolidine-2-thiones, disulfides, or polysulfides (e.g., dimorpholine disulfide, cystine, lenthionine (1,2,3,5,6-pentathiopane), polythionate, known sulfur compounds such as elemental sulfur, and active gelatin may also be used. Particularly, thiosulfate, thioureas, and rhodanines are preferred.

In the selenium sensitization, a labile selenium compound is used, The selenium compounds described in JP-B-43-13489, JP-B-44-15748, JP-A-4-25832, JP-A-4-109340, JP-A-4-271341, JP-A-5-40324, JP-A-5-11385, Japanese Patent Application Nos. 4-202415, 4-330495, 4-333030, 5-4203, 5-4204, 5-106977, 5-236538, 5-241642, and 5-286916, and the like are usable.

Specifically, colloidal metal selenium, selenoureas (e.g., N,N-dimethylselenourea, trifluoromethylcarbonyl-trimethylselenourea, and acetyl-trimethylselenourea), selenoamides (e.g., selenoamide and N,N-diethylphenylselenoamide), phosphineselenides (e.g., triphenylphosphineselenide and pentafluorophenyl-triphenylphosphineselenide), selenophosphates (e.g., tri-p-tolylselenophosphate and tri-n-butylselenophosphate), seleno ketones (e.g., selenobenzophenone), isoselenocyanates, selenocarboxylic acids, seleno esters, diacylselenides, and the like may be used. Further, non-labile selenium compounds described in JP-B-46-4553, JP-B-52-34492, and the like, such as selenious acid, selenocyanate, selenazoles, and selenides may also be used. Particularly, phosphine selenides, selenoureas, and selenocyanate are preferred.

In the tellurium sensitization, a labile tellurium compound is used. The labile tellurium compounds described in JP-A-4-224595, JP-A-4-271341, JP-A-4-333043, JP-A-5-303157, JP-A-6-27573, JP-A-6-175258, JP-A-6-180478, JP-A-6-208186, JP-A-6-208184, JP-A-6-317867, JP-A-7-140579, JP-A-7-301879, JP-A-7-301880, and the like can be used.

Specifically, phosphine tellurides (e.g., butyl-diisopropylphosphine telluride, tributylphosphine telluride, tributoxyphosphine telluride, ethoxy-diphenylphosphine telluride), diacyl (di)tellurides (e.g., bis(diphenylcarbamoyl) ditelluride, bis(N-phenyl-N-methylcarbamoyl) ditelluride, bis(N-phenyl-N-methylcarbamoyl) telluride, bis(N-phenyl-N-benzylcarbamoyl) telluride, bis-(ethoxycarbonyl)telluride), telluroureas (e.g., N,N'-dimethylethylenetellurourea and N,N'-diphenylethylenetellurourea), telluroamides, telluro esters, and the like may be used. Particularly, diacyl (di) tellurides and phosphine tellurides are preferred. Particularly, the compounds described in the literature shown in JP-A-11-65021, paragraph No. 0030, and the compounds expressed by the formulae (II), (III), and (IV) in JP-A-5-313284 are more preferred.

In particular, in the chalcogen sensitization of this embodiment, the selenium sensitization and the tellurium sensitization are preferred, and the tellurium sensitization is particularly preferred.

In the gold sensitization, the gold sensitizers described in *Chimie et Physique Photographique*, written by P. Glafkides, (published by Paul Montel Co., 1987, the 5th edition), and *Research Disclosure,* vol. 307, No. 307105 are usable. Specifically, they are chloroauric acid, potassium chloroaurate, potassium auric thiocyanate, gold sulfide, gold selenide, and the like. In addition to these, the gold compounds described in U.S. Pat. Nos. 2,642,361, 5,049,484, 5,049,485, 5,169,751 and 5,252,455, and Belgian Patent No. 691,857, and the like are also usable. Whereas, salts of a noble metal such as platinum, palladium, and iridium, other than the gold described in *Chimie et Physique Photographique*, written by P. Glafkides, (published by Paul Montel Co., 1987, the 5th edition), and *Research Disclosure*, vol. 307, No. 307105, may also be used.

The gold sensitization can also be used alone. However, it is preferably used in combination with the chalcogen sensitization. Specifically, gold sulfur sensitization, gold selenium sensitization, gold tellurium sensitization, gold sulfur selenium sensitization, gold sulfur tellurium sensitization, gold selenium tellurium sensitization, and gold sulfur selenium tellurium sensitization are preferred.

In this embodiment, any timing is acceptable for the chemical sensitization so long as the timing is after grain formation and before coating. The timing maybe after desalting, and (1) before spectral sensitization, (2) simultaneously with spectral sensitization, (3) after spectral sensitization, (4) immediately before coating, or the like.

The amount of the chalcogen sensitizer for use in this embodiment varies according to the silver halide grains to be used, the chemical aging conditions, and the like. It is used in an amount of about $10^{-8}$ to $10^{-1}$ mol, and preferably $10^{-7}$ to $10^{-2}$ mol per mole of silver halide.

Similarly, the amount of the gold sensitizer for use in this embodiment to be added varies according to various conditions. It is, as a guideline, $10^{-7}$ mol to $10^{-2}$ mol, and more preferably $10^{-6}$ mol to $5 \times 10^{-3}$ mol per mole of silver halide As the environmental conditions for the chemical sensitization of the emulsion, any conditions are selectable. However, the conditions are as follows. The pAg is 8 or less, preferably 7.0 or less, more preferably 6.5 or less, and particularly 6.0 or less, and the pAg is 1.5 or more, preferably 2.0 or more, and in particular preferably 2.5 or more. The pH is 3 to 10, and preferably 4 to 9, and the temperature is 20 to 95° C., and preferably about 25 to 80° C.

In this embodiment, in addition to the chalcogen sensitization and the gold sensitization, a reduction sensitization may also be used in combination. It is in particular preferably used in combination with the chalcogen sensitization. As the specific compounds for a reduction sensitization process, ascorbic acid, thiourea dioxide, and dimethylamineborane are preferred. In addition, stannous chloride, aminoiminomethane sulfinic acid, hydrazine derivatives, borane compounds, silane compounds, polyamine compounds, and the like are preferably used. The reduction sensitizer may be added in any process of the light-sensitive emulsion manufacturing steps of from the crystal growth until the preparation step immediately before coating. Whereas, the emulsion is also preferably aged with the pH held at 8 or more, or with the pAg held at 4 or less, so that reduction sensitization is performed. The reduction sensitization is also preferably performed by introducing the single addition part of silver ion during grain formation.

Similarly, the amount of the reduction sensitizer to be added varies according to various conditions. It is, as a guideline, $10^{-7}$ mol to $10^{-1}$ mol, and more preferably $10^{-6}$ mol to $5 \times 10^{-2}$ mol per mole of silver halide To the silver halide emulsion for use in this embodiment, a thiosulfonic acid compound may also be added with the method described in EP-A No. 293,917.

It is preferable from the viewpoint of designing a high-sensitivity photothermographic material that the light-sensitive silver halide grains in this embodiment have been chemically sensitized by at least one process of the gold sensitization and the chalcogen sensitization.

9) Compound Capable of Being One-electron Oxidized to Become a One-electron Oxidation Product, and Releasing One or More Electrons The photothermographic material in this embodiment preferably contains a compound capable of being one-electron oxidized to become a one-electron oxidation product, and releasing one or more electrons. The compound can be used alone, or in combination with the foregoing various chemical sensitizers, which brings about an increase in sensitivity of silver halide.

The compound capable of being one-electron oxidized to become a one-electron oxidation product, and releasing one or more electrons to be contained in the photothermographic material of this embodiment is a compound selected from the following compounds of types 1 to 5.

(Type 1)

Compound capable of being one-electron oxidized to become a one-electron oxidation product, and subsequently undergoing a bond cleavage reaction to further release two or more electrons (Type 2)

Compound capable of being one-electron oxidized to become a one-electron oxidation product, and subsequently undergoing a bond cleavage reaction to further release another electron, and having two or more silver halide adsorbing groups in the same molecule;

(Type 3)

Compound capable of being one-electron oxidized to become a one-electron oxidation product, subsequently undergoing a bond formation process, and then, further releasing one or more electrons;

(Type 4)

Compound capable of being one-electron oxidized to become a one-electron oxidation product, subsequently undergoing a ring cleavage reaction in the molecule, and then, further releasing one or more electrons;

(Type 5)

Compound represented by X-Y, wherein X denotes a reducing group and Y denotes a leaving group, capable of being one-electron oxidized at the reducing group represented by X to become a one-electron oxidation product, subsequently undergoing the cleavage reaction of the X-Y bond to release Y, thereby producing an X radical, and further releasing another electron therefrom.

Out of the compounds of the type 1, and types 3 to 5, a "compound having a silver halide adsorbing group in the molecule" or a "compound having a partial structure of a spectral sensitizing dye in the molecule" is preferred. It is more preferably the "compound having a silver halide adsorbing group in the molecule". Each compound of types 1 to 4 is more preferably a "compound having two or more mercapto group-substituted nitrogen-containing heterocyclic groups as adsorbing groups".

The compounds of types 1 to 4 of this embodiment are the same as the compounds explained in details respectively in JP-A-2003-114487, JP-A-2003-114486, JP-A-2003-140287, JP-A-2003-75950, JP-A-2003-114488, and Japanese Patent applications No. 2003-25886 and 2003-33446. The specific examples of the compounds described in the specifications of these patent applications can also be mentioned as specific examples of the compounds of types 1 to 4 of the invention. The synthetic examples of the compounds of types 1 to 4 of this embodiment are also the same as those described in these patents.

Specific examples of the compound of type 5 of this embodiment may further include the compounds, as they are, referred to as "one-photon two-electron sensitizers" or "deprotonating electron donating sensitizers" described in the patent publication of JP-A-9-211769 (compounds PMT-1 to S-37 described in tables E and F on pages 28 through 32), JP-A-9-211774 and JP-A-11-95355 (compounds INV1 to 36), JP-W-2001-500996 (compounds 1 to 74, 80 to 87, and 92 to 122), U.S. Pat. Nos. 5,747,235 and 5,747,236, EP-A Nos. 786692A1 (compounds INV1 to 35), and 893732A1, U.S. Pat. Nos. 6,054,260 and 5,994,051, and the like.

Each compound of types 1 to 5 of this embodiment may be used at any time during the preparation of a light-sensitive silver halide emulsion and during a photothermographic material manufacturing step. It may be used, for example, at the time of light-sensitive silver halide grain formation, during a desalting step, during a chemical sensitization step, prior to coating, or during other period. Alternatively, the compounds may also be added over a plurality of times during these steps. They are preferably added during the period from completion of the light-sensitive silver halide grain formation until prior to the desalting step, at the time of chemical sensitization (during the period from immediately before the start of chemical sensitization to immediately after the completion thereof), or before coating, and more preferably during the period from the time of chemical sensitization until prior to mixing with non-light-sensitive organic silver salts.

Each compound of types 1 to 5 of this embodiment is preferably dissolved in water or in a water-soluble solvent such as methanol or ethanol, or a mixed solvent thereof, and added. For being dissolved in water, the compound whose solubility increases with an increase or a decrease in pH, may be increased or decreased in pH to be dissolved in water, to be added.

Each compound of types 1 to 5 of this embodiment is preferably used in an emulsion layer containing a light-sensitive silver halide and a non-light-sensitive organic silver salt. It is also acceptable that the compound is added to a protective layer or an intermediate layer, in addition to the emulsion layer containing a light-sensitive silver halide and a non-light-sensitive organic silver salt, and allowed to disperse therein at the time of coating. Each compound of this embodiment may be added either before or after addition of the sensitizing dye, and is incorporated into the silver halide emulsion layer preferably in a proportion of $1 \times 10^{-9}$ to $5 \times 10^{-1}$ mol, and more preferably $1 \times 10^{-8}$ to $5 \times 10^{-2}$ mol per mole of silver halide.

10) Adsorptive Redox Compound Having an Adsorbing Group and a Reducing Group

In this embodiment, an adsorptive redox compound having a silver halide adsorbing group and a reducing group in the molecule is preferably contained. The adsorptive redox compound of this embodiment is preferably a compound represented by the following formula (I):

A-(W)n-B    Formula (I)

[where in the formula (I), A denotes a silver halide adsorbable group (hereinafter, referred to as an adsorbing group); W denotes a divalent linking group; n denotes 0 or 1; and B denotes a reducing group.]

In the formula (I), the adsorbing group represented by A is a group directly adsorbing to a silver halide or a group promoting adsorption to a silver halide. Specifically, mention may be made of a mercapto group (or a salt thereof), a thione group (—C(=S)—), a heterocyclic group containing at least one atom selected from a nitrogen atom, a sulfur atom, a selenium atom, and a tellurium atom, a sulfide group, a disulfide group, a cationic group, an ethynyl group, or the like.

A mercapto group (or a salt thereof) as an adsorbing group denotes a mercapto group (or a salt thereof) itself, and at the same time, more preferably, denotes a heterocyclic group, an aryl group, or an alkyl group substituted with at least one mercapto group (or salt thereof). The heterocyclic group herein denotes at least a 5-membered to 7-membered, monocyclic or condensed, aromatic or nonaromatic heterocyclic group. Examples thereof may include an imidazole ring group, a thiazole ring group, an oxazole ring group, a benzimidazole ring group, a benzothiazole ring group, a benzoxazole ring group, a triazole ring group, a thiadiazole ring group, an oxadiazole ring group, a tetrazole ring group, a purine ring group, a pyridine ring group, a quinoline ring group, an isoquinoline ring group, a pyrimidine ring group, and a triazine ring group. A heterocyclic group containing a quaternized nitrogen atom may also be acceptable, and in this case, it is also acceptable that a substituted mercapto group undergoes dissociation to give mesoion. When a mercapto group forms a salt, as counter ions, mention may be made of cations of alkali metals, alkaline earth metals, and heavy metals ($Li^+$, $Na^+$, $K^+$, $Mg^{2+}$, $Ag^+$, $Zn^{2+}$, and the like), ammonium ions, heterocyclic groups containing a quaternized nitrogen atom, phosphonium ions, and the like.

The mercapto group as an adsorbing group may further undergo tautomerization, thereby to become a thione group.

The thione group as an adsorbing group includes a chain or cyclic thioamido group, thioureido group, thiourethane group, or dithiocarbamic acid ester group.

The heterocyclic group which contains at least one atom selected from a nitrogen atom, a sulfur atom, a selenium atom, and a tellurium atom as an adsorbing group is a nitrogen-containing heterocyclic group having an —NH— group capable of forming imino silver (>NAg) as a partial structure of the heterocyclic ring, or a heterocyclic group having an "—S—" group, an "—Se—" group, a "—Te—" group, or an "=N—" group capable of coordinating with silver ion through a coordinate bond as the partial structure of the heterocyclic ring. Examples of the former group may include a benzotriazole group, a triazole group, an indazole group, a pyrazole group, a tetrazole group, a benzimidazole group, an imidazole group, and a purine group. Whereas, examples of the latter group may include a thiophene group, a thiazole group, an oxazole group, a benzothiophene group, a benzothiazole group, a benzoxazole group, a thiadiazole group, an oxadiazole group, a triazine group, a selenazole group, a benzoselenazole group, a tellurazole group, and a benzotellurazole group.

The sulfide groups or the disulfide groups as adsorbing groups include all the groups having a partial structure of "—S—" or "—S—S—".

The cationic group as an adsorbing group denotes a group containing a quaternized nitrogen atom, and specifically, a group including an ammonio group or a nitrogen-containing heterocyclic group containing a quaternized nitrogen atom. Examples of the nitrogen-containing heterocyclic group containing a quaternized nitrogen atom may include a pyridinio group, a quinolinio group, an isoquinolinio group, and an imidazolio group.

The ethynyl group as an adsorbing group denotes a —C≡CH group, where the hydrogen atom may also be substituted.

The adsorbing group may have any given substituent.

Further, specific examples of the adsorbing group may include the ones described on pages 4 through 7 in the specification of JP-A-11-95355.

The adsorbing group denoted by A in the formula (I) is preferably a mercapto-substituted heterocyclic group (e.g., a 2-mercaptothiadiazole group, a 2-mercapto-5-aminothiadiazole group, a 3-mercapto-1,2,4-triazole group, a 5-mercaptotetrazole group, a 2-mercapto-1,3,4-oxadiazole group, a 2-mercaptobenzimidazole group, a 1,5-dimethyl-1,2,4-triazolium-3-thiolate group, 2,4-dimercaptopyrimidine group, 2,4-dimercaptotriazine group, 3,5-dimercapto-1,2,4-triazole group, or 2,5-dimercapto-1,3-thiazole group), or a nitrogen-containing heterocyclic group having an —NH— group capable of forming imino silver (>NAg) as a partial structure of the heterocyclic ring (e.g., a benzotriazole group, a benzimidazole group, or an indazole group). The more preferred adsorbing groups are a 2-mercaptobenzimidazole group and a 3,5-dimercapto-1,2,4-triazole group.

In the formula (I), W denotes a divalent linking group. Any linking groups are acceptable so long as they do not adversely affect the photographic characteristics. For example, divalent linking groups comprising a carbon atom, a hydrogen atom, an oxygen atom, a nitrogen atom, and a sulfur atom are available. Specifically, mention may be made of an alkylene group having 1 to 20 carbon atoms (e.g., a methylene group, an ethylene group, a trimethylene group, a tetramethylene group, or a hexamethylene group), an alkenylene group having 2 to 20 carbon atoms, an alkynylene group having 2 to 20 carbon atoms, an arylene group having 6 to 20 carbon atoms (e.g., a phenylene group or a naphthylene group), —CO—, —$SO_2$—, —O—, —S—, or —$NR_1$—, or a combination of these linking groups, or the like. Herein, $R_1$ denotes a hydrogen atom, an alkyl group, a heterocyclic group, or an aryl group. The linking group represented by W may have any given substituent.

In the formula (I), the reducing group represented by B denotes a group capable of reducing a silver ion. Examples thereof may include: a formyl group, an amino group, a triple bond group such as an acetylene group or a propargyl group, a mercapto group, and residues prepared by removing one hydrogen atom from hydroxylamines, hydroxamic acids, hydroxyureas, hydroxyurethanes, hydroxysemicarbazides, reductons (including reducton derivatives), anilines, phenols (including chroman-6-ols, 2,3-dihydrobenzofuran-5-ols, aminophenols, sulfonamindophenols, and polyphenols such as hydroquinones, catechols, resorcinols, benzentriols, and bisphenols), acylhydrazines, carbamoylhydrazines, 3-pyrazolidone, and the like. Of course, these may have any given substituents.

The reducing group represented by B in the formula (I) can be measured for the oxidation potential using the measurement method described in *DENKI KAGAKU SOKUTEIHOU* authored by Akira Fujishima (pages 150 to 208, published by GIHODO Publisher's Co.), or in *JIKKEN KAGAKU KOZA* (*Courses in Experimental Chemistry*) 4th ed., (vol. 9, pages 282 to 344, Maruzen) edited and authored by the Chemical Society of Japan. For example, with a technique of rotating disk voltammetry, specifically, a sample is dissolved in a solution of methanol:pH6.5 Britton-Robinson buffer=10%:90% (% by volume), and a nitrogen gas is passed through the solution for 10 minutes. Then, a rotating disk electrode (RDE) made of glassy carbon is used as a working electrode, a platinum wire is used as a counter electrode, and a saturated calomel electrode is used as a reference electrode. Thus, a measurement is carried out at 25° C., 1000 revolutions/min, and a sweep rate of 20 mV/sec. The half-wave potential (E1/2) can be determined from the voltammogram obtained.

When the reducing group represented by B of this embodiment is measured with the foregoing measurement method, it has an oxidation potential of preferably in the range of about −0.3 V to about 1.0 V, more preferably in the range of about −0.1 V to about 0.8 V, and in particular preferably in the range of about 0 to about 0.7 V.

In the formula (I), the reducing group denoted by B is preferably a residue prepared by removing one hydrogen atom from hydroxylamines, hydroxamic acids, hydroxyureas, hydroxysemicarbazides, reductons, phenols, acylhydrazines, carbamoylhydrazines, and 3-pyrazolidones.

Below, specific examples of the reducing group denoted by B will be shown. However, this embodiment is not limited thereto. Herein, the mark * denotes the position at which the group is linked to A or W.

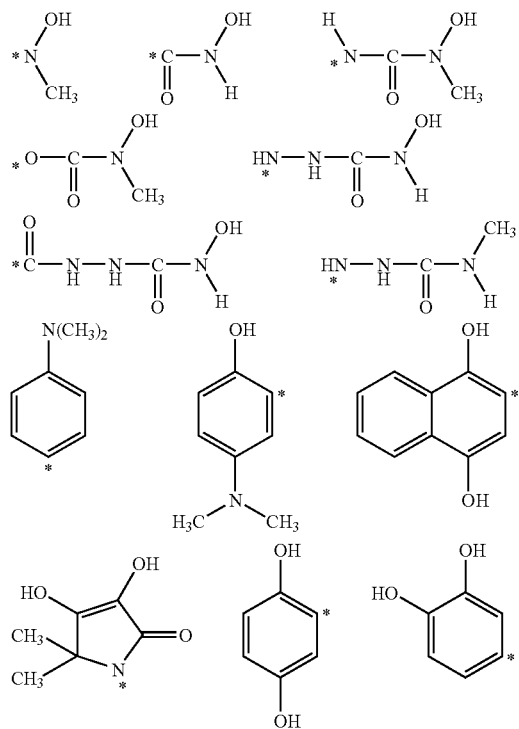

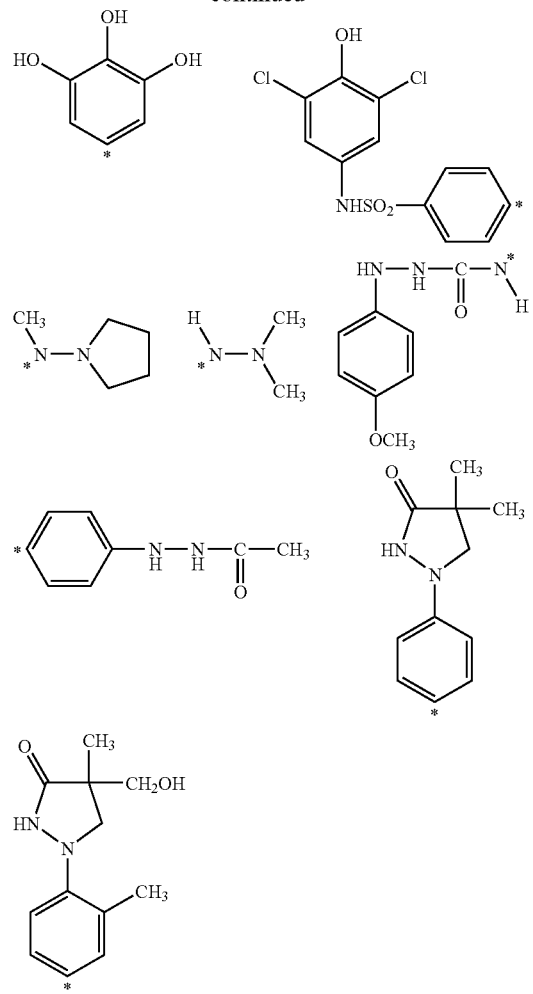

The compounds of the formula (I) of this embodiment may also be the compounds each incorporating therein a ballast group or a polymer chain which is commonly used in an immobile photographic additive such as a coupler. As the polymers, mention may be made of the ones described in, for example, JP-A-1-100530.

The compounds of the formula (I) of this embodiment may also each be a bis form or a tris form. The compounds of the formula (I) of this embodiment have a molecular weight of preferably between 100 and 10000, more preferably between 120 and 1000, and in particular preferably 150 and 500.

The adsorptive redox compound having a silver halide adsorbing group and a reducing group in the molecule of this embodiment are the same as the compounds described in details in Japanese Patent Application Nos. 2002-328531 and 2002-379844. The specific compound examples of the adsorptive redox compound having a silver halide adsorbing group and a reducing group in the molecule described in these patent application specifications may also be mentioned as the specific examples of the compounds of this embodiment.

The compounds of this embodiment can be synthesized with ease according to known methods.

The compounds of the formula (I) of this embodiment may be singly used alone, or may also preferably used in combination of two or more of the compounds simultaneously. When two or more of the compounds are used simultaneously, these may be either added to the same layer, or added to different layers, and each may be added with a different method.

The compounds of the formula (I) of this embodiment are preferably added to a silver halide emulsion layer, and more preferably added during the preparation of the emulsion. When they are added during the preparation of the emulsion, it is possible to add them at any timing during the step. Examples of the timing may include: during silver halide grain formation step, before the start of a desalting step, during the desalting step, before the start of chemical aging, during chemical aging step, and during a step prior to complete emulsion preparation. Alternatively, the compounds may also be added over a plurality of times during these steps. Whereas, they are preferably used in the emulsion layer. However, they may also be added to the emulsion layer, and to the adjacent protective layer or intermediate layer together, to be dispersed therein during coating.

The preferred amount of the compounds to be added largely depends upon the foregoing addition method or the compound species to be added. However, in general, it is $1 \times 10^{-6}$ mol to 1 mol, preferably $1 \times 10^{-5}$ to $5 \times 10^{-1}$ mol, and further preferably $1 \times 10^{-4}$ to $1 \times 10^{-1}$ mol per mole of light-sensitive silver halide.

The compound of the formula (I) of this embodiment may be dissolved in water or a water-soluble solvent such as methanol or ethanol, or a mixed solvent thereof, and added. In this step, it may be properly adjusted in pH by an acid or a base, and a surfactant may also be allowed to be present therein. Further, it may also be dissolved in a high boiling organic solvent, and added in an emulsified dispersion form. Alternatively, it may also be added in a solid dispersion.

11) Sensitizing Dye

As sensitizing dyes applicable to this embodiment, the sensitizing dyes can be advantageously selected which are capable of spectrally sensitizing silver halide grains in a desirable wavelength region upon adsorbing on the silver halide grains, and have the spectral sensitivities suitable for the spectral characteristics of an exposure light source. It is preferable that the photothermographic material of this embodiment has been spectrally sensitized so as to have a spectral sensitivity peak at particularly 600 nm or more and 900 nm or less, or 300 nm or more and 500 nm or less. The sensitizing dyes and the addition processes thereof are described in the following references, or as the following substances: paragraph Nos. 0103 to 0109 of JP-A-11-65021, the compounds represented by the formula (II) in JP-A-10-186572, the dyes represented by the formula (I) and the paragraph No. 0106 of JP-A-11-119374, U.S. Pat. No. 5,510,236, the dyes described in Example 5 of U.S. Pat. No. 3,871,887, JP-A-2-96131, the dyes disclosed in JP-A-59-48753, on page 19, line 38 to page 20, line 35 of EP NO. 0803764A1, Japanese Patent Application Nos. 2000-86865, 2000-102560, and 2000-205399, and the like. These sensitizing dyes may be used alone, or may also be used in combination of two or more thereof.

The amount of the sensitizing dye to be added in this embodiment can be set at a desirable amount according to the sensitivity and the fog performance. It is preferably $10^{-6}$ to 1 mol, and more preferably $10^{-4}$ to $10^{-1}$ mol per mole of silver halide of the light-sensitive layer.

In this embodiment, it is possible to use a super sensitizer in order to improve the spectral sensitization efficiency. As the supersensitizers for use in this embodiment, mention may be made of the compounds described in EP No. 587,338, U.S. Pat Nos. 3,877,943 and 4,873,184, JP-A-5-341432, JP-A-11-109547, JP-A-10-111543, and the like.

12) Use of Silver Halides in Combination

The light-sensitive silver halide emulsions in the photothermographic material for use in this embodiment may be used alone, or in combination of two or more thereof (e.g., the ones having different average grain sizes, the ones having different halogen compositions, the ones having different crystal habits, and the ones requiring different conditions for chemical sensitization). By using a plurality of kinds of light-sensitive silver halides mutually different in sensitivity, it is possible to adjust the gradation. As the techniques on these, mention may be made of JP-A-57-119341, JP-A-53-106125, JP-A-47-3929, JP-A-48-55730, JP-A-46-5187, JP-A-50-73627, and JP-A-57-150841, and the like. As for the sensitivity difference, a difference of 0.2 logE or more is preferably caused between respective emulsions.

13) Mixing of Silver Halide and Organic Silver Salt

It is particularly preferable that the grains of the light-sensitive silver halide of this embodiment are formed and chemically sensitized in the absence of a non-light-sensitive organic silver salt. This is for the following reason. With the method in which silver halide is formed by adding a halogenating agent to an organic silver salt, sufficient sensitivity cannot be implemented in some cases.

As a method of mixing the silver halide and the organic silver salt, mention may be made of a method of mixing the light-sensitive silver halide and organic silver salt, which have been separately prepared, in a high-speed stirrer, a ball mill, a sand mill, a colloid mill, a shaking mill, a homogenizer, or the like; a method of mixing the light-sensitive silver halide which has been completely prepared at any timing during the preparation of an organic silver salt, and preparing an organic silver salt; or other methods. Even with any method, it is possible to preferably obtain the effects of this embodiment.

14) Mixing of Silver Halide to Coating Solution

The preferred timing of adding the silver halide of this embodiment into an image forming layer coating solution is in the period of from 180 minutes before to immediately before, and preferably 60 minutes before to 10 seconds before coating. However, the mixing process and the mixing conditions have no particular restriction so long as the effects of this embodiment satisfactorily occur. As specific mixing processes, there are a method in which the mixing is performed in a tank configured such that the mean residence time therein calculated from the addition flow rate and the feeding amount to a coater becomes a desirable time; a method using a static mixer described in Chapter 8 of *Ekitai Kongo Gijutsu* written by N. Harnby, M. F. Edwards, and A. W. Nienow, translated by Koji Takahashi, (published by Nikkan Kogyo Shinbunsha, 1989); and the like.

(Explanation of Organic Silver Salt)

The non-light-sensitive organic silver salt usable in this embodiment is a silver salt, which is relatively stable to light, and forms a silver image when heated to 80° or higher in the presence of a light-sensitive silver halide exposed to light and a reducing agent. The organic silver salt may be a given organic substance containing a source capable of reducing silver ions. Such non-light-sensitive organic silver salts are described in paragraph Nos. 0048 to 0049 of JP-A-10-62899, on page 18, line 24 to page 19, line 37 of EP No. 0803764A1, EP No. 0962812A1, JP-A-11-349591, JP-A-2000-7683, JP-A-2000-72711, and the like. A silver salt of an organic acid, particularly, the silver salt of a long chain aliphatic carboxylic acid (having 10 to 30, preferably 15 to 28 carbon atoms) is preferred. Preferred examples of the organic silver salt include silver behenate, silver arachidinate, silver stearate, silver oleate, silver laurate, silver caproate, silver myristate, and silver palmitate, and mixtures thereof. In this embodiment, out of these organic silver salts, it is preferable to use an organic acid silver having a silver behenate content of 50 mol % or more and 100 mol % or less. In particular, it is preferable that the silver behenate content is 75 mol % or more and 98 mol % or less.

The organic silver salt usable in this embodiment has no particular restriction on its shape, and it may have any of needle-shaped, rod-shaped, tabular, and scaly forms.

In this embodiment, a scaly organic silver salt is preferred. In this specification, the scaly organic silver salt is defined as follows. The organic silver salt is observed by means of an electronic microscope, and the shape of the organic silver salt particle is approximated to a rectangular parallelepiped. When the sides of the rectangular parallelepiped are taken as a, b, and c in the order from the shortest (c may be equal to b), x is calculated from the shorter numerical values, a and b, and determined as follows.

$$x = b/a$$

Thus, x is determined for each of about 200 particles in this manner, and when the average value is taken as x (average), those satisfying the relationship: x (average) $\geq 1.5$, are regarded as scaly particles. Preferably, $30 \geq x$ (average) $\geq 1.5$, and more preferably, $15 \geq x$ (average) $\geq 1.5$. In this connection, needle-shaped particles satisfy the relation: $1 \leq x$ (average) $< 1.5$.

In a scaly particle, a can be regarded as the thickness of a tabular particle having a plane with sides of b and c as the main plane. The average of a is preferably 0.01 μm or more and 0.3 μm or less, and more preferably 0.1 μm or more and 0.23 μm or less. The average of c/b is preferably 1 or more and 6 or less, more preferably 1 or more and 4 or less, furthermore preferably 1 or more and 3 or less, and in particular, preferably 1 or more to 2 or less.

It is preferable that the particle size distribution of the organic silver salt is monodispersed. Being "monodispersed" corresponds to the case where the percentage of a value, obtained by dividing the standard deviations of their respective lengths of a minor axis and a major axis by the lengths of the minor axis and the major axis, respectively, is preferably 100% or less, more preferably 80% or less, and furthermore preferably 50% or less. The shape of an organic silver salt can be determined from a transmission electron microscope image of the organic silver salt dispersion. As another method for determining the monodispersibility, there is a determination method based on the standard deviation of the volume weight average diameter of an organic silver salt. The percentage of the value obtained by dividing the standard deviation by the volume weight average diameter (coefficient of variation) is preferably 100% or less, more preferably 80% or less, and furthermore preferably 50% or less. For example, the monodispersibility can be determined from the particle size (volume weight average diameter) obtained by irradiating an organic silver salt dispersed in a solution with a laser light, and determining the autocorrelation function of fluctuation of scattered light on the basis of the change in time.

To the manufacturing and dispersion methods of the organic acid silver for use in this embodiment, known methods and the like can be applied. For example, the following references can serve as references: JP-A-10-62899, EP No. 0803763A1, EP No. 0962812A1, JP-A-11-349591, JP-A-2000-7683, JP-A-2000-72711, JP-A-2001-163827, JP-A-2001-163889 to 90, JP-A-11-203413, JP-A-2001-188313, JP-A-2001-83652, JP-A-2002-6442, JP-A-2002-31870, and JP-A-2001-107868.

In this embodiment, it is possible to manufacture the light-sensitive material by mixing an aqueous dispersion of the organic silver salt and an aqueous dispersion of the light-sensitive silver salt. For mixing, it is a method preferably used for adjusting the photographic characteristics that two or more kinds of aqueous dispersions of organic silver salts and two or more kinds of aqueous dispersions of light-sensitive silver salts are mixed.

The organic silver salt of this embodiment can be used in a desirable amount. It is used in an amount of, preferably 0.1 to 5 g/m$^2$, and more preferably 1 to 3 g/m$^2$ in terms of the silver amount. In particular, it is preferably used in an amount of 1.2 to 2.5 g/m$^2$.

(Nucleating Agent)

The photothermographic material according to the invention preferably contains a nucleating agent.

The nucleating agent according to the invention denotes a compound capable of forming a compound capable of additionally inducing development by reaction with the development product as a result of initial development. Heretofore, use of a nucleating agent to a super-hard light sensitive material suitable to print making application has been known. The super-hardlight sensitive material has an average gradation of 10 or more and thus is not suitable to light sensitive materials for general photographic use and, particularly, is not suitable to medical use requiring high diagnosis performance. Further, since the super-hard light sensitive material is rough in the grain size and lacks in the sharpness, it has no adaptability at all in the medical diagnosis application. The nucleating agent according to the invention is quite different, in view of the effect, from existent nucleating agents in the super-hard light sensitive material. The nucleating agent according to the invention does not harden gradation. The nucleating agent of the invention is a compound capable of sufficiently causing development to the non-light sensitive organic silver salt even when the number of light sensitive silver halide particles is extremely small. While mechanism is not clear, it has been found that the number of developed silver particles is larger than the number of light sensitive silver halide particles at the maximum density area when thermal development is carried out by using the nucleating agent according to the invention and it is estimated that the nucleating agent according to the invention has an effect of forming new development sites (development nuclei) in a portion where silver halide particles are not present.

The nucleating agent used in the invention is identical with the compound described specifically in Japanese Patent Application No. 2004-136053. The examples of the specific compounds described in the patent laid-open specification can also be mentioned as specific examples for the nucleating agent of this embodiment.

Preferred specific compounds among the nucleating agents described above are shown below but the compounds are not limitative.

SH-1

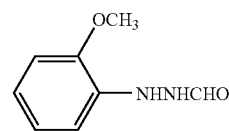

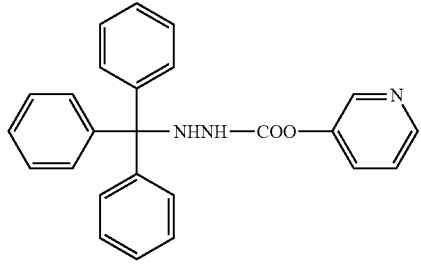
SH-2

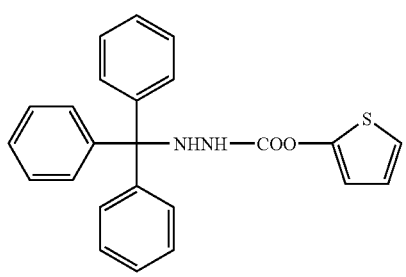
SH-3

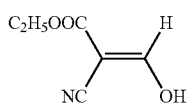
SH-4

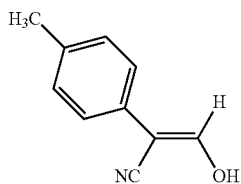
SHO-5

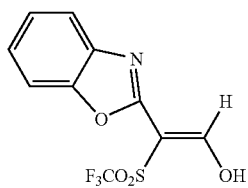
SH-6

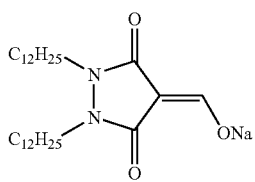
SH-7

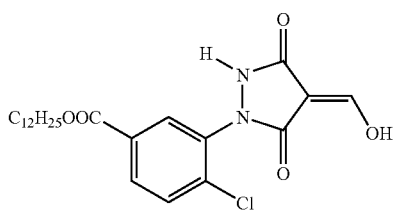
SH-8

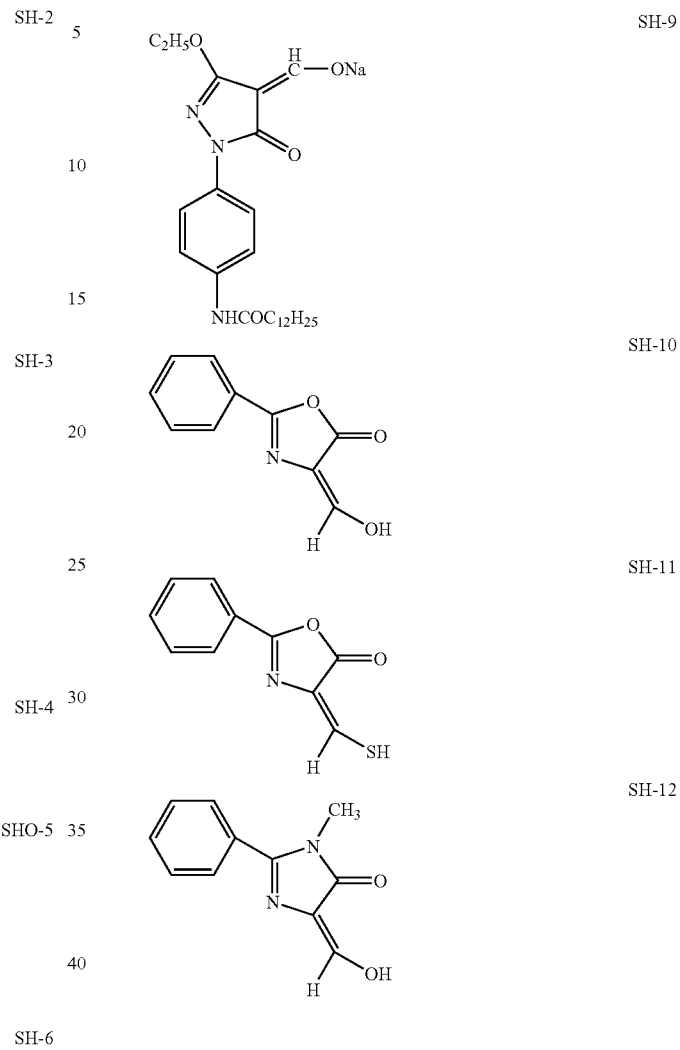

The nucleating agent may be added and incorporated in the coating solution by any method such as in the form of solution, emulsified dispersion, fine solid particle dispersion, etc. and contained in a photothermographic material.

The well known emulsification dispersion method can include, for example, a method of mechanically forming an emulsified dispersion by dissolving while using an oil such as dibutyl phthalate, tricresyl phosphate, dioctyl cebacate or tri(2-ethylhexyl) phosphate or an auxiliary solvent such as ethyl acetate or cyclohexanone, and adding a surfactant such as sodium dodecyl benzene sulfonate, sodium oleoyl-N-methyl taurinate, or sodium di(2-ethylhexyl) sulfosuccinate.

In this case, it is also preferred to add a polymer such as α methyl styrene oligomer or poly(t-butyl acryl amide) for the purpose of controlling the viscosity and the refractive index of oil droplets.

Further, the fine solid particle dispersion method can include a method of dispersing a powder of a nucleating agent in an appropriate solvent such as water by a ball mill, colloid mill, vibration ball mill, sand mill, jet mill, roller mill or supersonic waves thereby preparing a solid dispersion. In this case, a protection colloid (for example, polyvinyl alcohol), a surfactant (for example, anionic surfactant such as sodium triisopropyl naphthalene sulfonate (mixture of those having different substitution positions of three isopropyl groups)) may also be used. In the mills described above, beads, for example, of zirconia are used generally as the dispersion medium, and Zr or the like leaching from the beads may sometimes be intruded into the dispersion while depending on the dispersion condition, it is usually within a range from 1 ppm to 1000 ppm. If the content of Zr in the photosensitive material is 0.5 mg or less per 1 g of the silver, it causes no practical problem.

The liquid dispersion is preferably incorporated with a corrosion inhibitor (for example, sodium salt of benzoisothiazolinone).

The solid particle dispersion method is most preferred for the nucleating agent and it is desirably added as fine particles with an average grain size of from 0.01 μm to 10 μm, preferably, from 0.05 μm to 5 μm and, more preferably, from 0.1 μm to 2 μm. In the present application, other solid dispersions are preferably used also being dispersed to the grain size within the range described above.

The nucleating agent in the invention can be added to an image forming layer or a layer adjacent with image forming layer and it is preferably added to the image forming layer. The addition amount of the nucleating agent to one mol of an organic solver salt is within a range $10^{-5}$ to 1 mol and, preferably, $10^{-4}$ to $5\times10^{-1}$ mol. The nucleating agent may be added alone or two or more agents may be used together.

In the photothermographic material according to the invention, the image forming layer containing the light sensitive silver halide may have two or more layers and, in a case of two or more of layers, they may contain the nucleating agent in any of the image forming layers. It preferably has at least two image forming layers, that is, an image forming layer containing the nucleating agent and an image forming layer not containing the nucleating agent.

(Reducing Agent)

1) Infectious Developing Reducing Agent

The photothermographic material in the invention preferably contains a infectious developing reducing agent. The infectious developing reducing agent may be any reducing agent so long as it has a function of infectious development.

Preferred infectious developing reducing agent usable in the invention is the compound represented by the following formula (R1).

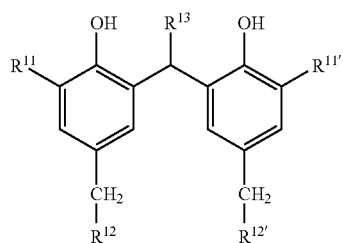

Formula (R1)

In the formula (R1), $R^{11}$ and $R^{11'}$ each represents independently a secondary or tertiary alkyl group having 3 to 20 carbon atoms. $R^{12}$ and $R^{12'}$ each represents independently a hydrogen atom or a group connected by way of a nitrogen, oxygen, phosphorous or sulfur atom. $R^{13}$ represents a hydrogen atom or an alkyl group having 1 to 20 carbon atoms.

The infectious developing reducing agent used in the invention is identical with the compound described specifically in Japanese Patent Application No. 2004-136062. Examples of the specific compounds described in the laid-open specification can also be mentioned as specific examples of the nucleating agent in this embodiment.

Specific examples of the reducing agent represented by the formula (R1) according to the invention are shown below but the invention is not restricted to them.

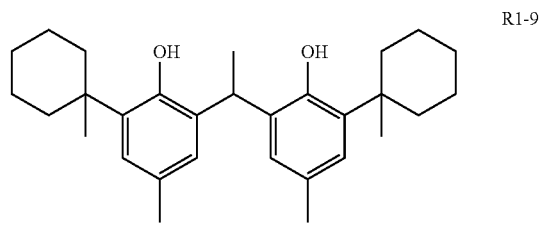

R1-9

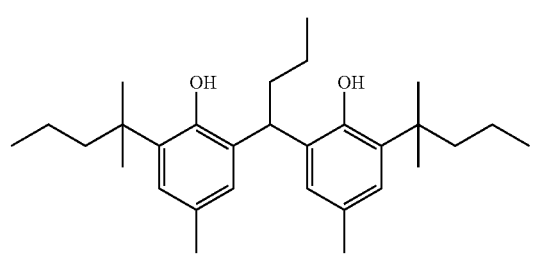

R1-10

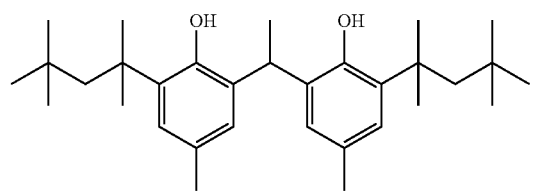

R1-11

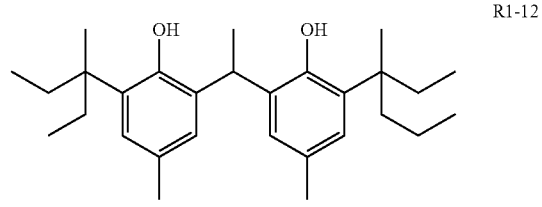

R1-12

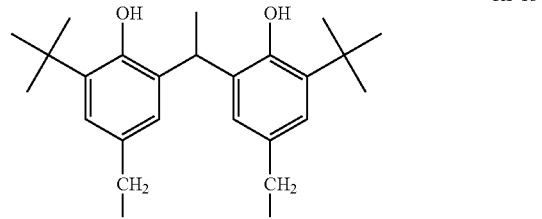

R1-13

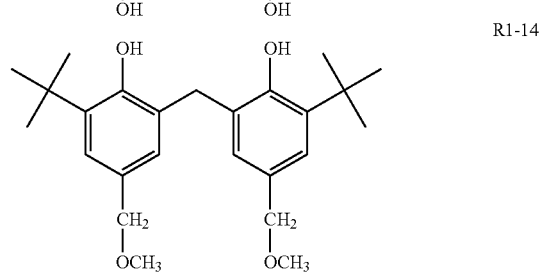

R1-14

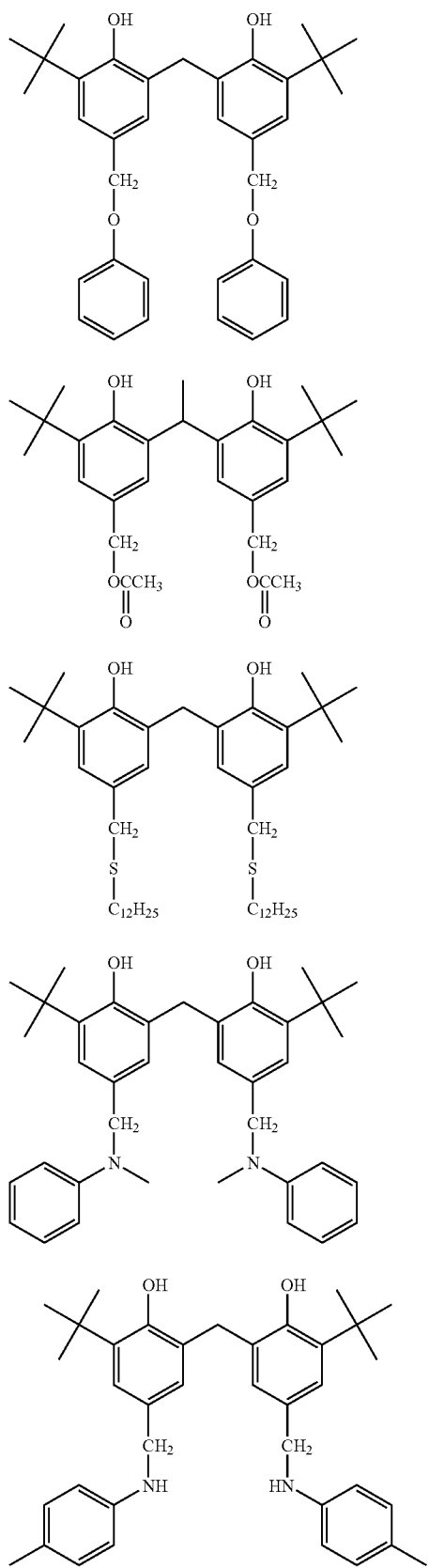
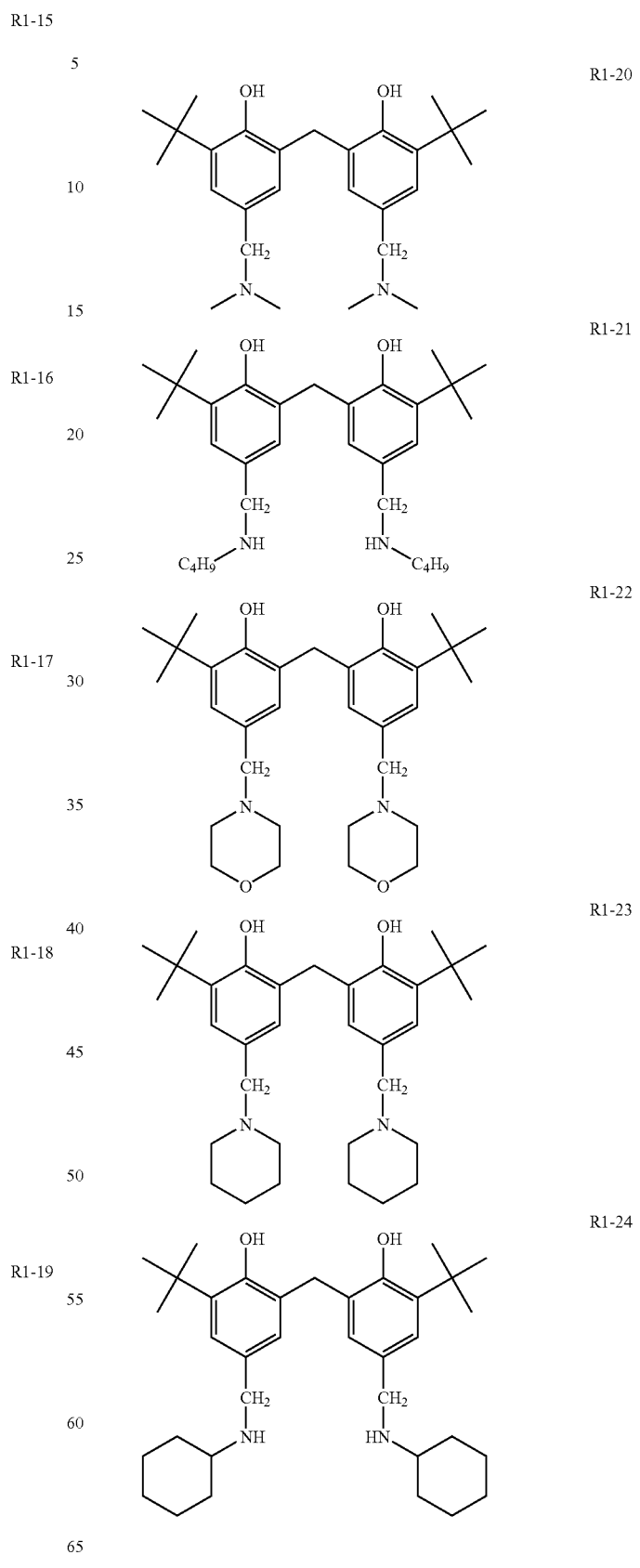

-continued
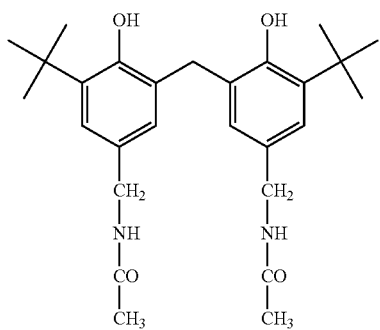
R1-25
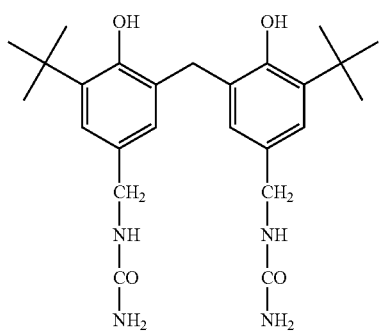
R1-26
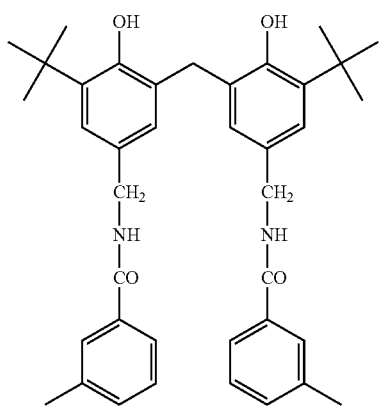
R1-27
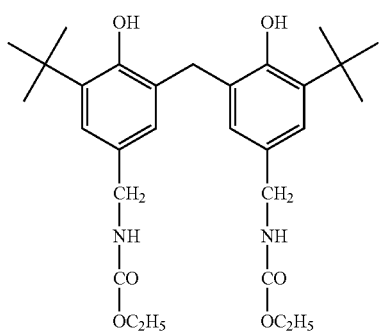
R1-28
-continued
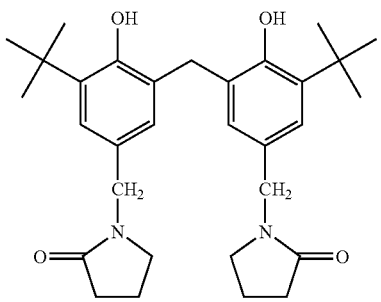
R1-29
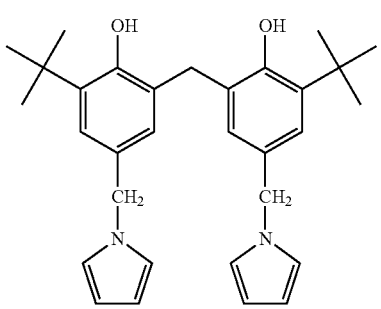
R1-30
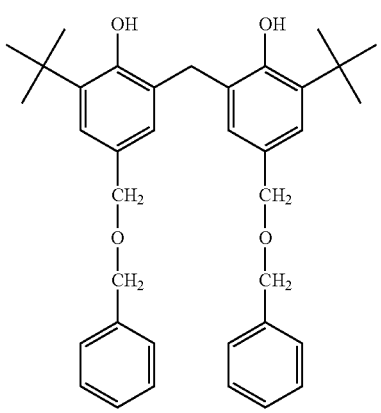
R1-31
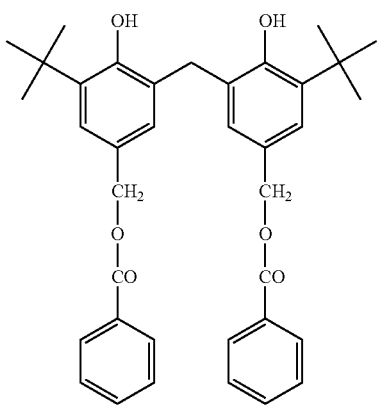
R1-32

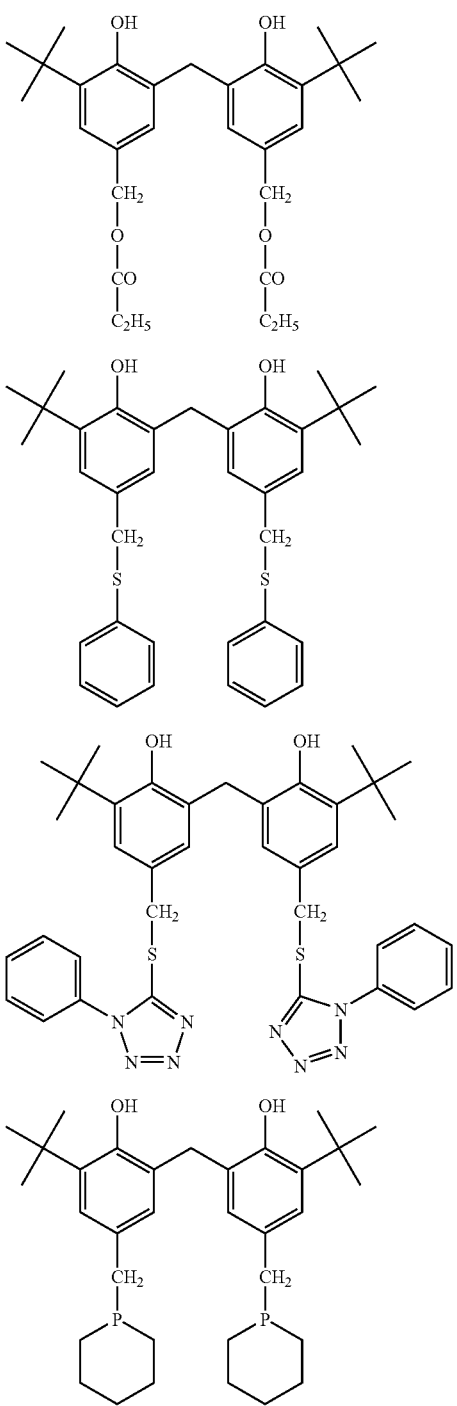

The addition amount of the reducing agent represented by the formula (R1) is preferably, from 0.01 g/m² to 5.0 g/m² and, more preferably from 0.1 g/m² to 3.0 g/m². It is incorporated, preferably, by 5 mol % to 50 mol % and incorporated, preferably from 10 mol % to 40 mol % based on one mol of silver in the surface having the image forming layer.

The reducing agent represented by the formula (R1) is preferably contained in the image forming layer.

Particularly, the reducing agent represented by the formula (R1) is preferably contained in the image forming layer containing a silver halide emulsion at low sensitivity.

2) Reducing Agent

Other reducing agent may also be used together with the reducing agent represented by the formula (R1) in the invention. The reducing agent that can be used together may be any material capable of reducing silver ions into metal silver (preferably, organic material). Examples of the reducing agent are described in JP-A No. 11-65021, column Nos. 0043 to 0045 and in EP-A No. 0803764, p. 7, line 34 to p. 18, line 12.

In this embodiment, preferred reducing agents for use in this embodiment are so-called hindered phenol type reducing agents having substituents at the ortho positions of the phenolic hydroxyl group, or bisphenol type reducing agent. The compounds represented by the following formula (R) are particularly preferred.

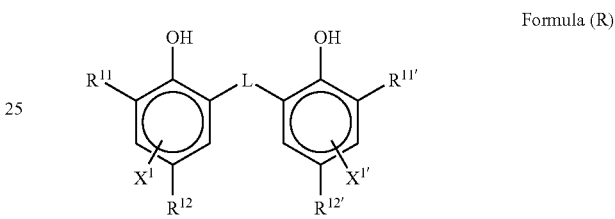

Formula (R)

where in the formula (R), $R^{11}$ and $R^{11'}$ each independently represents an alkyl group having 1 to 20 carbon atoms; $R^{12}$ and $R^{12'}$ each independently represents a hydrogen atom or a substituent substitutable on a benzene ring; L represents a —S— group or a —CHR$^{13}$-group; $R^{13}$ represents a hydrogen atom or an alkyl group having 1 to 20 carbon atoms; and $X^1$ and $X^{1'}$ each independently represents a hydrogen atom or a group substitutable on a benzene ring.

The respective substituents will be described in details.

1) $R^{11}$ and $R^{11'}$ $R^{11}$ and $R^{11'}$ each independently represents a substituted or unsubstituted alkyl group having 1 to 20 carbon atoms. The substituent of the alkyl group has no particular restriction. Preferably, mention may be made of an aryl group, a hydroxy group, an alkoxy group, an aryloxy group, an alkylthio group, an arylthio group, an acylamino group, a sulfonamido group, a sulfonyl group, a phosphoryl group, an acyl group, a carbamoyl group, an ester group, a halogen atom, and the like.

2) $R^{12}$ and $R^{12'}$, and $X^1$ and $X^{1'}$ $R^{12}$ and $R^{12'}$ each independently represents a hydrogen atom, or a group substitutable on a benzene ring.

$X^1$ and $X^{1'}$ also each independently represents a hydrogen atom, or a group substitutable on a benzene ring. As the respective groups substitutable on a benzene ring, preferably, mention may be made of an alkyl group, an aryl group, a halogen atom, an alkoxy group, and an acylamino group.

3) L

L represents a —S— group or a —CHR$^{13}$-group. $R^{13}$ represents a hydrogen atom or an alkyl group having 1 to 20 carbon atoms. The alkyl group may have a substituent. Specific examples of an unsubstituted alkyl group of $R^{13}$ may include: a methyl group, an ethyl group, a propyl group, a butyl group, a heptyl group, an undecyl group, an isopropyl group, a 1-ethylpentyl group, and a 2,4,4-trimethylpentyl group.

Examples of the substituent of an alkyl group may include the same groups as for the substituent of $R^{11}$, and may include a halogen atom, an alkoxy group, an alkylthio group, an aryloxy group, an arylthio group, an acylamino group, a sulfonamido group, a sulfonyl group, a phosphoryl group, an oxycarbonyl group, a carbamoyl group, and a sulfamoyl group.

4) Preferred Substituents $R^{11}$ and $R^{11'}$ are preferably secondary or tertiary alkyl groups each having 3 to 15 carbon atoms. Specifically, mention may be made of an isopropyl group, an isobutyl group, a t-butyl group, a t-amyl group, a t-octyl group, a cyclohexyl group, a cyclopentyl group, a 1-methycyclohexyl group, a 1-methylcyclopropyl group, and the like. $R^{11}$ and $R^{11'}$ are more preferably tertiary alkyl groups each having 4 to 12 carbon atoms. Out of these, a t-butyl group, a t-amyl group, and a 1-methylcyclohexyl group are further preferred, and a t-butyl group is most preferred.

$R^{12}$ and $R^{12'}$ are preferably alkyl groups each having 1 to 20 carbon atoms. Specific examples thereof may include: a methyl group, an ethyl group, a propyl group, a butyl group, an isopropyl group, a t-butyl group, a t-amyl group, a cyclohexyl group, a 1-methylcyclohexyl group, a benzyl group, a methoxymethyl group, and a methoxyethyl group. More preferred are a methyl group, an ethyl group, a propyl group, an isopropyl group, and a t-butyl group.

$X^1$ and $X^{1'}$ are preferably hydrogen atoms, halogen atoms, or alkyl groups, and more preferably hydrogen atoms.

L is preferably a —$CHR^{13}$-group.

$R^{13}$ is preferably a hydrogen atom or an alkyl group having 1 to 15 carbon atoms. The alkyl groups are preferably a methyl group, an ethyl group, a propyl group, an isopropyl group, and a 2,4,4-trimethylpentyl group. $R^{13}$ is in particular preferably a hydrogen atom, a methyl group, a propyl group, or an isopropyl group.

When $R^{13}$ is a hydrogen atom, $R^{12}$ and $R^{12'}$ are preferably alkyl groups each having 2 to 5 carbon atoms. An ethyl group and a propyl group are more preferred, and an ethyl group is most preferred.

When $R^{13}$ is a primary or secondary alkyl group having 1 to 8 carbon atoms, $R^{12}$ and $R^{12'}$ are preferably methyl groups. The primary or secondary alkyl group having 1 to 8 carbon atoms of $R^{13}$ are more preferably a methyl group, an ethyl group, a propyl group, or an isopropyl group, and further preferably a methyl group, an ethyl group, or a propyl group.

When all of $R^{11}$, $R^{11'}$, $R^{12}$ and $R^{12'}$ are methyl groups, $R^{13}$ is preferably a secondary alkyl group. In this case, the secondary alkyl group of $R^{13}$ is preferably an isopropyl group, an isobutyl group, and a 1-ethylpentyl group, and more preferably an isopropyl group.

The reducing agent varies in various heat development performances according to the combination of $R^{11}$, $R^{11'}$, $R^{12}$, $R^{12'}$, and $R^{13}$. It is possible to adjust these heat development performances by combining two or more reducing agents in various mixing ratios. Therefore, the reducing agents are preferably used in combination of two or more kinds thereof according to the intended purpose.

Below, specific examples of the compounds represented by the formula (R) of this embodiment will be shown, but the compounds of this embodiment are not limited thereto.

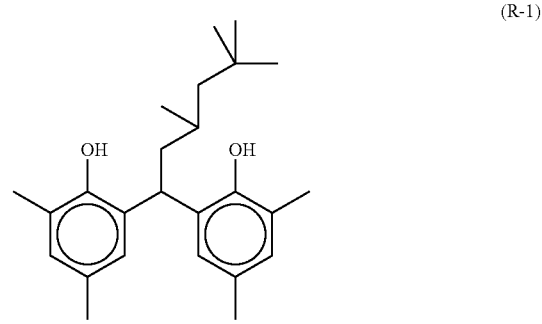
(R-1)

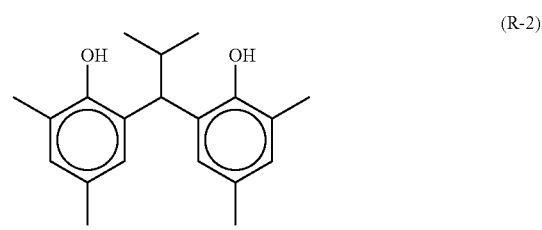
(R-2)

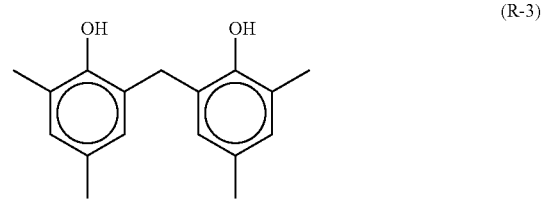
(R-3)

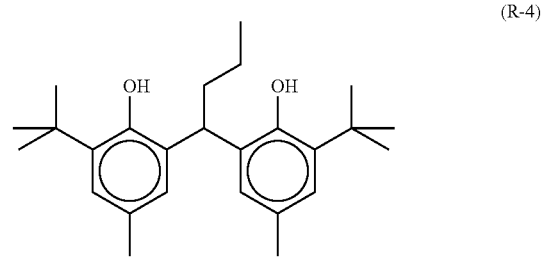
(R-4)

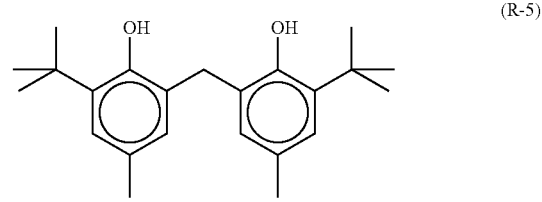
(R-5)

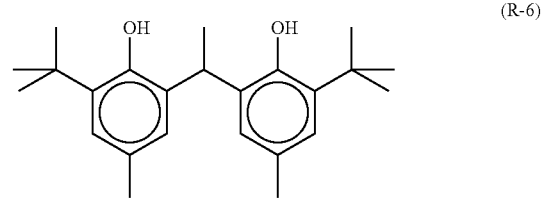
(R-6)

-continued
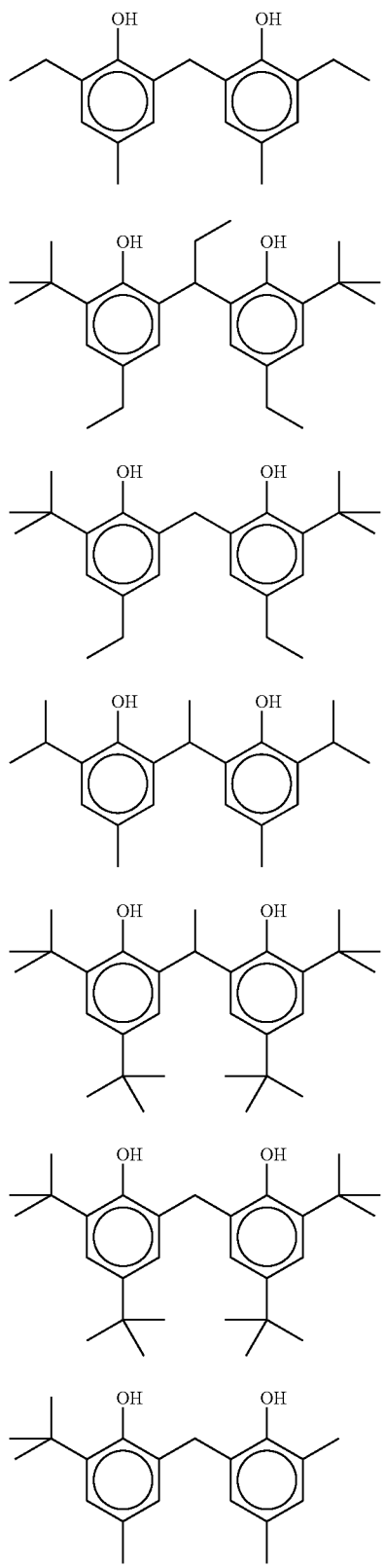
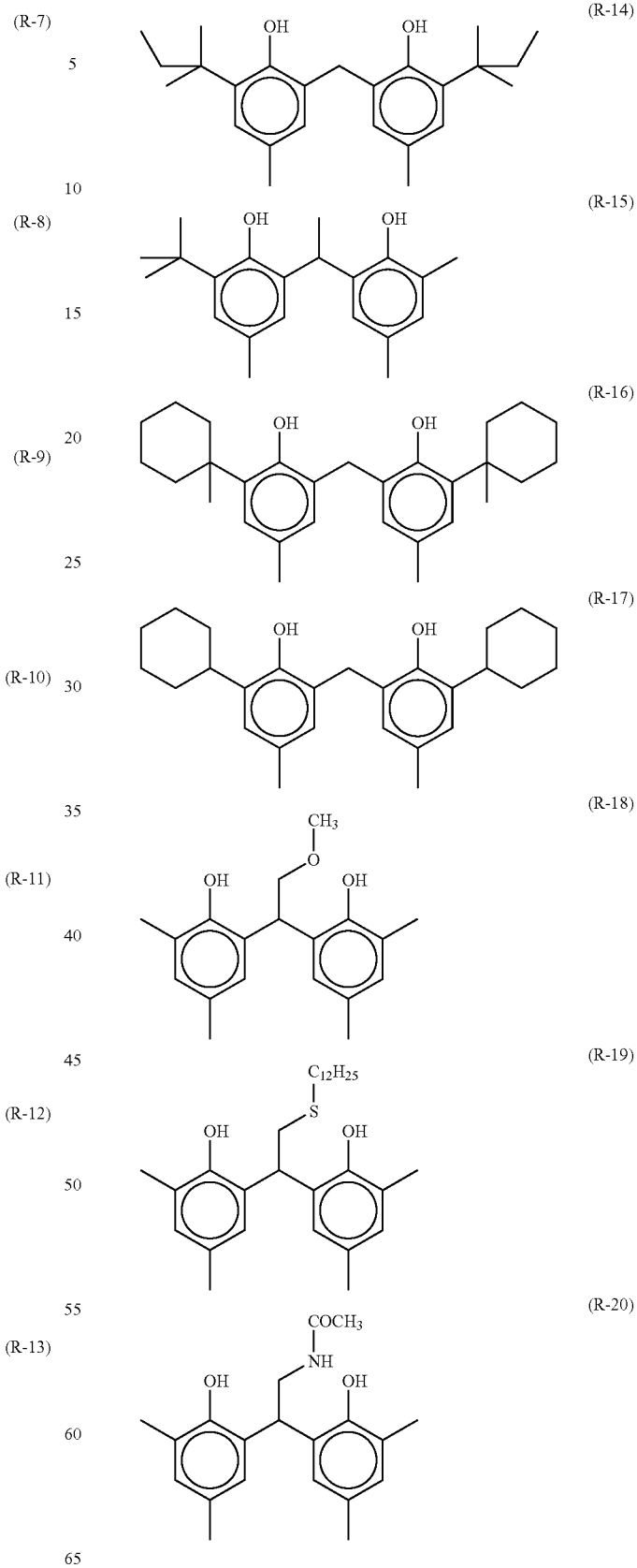

-continued
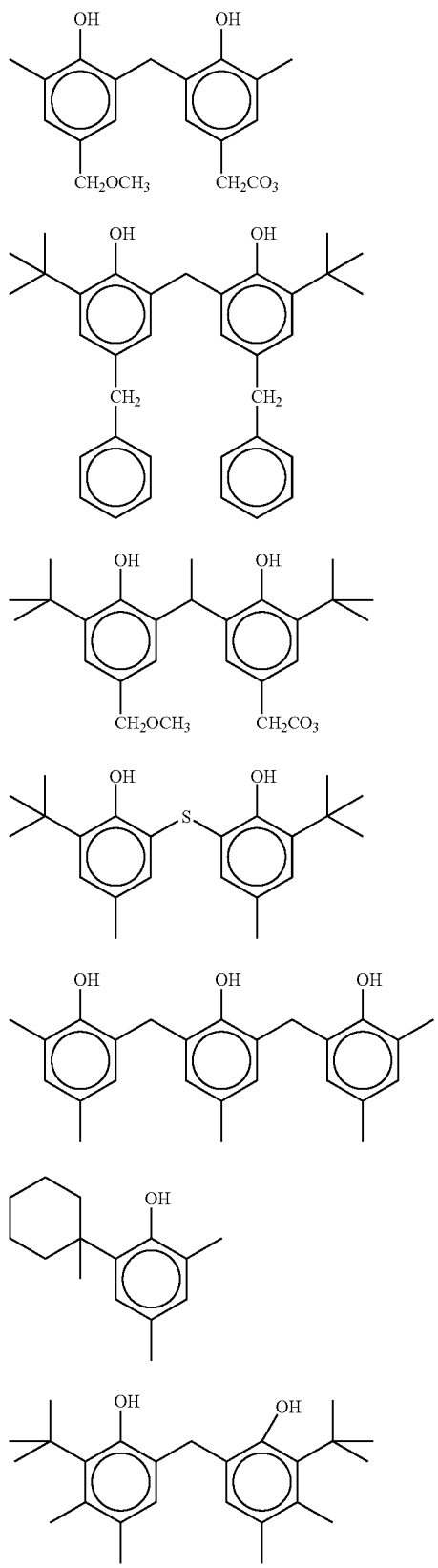
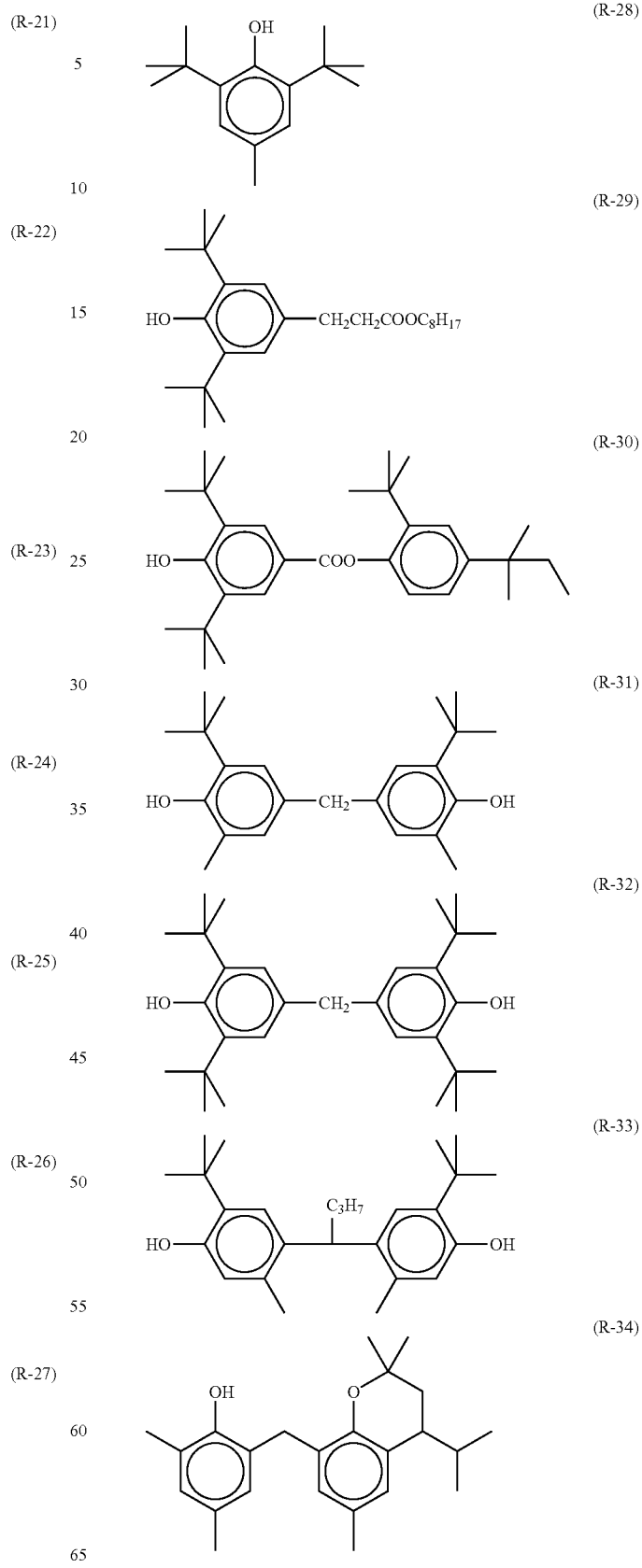

In particular, the compounds are preferably the compounds as shown in (R-1) to (R-20).

In this embodiment, the amount of the reducing agent to be added is preferably 0.01 to 5.0 g/m², more preferably 0.1 to 3.0 g/m². The reducing agent is contained in an amount of preferably 5 to 50 mol %, and further preferably 10 to 40 mol % per mole of silver in the side having an image forming layer.

The reducing agent of this embodiment can be added to an image forming layer containing an organic silver salt, and a light-sensitive silver halide, and the adjacent layer. However, it is more preferably incorporated in the image forming layer.

The reducing agent of this embodiment may be incorporated in the coating solution with any process based on a solution form, an emulsified dispersion form, a solid fine particle dispersion form, or the like, and incorporated in the light-sensitive material.

As a well-known emulsification dispersion method, mention may be made of a method in which an emulsified dispersion is mechanically prepared by dissolving the reducing agent with an oil such as dibutylphthalate, tricresyl phosphate, glyceryl triacetate or diethyl phthalate and with a co-solvent such as ethyl acetate or cyclohexanone.

Whereas, as a solid fine particle dispersion method, mention may be made of the following method. A reducing agent is dispersed in an appropriate solvent such as water by means of a ball mill, a colloid mill, a vibration ball mill, a sand mill, a jet mill, or a roller mill, or ultrasonically, thereby to form a solid dispersion. A dispersion method using a sand mill is preferred. Incidentally, at this step, a protective colloid (e.g., polyvinyl alcohol), a surfactant (e.g., an anionic surfactant such as sodium triisopropylnaphthalene sulfonate (a mixture of those mutually different in substitution positions of three isopropyl groups) may also be used. An antiseptic agent (e.g., benzisothiazolinone sodium salt) can be incorporated in a water dispersion.

The solid particle dispersion method of the reducing agent is particularly preferred. The reducing agent is preferably added in the form of fine particles with an average particle size of 0.01 µm to 10 µm, preferably 0.05 µm to 5 µm, and more preferably 0.1 µm to 1 µm. In this application, other solid dispersions are also preferably dispersed in the form of particles having a size within this range, and used.

(Explanation of Development Accelerator)

For the photothermographic material of this embodiment, there are preferably used, as development accelerators, the sulfonamidephenol type compounds represented by the formula (A) described in JP-A-2000-267222 and JP-A-2000-330234, the hindered phenol type compounds represented by the formula (II) described in JP-A-2001-92075, the hydrazine type compounds represented by the formula (I) described in JP-A-10-62895, JP-A-11-15116, and the like, and the formula (1) described in Japanese Patent Application No. 2001-074278, and the phenol type or naphtol type compounds represented by the formula (2) described in Japanese Patent Application No. 2000-76240. Each of these development accelerators is used in an amount in the range of 0.1 to 20 mol %, preferably in the range of 0.5 to 10 mol %, and more preferably in the range of 1 to 5 mol % based on the amount of the reducing agent. As a process for introducing it into a light-sensitive material, mention may be made of the same process for the reducing agent. In particular, the development accelerator is preferably added in the form of a solid dispersion or an emulsified dispersion. When it is added in the form of an emulsified dispersion, it is preferably added in the form of an emulsified dispersion obtained by dispersing the compound using a high boiling solvent which is a solid at ordinary temperatures, and a low boiling co-solvent, or added in the form of a so-called oil-less emulsified dispersion without using a high boiling solvent.

In this embodiment, out of the development accelerators, particularly preferred are the hydrazine type compounds represented by the formula (1) described in Japanese Patent Application No. 2001-074278, and the phenol type or naphthol type compounds represented by the formula (2) described in Japanese Patent Application No. 2000-76240.

Below, preferred specific examples of the development accelerator of this embodiment will be shown. This embodiment is not limited to these.

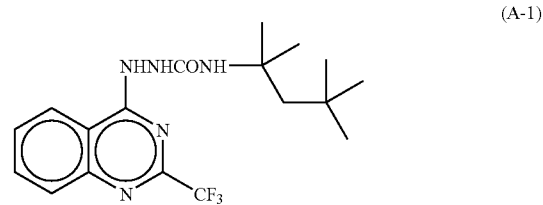

(A-1)

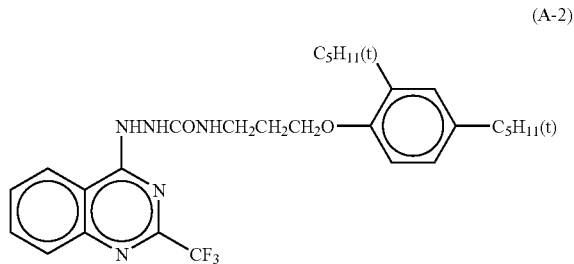

(A-2)

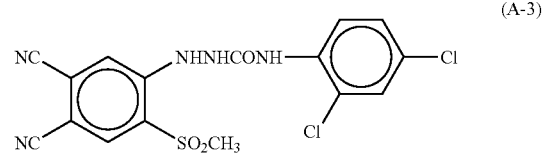

(A-3)

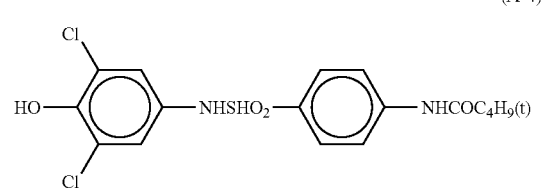

(A-4)

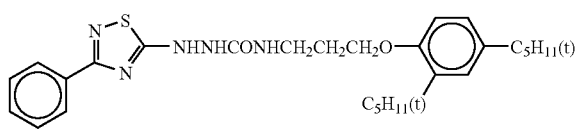

(A-5)

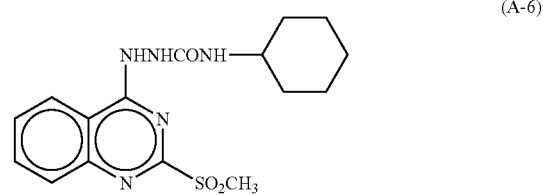

(A-6)

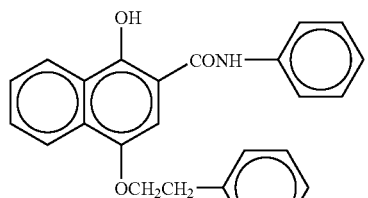
(A-7)

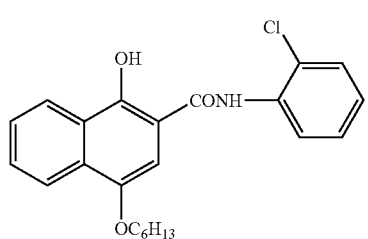
(A-8)

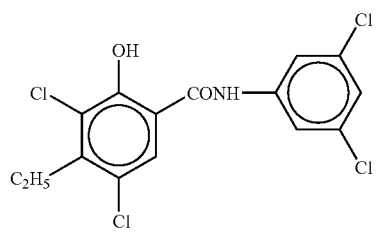
(A-9)

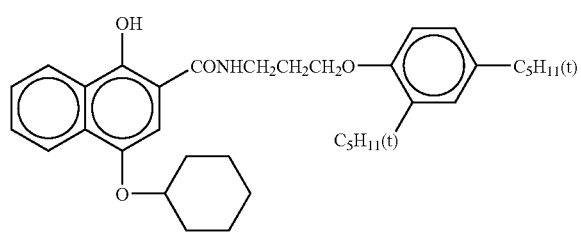
(A-10)

(Explanation of Hydrogen Bonding Compound)

In this embodiment, when the reducing agent has an aromatic hydroxy group (—OH) or an amino group, a non-reducible compound having a group capable of forming a hydrogen bond with the amino group is preferably used in combination.

As the groups capable of forming a hydrogen bond, mention may be made of a phosphoryl group, a sulfoxide group, a sulfonyl group, a carbonyl group, an amido group, an ester group, an urethane group, an ureido group, a tertiary amino group, a nitrogen-containing aromatic group, and the like. Out of these, preferred are a phosphoryl group, a sulfoxide group, an amido group (provided that it does not have an >N—H group, but is blocked like an >N—Ra (Ra is a substituent other than H)), an urethane group (provided that it does not have an >N—H group, but is blocked like an >N—Ra (Ra is a substituent other than H)), and an ureido group (provided that it does not have an >N—H group, but is blocked like an >N—Ra (Ra is a substituent other than H)).

In this embodiment, particularly preferred hydrogen bonding compounds are the compounds represented by the following formula (D):

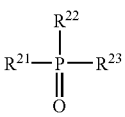
Formula (D)

In the formula (D), $R^{21}$ to $R^{23}$ each independently represents an alkyl group, an aryl group, an alkoxy group, an aryloxy group, an amino group, or a heterocyclic group. These groups may be unsubstituted, or have a substituent.

As the substituents when $R^{21}$ to $R^{23}$ have substituents, mention may be made of a halogen atom, an alkyl group, an aryl group, an alkoxy group, an amino group, an acyl group, an acylamino group, an alkylthio group, an arylthio group, a sulfonamido group, an acyloxy group, an oxycarbonyl group, a carbamoyl group, a sulfamoyl group, a sulfonyl group, a phosphoryl group, and the like. A preferred substituent is an alkyl group or an aryl group, examples of which may include: a methyl group, an ethyl group, an isopropyl group, a t-butyl group, a t-octyl group, a phenyl group, a 4-alkoxyphenyl group, and a 4-acyloxyphenyl group.

Specific examples of the alkyl group of $R^{21}$ to $R^{23}$ may include: a methyl group, an ethyl group, a butyl group, an octyl group, a dodecyl group, an isopropyl group, a t-butyl group, a t-amyl group, a t-octyl group, a cyclohexyl group, a 1-methylcyclohexyl group, a benzyl group, a phenethyl group, and a 2-phenoxypropyl group.

Examples of an aryl group may include: a phenyl group, a cresyl group, a xylyl group, a naphthyl group, a 4-t-butylphenyl group, a 4-t-octylphenyl group, a 4-anisidyl group, and a 3,5-dichlorophenyl group.

Examples of an alkoxy group may include: a methoxy group, an ethoxy group, a butoxy group, an octyloxy group, a 2-ethylhexyloxy group, a 3,5,5-trimethylhexyloxy group, a dodecyloxy group, a cyclohexyloxy group, a 4-methylcyclohexyloxy group, and a benzyloxy group.

Examples of an aryloxy group may include: a phenoxy group, a cresyloxy group, an isopropylphenoxy group, a 4-t-butylphenoxy group, a naphthoxy group, and a biphenyloxy group.

Examples of an amino group may include: a dimethylamino group, a diethylamino group, a dibutylamino group, a dioctylamino group, an N-methyl-N-hexylamino group, a dicyclohexylamino group, a diphenylamino group, and an N-methyl-N-phenylamino group.

Each of $R^{21}$ $R^{23}$ is preferably an alkyl group, an aryl group, an alkoxy group, or an aryloxy group. From the viewpoint of the effects of this embodiment, at least one of $R^{21}$ to $R^{23}$ is preferably an alkyl group or an aryl group, and two or more thereof are more preferably alkyl groups or aryl groups. Whereas, $R^{21}$ to $R^{23}$ are preferably the same groups from the viewpoint of the availability at a low cost.

Below, specific examples of the hydrogen bonding compounds including the compound of the formula (D) in this embodiment will be shown, but this embodiment is not limited thereto.

(D-1) 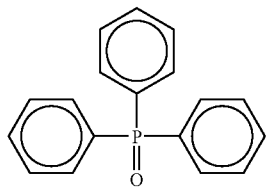
(D-2) 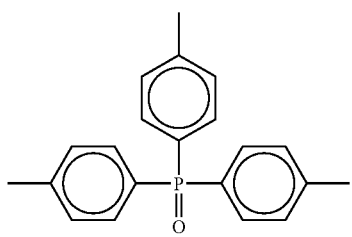
(D-3) 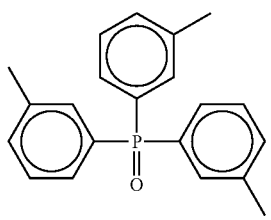
(D-4) 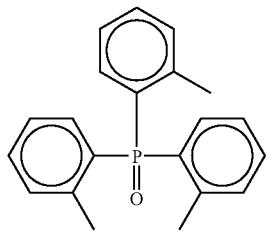
(D-5) 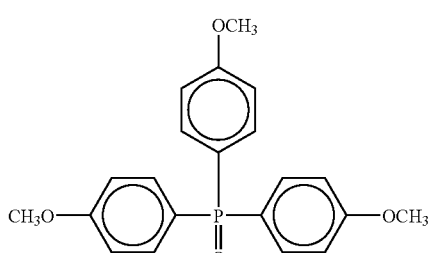
(D-6) 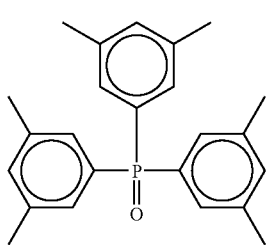
-continued
(D-7) 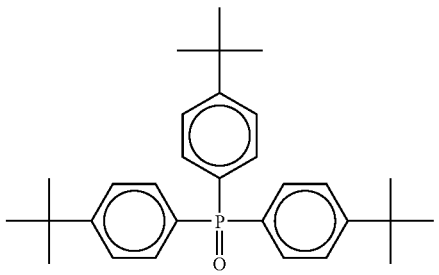
(D-8) 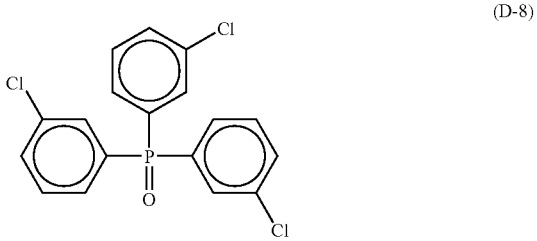
(D-9) 
(D-10) 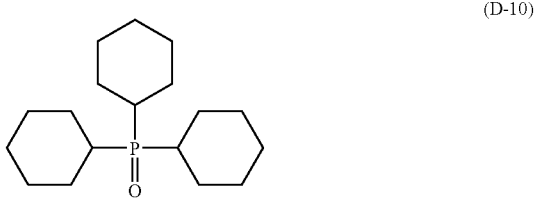
(D-11) 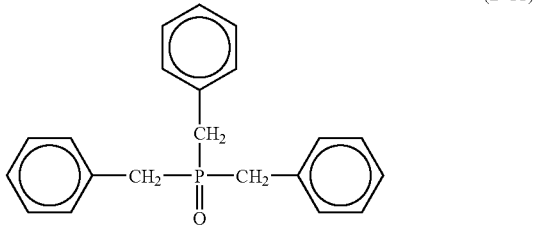
(D-12) 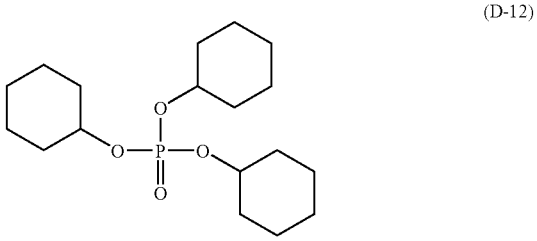
(D-13) 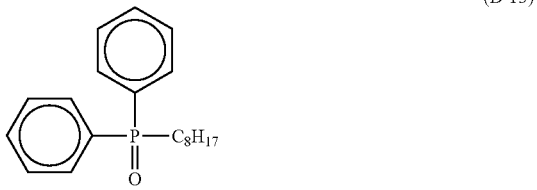

-continued

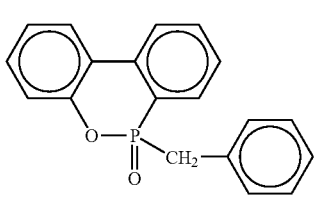
(D-14)

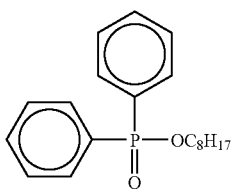
(D-15)

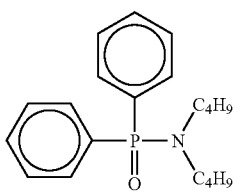
(D-16)

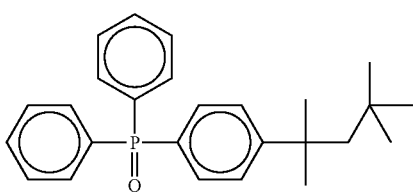
(D-17)

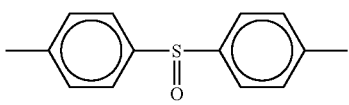
(D-18)

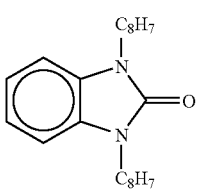
(D-19)

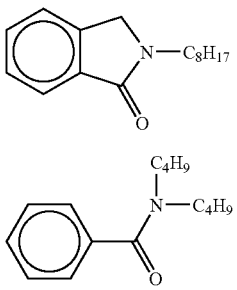
(D-20)

(D-21)

As the specific examples of the hydrogen bonding compound, other than the foregoing ones, mention may be made of those described in Japanese Patent Application Nos. 2000-192191 and 2001-194811.

The hydrogen bonding compound of this embodiment can be used in the light-sensitive material by being incorporated into the coating solution in solution form, in emulsified dispersion form, or in solid dispersed fine particle dispersion form in the same manner as with the reducing agent. The compound of this embodiment forms a complex by the hydrogen bond with a compound having a phenolic hydroxyl group in a solution state, so that it can be separated as a complex in a crystalline state, depending on the combination between the reducing agent and the compound of the formula (A) of this embodiment.

It is particularly preferable for obtaining stable performances to use the crystal powder thus separated in the form of a solid dispersed fine particle dispersion. Further, methods of mixing the reducing agent with the hydrogen bonding compound of this embodiment in a powder state, and then causing the formation of a complex during dispersing by means of a sand grinder mill, or the like with an appropriate dispersing agent can also preferably be used.

It is preferable that the hydrogen bonding compound of this embodiment is used in an amount of preferably in the range of 1 to 200 mol %, more preferably in the range of 10 to 150 mol %, and further preferably in the range of 30 to 100 mol % based on the amount of the reducing agent.

(Explanation of Binder)

The binder in the organic silver salt-containing layer of this embodiment may be any polymer. Preferred binders are transparent or semi-transparent, and generally colorless, and include natural resins, or polymers and copolymers, synthetic resins, or polymers and copolymers, and other media which form a film, such as gelatins, rubbers, poly(vinyl alcohol)s, hydroxyethyl celluloses, cellulose acetates, cellulose acetate butylates, poly(vinylpyrrolidone)s, casein, starch, poly(acrylic acid)s, poly(methylmethacrylic acid)s, poly(vinyl chloride)s, poly(methacrylic acid)s, styrene-maleic anhydride copolymers, styrene-acrylonitrile copolymers, styrene-butadiene copolymers, poly (vinyl acetal) s (e.g., poly(vinyl formal) and poly(vinyl butyral)), poly(ester)s, poly(urethane)s, phenoxy resins, poly(vinylidene chloride) s, poly (epoxide) s, poly(carbonate) s, poly(vinyl acetate)s, poly(olefin)s, cellulose esters, and poly(amide)s. The binders may be coated for formation from water or an organic solvent, or an emulsion.

In this embodiment, the glass transition temperature of the binder in the organic silver salt-containing layer is preferably 10° C. or more and 80° C. or less, more preferably 20° C. to 70° C., and further preferably 23° C. or more and 65° C. or less.

Incidentally, in this specification, the Tg is calculated with the following equation.

$$1/Tg = \Sigma(Xi/Tgi)$$

In this case, it is assumed that the polymer is formed by copolymerization of n monomer components from i=1 to n. Xi denotes the weight ratio of the i-th monomer ($\Sigma Xi=1$), and Tgi denotes the glass transition temperature (an absolute temperature) of the homopolymer of the i-th monomer, provided that $\Sigma$ is the sum for from i=1 to i=n.

Incidentally, for the value (Tgi) of the glass transition temperature of the homopolymer of each monomer, the values described in *Polymer Handbook*, (3rd Edition) (written by J. Brandrup and E. H. Immergut, (Willey-interscience, 1989)), have been adopted.

The binders may be used alone, or, if required, in combination of two or more thereof. Alternatively, the one having a glass transition temperature of 20° C. or more and the one having a glass transition temperature of lower than 20° C. may also be used in combination. When two or more kinds of polymers having different Tg values are blended to be used, it is preferable that the weight average Tg thereof falls within the foregoing range.

In this embodiment, the performances are improved when coating is performed with a coating solution in which 30 weight % or more of the solvent is water, followed by drying to form the organic silver salt-containing layer, further when the binder in the organic silver salt-containing layer is soluble or dispersible in an aqueous solvent (a water solvent), and, in particular, when the binder comprises a latex of polymer having an equilibrium moisture content at 25° C. and 60% RH of 2 weight % or less.

The most preferable form is such that preparation has been performed so as to obtain an ionic conductivity of 2.5 mS/cm or less. For such a preparation method, mention may be made of a purification treatment method using a functional membrane for separation after synthesizing a polymer.

The aqueous solvent mentioned here in which the polymer is soluble or dispersible means water or a mixture of water and a water-miscible organic solvent in an amount of 70 weight % or less.

Examples of the water-miscible organic solvent may include: alcohol type solvents such as methyl alcohol, ethyl alcohol, and propyl alcohol, cellosolve type solvents such as methyl cellosolve, ethyl cellosolve, and butyl cellosolve, ethyl acetate, and dimethyl formamide.

Whereas, "the equilibrium moisture content at 25° C. and 60% RH" can be expressed by using the weight W1 of a polymer in an equilibrium with moisture conditioning under an atmosphere of 25° C. and 60% RH, and the weight W0 of a polymer in an absolutely dry state at 25° C., as the following equation.

Equilibrium moisture content at 25° C. and 60% $RH=[(W1-W0)/W0]\times100$ (weight %)

As for the definition and the measurement method of moisture content, for example, *Polymer Engineering Course 14, (Kobunshi Kougaku Kouza) 14) Testing Methods of Polymer Materials*, (compiled by the Society of Polymer Science of Japan, Chijin Shokan) can serve as a reference.

The equilibrium moisture content at 25° C. and 60% RH of the binder polymer of this embodiment is preferably 2 weight % or less, more preferably 0.01 weight % or more and 1.5 weight % or less, and furthermore preferably 0.02 weight % or more and 1 weight % or less.

The binder of this embodiment is in particular preferably a polymer dispersible in an aqueous solvent. Examples of the dispersion state may include the dispersion state for a latex in which fine particles of a water-insoluble and hydrophobic polymer are dispersed, or the dispersion state for the one in which polymer molecules are dispersed in a molecular state or a micelle-forming state, and any of these is preferred. The average particle diameter of dispersed particles is in the range of about 1 to 50000 nm, and more preferably 5 to 1000 nm. The particle diameter distribution of the dispersed particles has no particular restriction. Both of dispersed particles having a broad particle diameter distribution or dispersed particles having a monodisperse particle diameter distribution are acceptable.

In this embodiment, as the preferred embodiments of the polymer dispersible in an aqueous solvent, hydrophobic polymers such as acrylic polymers, poly(ester)s, rubbers (e.g., SBR resins), poly(urethane)s, poly(vinyl chloride)s, poly(vinyl acetate)s, poly(vinylidene chloride)s, and poly (olefin)s can preferably be used. These polymers may be straight chain polymers or branched chain polymers, and may be cross-linked polymers, so-called homopolymers in which a single kind of monomers are polymerized, or copolymers in which two or more kinds of monomers are polymerized. For a copolymer, it may be either of a random copolymer or a block copolymer.

Each molecular weight of these polymers is 5,000 to 1,000,000, and preferably 10,000 to 200,000 in terms of the number average molecular weight. When a polymer having a too small molecular weight is used, the mechanical strength of the resulting emulsion layer is insufficient. Too large molecular weight unfavorably results in poor film forming property.

Specific examples of a preferred latex may include the following ones. Below, they are expressed with the raw material monomers. Each numerical value parenthesized denotes the amount in terms of weight %, and the molecular weights are the number average molecular weights. When multi-functional monomers have been used, the concept of molecular weight can not be applied, because crosslinked structures are formed. Accordingly, such a case is described as "crosslinkable" to omit the description of molecular weight. Tg denotes the glass transition temperature.

P-1; Latex of -MMA(70)-EA(27)-MAA(3)-(molecular weight: 37000, Tg: 61° C.)

P-2; Latex of -MMA(70)-2EHA(20)-St(5)-AA(5)-(molecular weight: 40000, Tg: 59° C.)

P-3; Latex of -St(50)-Bu(47)-MMA(3)-(crosslinkable, Tg: −17° C.))

P-4; Latex of -St(68)-Bu(29)-AA(3)-(crosslinkable, Tg: 17° C.))

P-5; Latex of -St(71)-Bu(26)-AA(3)-(crosslinkable, Tg: 24° C.)

P-6; Latex of -St(70)-Bu(27)-IA(3)-(crosslinkable)

P-7; Latex of -St(75)-Bu(24)-AA(1)-(crosslinkable, Tg: 29° C.)

P-8; Latex of -St(60)-Bu(35)-DVB(3)-MAA(2)-(crosslinkable)

P-9; Latex of -St(70)-Bu(25)-DVB(2)-AA(3)-(crosslinkable)

P-10; Latex of -VC(50)-MMA(20)-EA(20)-AN(5)-AA(5)-(molecular weight: 80000)

P-11; Latex of -VDC(85)-MMA(5)-EA(5)-MAA(5)-(molecular weight: 67000)

P-12; Latex of -Et(90)-MAA(10)-(molecular weight: 12000)

P-13; Latex of -St(70)-2EHA(27)-AA(3)-(molecular weight: 130000, Tg: 43° C.))

P-14; Latex of -MMA(63)-EA(35)-AA(2)-(molecular weight: 33000, Tg: 47° C.)

P-15; Latex of -St(70.5)-Bu(26.5)-AA(3)-(crosslinkable, Tg: 23° C.)

P-16; Latex of -St(69.5)-Bu(27.5)-AA(3)-(crosslinkable, Tg: 20.5° C.)

P-17; Latex of -St(61.3)-isoprene(35.5)-AA(3)-(crosslinkable, Tg: 17° C.)

P-18; Latex of -St(67)-isoprene(28)-Bu(2)-AA(3)-(crosslinkable, Tg: 27° C.)

The abbreviations of the foregoing structures denote the following monomers. MMA; methyl methacrylate, EA; ethyl acrylate, MAA; methacrylic acid, 2EHA; 2-ethylhexyl acrylate, St; styrene, Bu; butadiene, AA; acrylic acid, DVB; divinylbenzene, VC; vinyl chloride, AN; acrylonitrile, VDC: vinylidene chloride, Et; ethylene, and IA; itaconic acid.

The foregoing polymer latexes are also commercially available, and the following polymers are available. Examples thereof may include: acrylic polymers such as CEVIAN A-4635, 4718, and 4601 (all manufactured by DAICEL Chemical Industries, Ltd), and Nipol Lx811, 814, 821, 820, and 857 (all manufactured by Nippon Zeon Co., Ltd.); poly(ester)s such as FINETEX ES650, 611, 675, and 850 (all manufactured by Dai-Nippon Ink & Chemicals, Inc., Ltd.), WD-size, and WMS (both manufactured by Eastman Chemical); poly(urethane)s such as HYDRAN AP10, 20, 30, and 40 (all manufactured by Dai-Nippon Ink & Chemicals, Inc., Ltd.); rubbers such as LACSTAR 7310K, 3307B, 4700H, and 7132C (all manufactured by Dai-Nippon Ink & Chemicals, Inc., Ltd.), and Nipol Lx416, 410, 438C, and 2507 (all manufactured by Nippon Zeon Co., Ltd.); poly(vinyl chloride)s such as G351 and G576 (both manufactured by Nippon Zeon Co., Ltd.); poly(vinylidene chloride)s such as L502 and L513 (both manufactured by Asahi Chemical Industry Co., Ltd); and poly(olefin)s such as CHEMIPEARL S120 and SA100 (both manufactured by Mitsui Photochemical Industries Ltd.).

These polymer latexes may be used alone, or if required, in a blend of two or more thereof.

As the polymer latex used in this embodiment, a latex of styrene-butadiene copolymer or a latex of styrene-isoprene copolymer is particularly preferred. The weight ratio between the monomer unit of styrene and the monomer unit of butadiene in the styrene—butadiene copolymer is preferably 40:60 to 95:5. Further, the proportion of the styrene monomer unit and the butadiene monomer unit in the copolymer is preferably 60 to 99 weight %. A preferred range of the molecular weight is identical with that described above.

The polymer latex in the invention contains acrylic acid or methacrylic acid, preferably, by 1 weight % to 6 weight % and, more preferably, 2 weight % to 5 weight % to the sum of styrene and butadiene and, more preferably, contains 2 weight % to 5 weight %.

The polymer latex of the invention preferably contains acrylic acid. A preferred range of the molecular weight is identical with that described above. Further, the ratio of copolymerization in the styrene-isoprene copolymer, etc. is identical with that in the case of styrene and butadiene copolymer.

The styrene-butadiene copolymer latex to be used preferably in this embodiment can include P-3 to P-9 and 15, and commercially available products, LACSTAR-3307B and -7132C, Nipol Lx416, and the like. Examples of styrene-isoprene copolymer can include P-17, P-18 described above.

To an organic silver salt-containing layer of the light-sensitive material of this embodiment, if required, a hydrophilic polymer such as gelatin, polyvinyl alcohol, methyl cellulose, hydroxypropyl cellulose, or carboxymethyl cellulose may also be added.

The amount of the hydrophilic polymer to be added is 30 weight % or less, and more preferably 20 weight % or less based on the total amount of the binder in the organic silver salt-containing layer.

The organic silver salt-containing layer (i.e., image-forming layer) of this embodiment is preferably the one formed using a polymer latex for a binder. The amount of binder in the organic silver salt-containing layer is such that the weight ratio of total binder/organic silver salt falls within a range of 1/10 to 10/1, and furthermore preferably in the range of 1/5 to 4/1.

Further, such an organic silver salt-containing layer is also, in general, the light-sensitive layer (emulsion layer) containing light-sensitive silver halide which is a light-sensitive silver salt. The weight ratio of total binder/silver halide in such a case is preferably in the range of 400 to 5, and more preferably 200 to 10.

The total amount of binder in the image-forming layer of this embodiment is in the range of preferably 0.2 to 30 g/m², and more preferably 1 to 15 g/m². To the image-forming layer of this embodiment, a crosslinking agent for crosslinking, a surfactant for improving the coatability, and the like may also be added.

In this embodiment, the solvent of the coating solution of an organic silver salt-containing layer of the light-sensitive material (herein, for simplification, solvents and dispersion media are both together referred to as solvents) is preferably an aqueous solvent containing water in an amount of 30 weight % or more. As a component except for water, a given water-miscible organic solvent such as methyl alcohol, ethyl alcohol, isopropyl alcohol, methyl cellosolve, ethyl cellosolve, dimethylformamide, or ethyl acetate may also be used. The water content of the solvent is more preferably 50 weight % or more, and further preferably 70 weight % or more.

Specific preferred examples of the solvent composition include, other than water 100, water/methyl alcohol=90/10, water/methyl alcohol=70/30, water/methyl alcohol/dimethylformamide=80/15/5, water/methyl alcohol/ethyl cellosolve=85/10/5, and water/methyl alcohol/isopropyl alcohol=85/10/5, (each numerical value is expressed in terms of weight %).

(Explanation of Anti-fogging Agent)

In this embodiment, as an anti-fogging agent, the compound represented by the following formula (H) is preferably contained:

Q-(Y)n-C(Z₁)(Z₂)X                                  Formula (H)

In the formula (H), Q denotes an alkyl group, an aryl group, or a heterocyclic group, Y denotes a divalent linking group, n denotes 0 or 1, $Z_1$ and $Z_2$ denote halogen atoms, and X denotes a hydrogen atom or an electron-attracting group.

Q denotes a phenyl group substituted by an electron-attracting group in which preferably the Hammet's substituent constant gyp takes on a positive value. With regard to the Hammett's substituent constant, *Journal of Medicinal Chemistry*, 1973, Vol. 16, No. 11, pp. 1207 to 1216, or the like can serve as a reference.

Examples of such an electron-attracting group may include: a halogen atom (fluorine atom (σp value: 0.06), chlorine atom (σp value: 0.23), bromine atom (σp value: 0.23), iodine atom (σp value: 0.18), trihalomethyl groups (tribromomethyl (σp value: 0.29), trichloromethyl (σp value: 0.33), and trifluoromethyl (σp value: 0.54)), a cyano group (σp value: 0.66), a nitro group (σp value: 0.78), an aliphatic-aryl or heterocyclic sulfonyl group (e.g., methanesulfonyl (σp value: 0.72)), an aliphatic-aryl or heterocyclic acyl group (e.g., acetyl (σp value: 0.50), benzoyl (σp value: 0.43)), an alkynyl group (e.g., C≡CH (σp value: 0.23)), aliphatic-aryl or heterocyclic oxycarbonyl groups (e.g., methoxycarbonyl (σp value: 0.45) and phenoxycarbonyl (σp value: 0.44)), a carbamoyl group (σp value: 0.36), a sulfamoyl group (σp value: 0.57), a sulfoxide group, a heterocyclic group, and a phosphoryl group.

The σp value is preferably in the range from 0.2 to 2.0, and more preferably in the range from 0.4 to 1.0.

Preferred electron-attracting groups are a carbamoyl group, an alkoxycarbonyl group, an alkylsulfonyl group, an alkylphosphoryl group, a carboxyl group, an alkyl or aryl carbonyl group, and an arylsulfonyl group. A carbamoyl group, an alkoxycarbonyl group, an alkylsulfonyl group and an alkylphosphoryl group are particularly preferred. A carbamoyl group is most preferred.

X is preferably an electron-attracting group, and more preferably a halogen atom, an aliphatic-aryl or heterocyclic sulfonyl group, an aliphatic-aryl or heterocyclic acyl group, an aliphatic-aryl or heterocyclic oxycarbonyl group, a carbamoyl group, or a sulfamoyl group. In particular, a halogen atom is preferred.

Out of the halogen atoms, a chlorine atom, a bromine atom, and an iodine atom are preferred, a chlorine atom and a bromine atom are more preferred, and a bromine atom is particularly preferred.

Y preferably denotes —C(=O)—, —SO—, or —SO$_2$—, more preferably —C(=O)— or —SO$_2$—, and in particular preferably —SO$_2$—. n denotes 0 or 1, and preferably 1.

Below, specific examples of the compound of the formula (H) of this embodiment will be shown. However, this embodiment is not limited thereto.

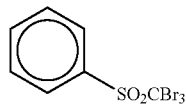
(H-1)

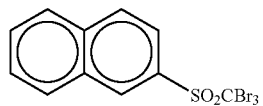
(H-2)

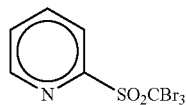
(H-3)

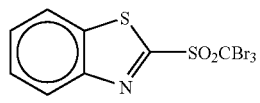
(H-5)

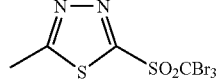
(H-6)

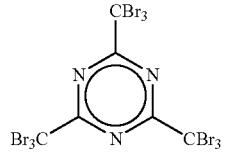
(H-7)

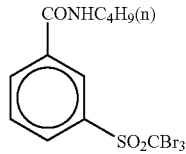
(H-8)

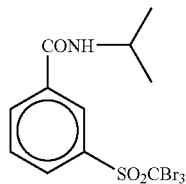
(H-9)

-continued

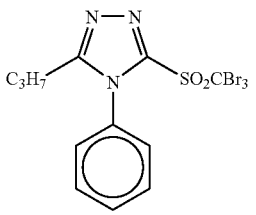
(H-10)

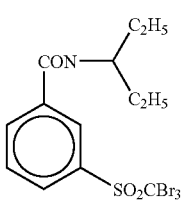
(H-11)

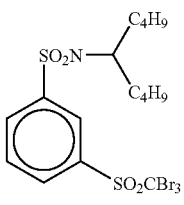
(H-12)

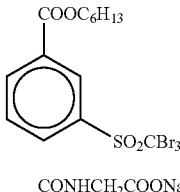
(H-13)

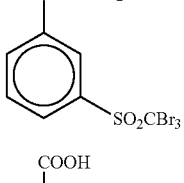
(H-14)

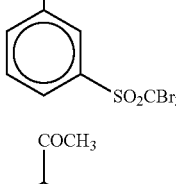
(H-15)

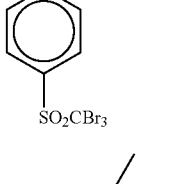
(H-16)

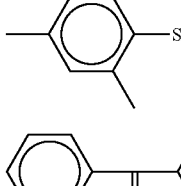
(H-17)

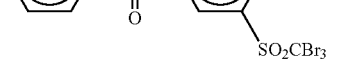
(H-18)

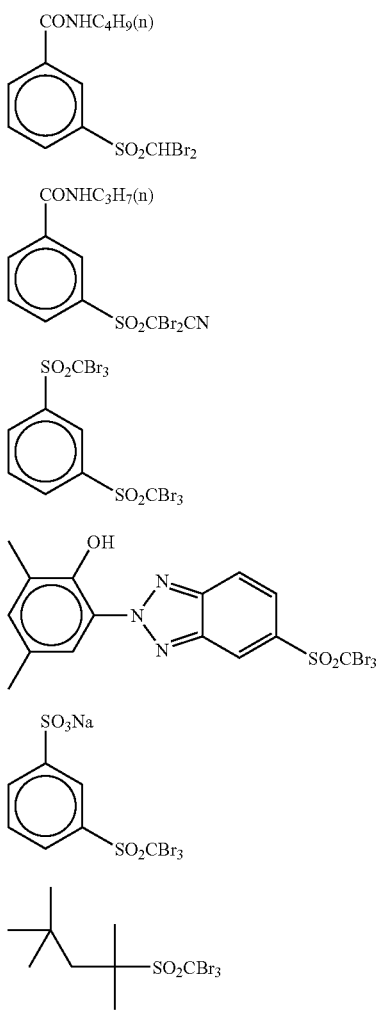

The compound represented by the formula (H) of this embodiment is used in an amount of, preferably in the range of $10^{-4}$ to 0.8 mol, more preferably in the range of $10^{-3}$ to 0.1 mol, and furthermore preferably in the range of $5 \times 10^{-3}$ mol to 0.05 mol per mole of non-light-sensitive silver salt in the image forming layer.

Particularly, when a silver halide of a composition with a high silver iodide content of this embodiment is used, the amount of the compound of the formula (H) to be added is important in order to obtain a sufficient anti-fogging effect. The compound is most preferably used in an amount in the range of $5 \times 10^{-3}$ to 0.03 mol.

In this embodiment, as a method for incorporating the compound represented by the formula (H) into a light-sensitive material, mention may be made of the method described in connection with the incorporation method of the reducing agent.

The melting point of the compound represented by the formula (H) is preferably 200° C. or less, and further preferably 170° C. or less.

As other organic polyhalogen compounds for use in this embodiment, mention may be made of the ones disclosed in the patent described in paragraph Nos. 0111 to 0112 of JP-A-11-65021. Particularly preferred are the organic halogen compounds represented by the formula (P) in Japanese Patent Application No. 11-87297, the organic polyhalogen compounds represented by the formula (II) in JP-A-10-339934, and the organic polyhalogen compounds described in Japanese Patent Application No. 11-205330.

(Other Anti-fogging Agents)

As other anti-fogging agent, mention maybe made of mercury (II) salt in paragraph No. 0113 of JP-A-11-65021, benzoic acids in paragraph No. 0114, ibid., salicylic acid derivatives in JP-A-2000-206642, formalin scavenger compounds represented by the formula (S) in JP-A-2000-221634, triazine compounds according to claim 9 of JP-A-11-352624, the compounds represented by the formula (III) in JP-A-6-11791, 4-hydroxy-6-methyl-1,3,3a,7-tetrazaindene, and the like.

As anti-fogging agents, stabilizers and stabilizer precursors usable in this embodiment, mention may be made of the ones of patent described in paragraph No. 0070 of JP-A-10-62899, and from page 20, line 57 to page 21, line 7 of EP No. 0803764A1, and the compounds described in JP-A-9-281637 and JP-A-9-329864.

The photothermographic material in this embodiment may contain an azolium salt for the purpose of inhibiting fogging. As the azolium salts, mention may be made of the compounds represented by the formula (XI) described in JP-A-59-193447, the compounds described in JP-B-55-12581, and the compounds represented by the formula (II) described in JP-A-60-153039. The azolium salt may be added to the light-sensitive material at any site. As for the addition layer, the azolium salt is preferably added to the layer on the side having a light-sensitive layer, and more preferably added to an organic silver salt-containing layer.

The timing of adding an azolium salt may be during any steps of the preparation of a coating solution. When the azolium salt is added in the organic silver salt-containing layer, the timing may be during any steps between the preparation of the organic silver salt and the preparation of the coating solution, and it is preferably from after the preparation of the organic silver salt until immediately before coating. The azolium salt may be added by any process in which it is added in the form of a powder, a solution a fine particle dispersion, or the like. Alternatively, it may also be added in the form of a solution of mixture with other additives such as a sensitizing dye, a reducing agent, and a toning agent.

The amount of the azolium salt to be added in this embodiment may be any amount. However, it is preferably $1 \times 10^{-6}$ mol or more and 2 mol or less, and more preferably $1 \times 10^{-3}$ mol or more and 0.5 mol or less per mole of silver.

(Other Additives)

1) Mercapto, Disulfide, and Thiones

The photothermographic material of this embodiment may contain a mercapto compound, a disulfide compound, or a thione compound in order to inhibit or accelerate development, thereby controlling the development, to enhance the spectral sensitization efficiency, to improve the storability before and after development, or for other purposes. Examples thereof include the compounds disclosed in paragraph Nos. 0067 to 0069 of JP-A-10-62899, the compounds represented by the formula (I), and the specific examples thereof described in paragraph Nos. 0033 to 0052 of JP-A-10-186572, those described on page 20, lines 36 to 56 of EP No. 0803764A1, Japanese Patent Application No. 11-273670, and the like. Out of these, the mercapto-substituted heterocyclic aromatic compounds are preferred.

2) Toning Agent

In the photothermographic material of this embodiment, it is preferable to add a toning agent. The toning agent is described in paragraph Nos. 0054 to 0055 of JP-A-10-62899, on page 21, lines 23 to 48 of EP No. 0803764A1, JP-A-2000-356317, and Japanese Patent Application No. 2000-187298. In particular, preferred are phthalazinones (phthalazinone, phthalazinone derivatives, or metal salts; e.g., 4-(1-naphthyl)phthalazinone, 6-chlorophthalazinone, 5,7-dimethoxyphthalazinone, and 2,3-dihydro-1,4-phthalazinedion); combinations of phthalazinones and phthalic acids (e.g., phthalic acid, 4-methylphthalic acid, 4-nitrophthalic acid, diammonium phthalate, sodium phthalate, potassium phthalate, and tetrachlorophthalic anhydride); phthalazines (phthalazine, phthalazine derivatives, or metal salts; e.g., 4-(1-naphthyl)phthalazine, 6-isopropyl phthalazine, 6-t-butyl phthalazine, 6-chlorophthalazine, 5,7-dimethoxy phthalazine, and 2,3-dihydrophthalazine). Particularly, in the combinations with silver halides of a composition having a high silver iodide content, the combinations of phthalazines and phthalic acids are preferred.

The amount of phthalazines to be added is preferably 0.01 mol to 0.3 mol, more preferably 0.02 to 0.2 mol, and in particular preferably 0.02 to 0.1 mol per mole of an organic silver salt. This amount is an important factor for development acceleration which is an object for the silver halide emulsion of a composition with a high silver iodide content of this embodiment. Proper selection of the amount can implement both the sufficient developability and the low fogging.

3) Plasticizer and Lubricant

The plasticizers and the lubricants usable for the light-sensitive layer of this embodiment are described in paragraph No. 0117 of JP-A-11-65021. The slipping agents are described in paragraph Nos. 0061 to 0064 of JP-A-11-84573 and paragraph Nos. 0049 to 0062 of Japanese Patent Application No. 11-106881.

4) Dye and Pigment

For the light-sensitive layer of this embodiment, various dyes and pigments (e.g., C.I. Pigment Blue 60, C.I. Pigment Blue 64, and C.I. Pigment Blue 15:6) can be used from the viewpoints of improving the color tone, preventing the formation of interference fringes during laser exposure, and preventing the irradiation. These are described in details in WO98/36322, JP-A-10-268465, JP-A-11-338098, and the like.

5) Ultrahigh Contrast Agent

For the formation of an ultrahigh contrast image suitable for printing plate making, an ultrahigh contrast agent is preferably added to the image forming layer. The ultrahigh contrast agents, the incorporation process, and the amount thereof are described in paragraph No. 0118 of JP-A-11-65021, paragraph Nos. 0136 to 0193 of JP-A-11-223898, as the compounds of the formula (H), formulae (1) to (3), and formulae (A) and (B) of Japanese Patent Application No. 11-87297, and as the compounds of the formulae (III) to (V) described in Japanese Patent Application No. 11-91652 (specific compounds: chemical formulae 21 to 24). The hardness enhancement promoters are described in paragraph No. 0102 of JP-A-11-65021, and paragraph Nos. 0194 and 0195 of JP-A-11-223898.

In order to use formic acid or a formic acid salt as a strongly fogging substance, it is preferably contained on the side having the image forming layer containing a light-sensitive silver halide in an amount of 5 mmol or less, and more preferably 1 mmol or less, per mole of silver.

When an ultrahigh contrast agent is used in the photothermographic material of this embodiment, an acid formed by hydration of diphosphorus pentoxide or a salt thereof is preferably used in combination. Examples of the acid formed by hydration of diphosphorus pentoxide or a salt thereof may include metaphosphoric acid (salt), pyrophosphoric acid (salt), orthophosphoric acid (salt), triphosphoric acid (salt), tetraphosphoric acid (salt), and hexametaphosphoric acid (salt). Examples of acids formed by hydration of diphosphorus pentoxide or salts thereof, to be in particular preferably used may include orthophosphoric acid (salt) and hexametaphosphoric acid (salt). Specific examples of the salt include sodium orthophosphate, sodium dihydrogen orthophosphate, sodium hexametaphosphate, and ammonium hexametaphosphate.

The amount of the acid formed by hydration of diphosphorus pentoxide or a salt thereof to be added (the coating amount per square meter of the light-sensitive material) may be a desired amount according to the performances including sensitivity, fog, and the like. However, it is preferably 0.1 to 500 mg/m$^2$, and more preferably 0.5 to 100 mg/m$^2$.

(Preparation of Coating Solution and Coating)

The preparation temperature of the image forming layer coating solution of this embodiment is preferably 30° C. or more and 65° C. or less. The more preferable temperature is 35° C. or more and less than 60° C. The furthermore preferable temperature is 35° C. or more and 55° C. or less. Whereas, the temperature of the image forming layer coating solution immediately after the addition of a polymer latex is preferably kept at 30° C. or more and 65° C. or less.

2. Layer Configuration and Other Layer Components

The photothermographic material of this embodiment may have a non-light-sensitive layer in addition to the image forming layer. The non-light-sensitive layers can be classified according to their positions into (a) a surface protective layer to be provided on the image forming layer (on the side more distant from the support); (b) an intermediate layer to be provided between a plurality of image forming layers or between the image forming layer and a protective layer; (c) an undercoat layer to be provided between the image forming layer and a support; and (4) a back layer to be provided on the side opposite to the image forming layer.

Further, a layer serving as an optical filter may be provided, and it may be provided as the layer (a) or (b). An antihalation layer is provided in the light-sensitive material as the layer (c) or (d).

1) Surface Protective Layer

The photothermographic material in this embodiment may be provided with a surface protective layer for the purpose of preventing adhesion of the image forming layer, and for other purposes. The surface protective layer may be formed in a monolayered structure or in a multilayered structure. The surface protective layer is described in paragraph Nos. 0119 to 0120 of JP-A-11-65021, and Japanese Patent Application No. 2000-17936.

As the binder for the surface protective layer of this embodiment, gelatin is preferred. It is also preferably to use polyvinyl alcohol (PVA), or to use it in combination. Usable gelatin is inert gelatin (e.g., Nitta gelatin 750), phthalated gelatin (e.g., Nitta gelatin 801), or the like.

As PVA, mention may be made of the ones described in paragraph Nos. 0009 to 0020 of JP-A-2000-171936. Preferably, mention maybe made of PVA-105 of a completely saponified product, PVA-205 and PVA-335 of partially saponified products, and MP-203 of modified polyvinyl alcohol (all are trade names from Kuraray Co., Ltd.), and the like.

The coating amount (per square meter of the support) of polyvinyl alcohol of the protective layer (per one layer) is preferably 0.3 to 4.0 g/m$^2$, and more preferably 0.3 to 2.0 g/m$^2$.

The coating amount (per square meter of the support) of the total binder (including a water-soluble polymer and a latex polymer) of the protective layer (per one layer) is preferably 0.3 to 5.0 g/m$^2$, and more preferably 0.3 to 2.0 g/m$^2$.

2) Antihalation Layer

In the photothermographic material of this embodiment, an antihalation layer can be disposed in a distant position from an exposure light source relative to the light-sensitive layer. The antihalation layer is described in paragraph Nos. 0123 to 0124 of JP-A-11-65021, JP-A-11223898, JP-A-9-230531, JP-A-10-36695, JP-A-10-104779, JP-A-11-231457, JP-A-11-352625, JP-A-11-352626, and the like.

The antihalation layer contains an antihalation dye having an absorption in the exposure wavelength. When the exposure wavelength falls within the infrared region, an infrared-absorbing dye is desirably used. In such a case, the dye having no absorption in the visible region is preferred.

When antihalation is achieved using a dye having an absorption in the visible region, it is preferably configured such that the color of the dye will not substantially remain after image formation; a means for performing decolorizing by the heat from heat development is preferably used; and in particular, a heat decolorizable dye and a base precursor are preferably added to a non-light-sensitive layer so that the layer functions as an antihalation layer. These techniques are described in JP-A-11-231457, and the like.

The amount of the decolorizable dye to be added is determined according to the intended purpose of the dye. In general, the dye is used in an amount such that the optical density (absorbance) measured at an intended wavelength is more than 0.1. The optical density is preferably 0.2 to 2. The amount of the dye to be used for obtaining such an optical density is generally about 0.001 to about 1 g/m$^2$.

Incidentally, when the dye is decolorized in this manner, it is possible to lower the optical density after heat development to 0.1 or less. Two or more kinds of decolorizable dyes may also be used in combination in the heat decolorizing type recording materials or the photothermographic materials. Similarly, two or more kinds of base precursors may also be used in combination.

In heat decolorization using such a decolorizable dye and the base precursor, it is preferable to use a substance (e.g., diphenylsulfone, or 4-chlorophenyl (phenyl) sulfone) which decreases the melting point by 3° C. or more when mixed with the base precursor as described in JP-A-11-352626, in combination, from the viewpoint of the heat decolorization property, and the like.

3) Back Layer

The back layer applicable to this embodiment is described in paragraph Nos. 0128 to 0130 of JP-A-11-65021.

In this embodiment, a coloring agent having an absorption maximum at 300 to 450 nm can be added for the purposes of improving the silver color tone, and the change with time of images. Such coloring agents are described in JP-A-62-210458, JP-A-63-104046, JP-A-63-103235, JP-A-63-208846, JP-A-63-306436, JP-A-63-314535, JP-A-01-61745, and Japanese Patent Application No. 11-276751, and the like. Such a coloring agent is generally added in an amount in the range of 0.1 mg/m$^2$ to 1 g/m$^2$. As a layer to which it is added, a back layer disposed on the opposite side of the light-sensitive layer is preferred.

4) Matting Agent

In this embodiment, it is preferable to add a matting agent to the surface protective layer and the back layer for improving the transportability. The matting agents are described in paragraph Nos. 0126 to 0127 of JP-A-11-65021.

The matting agent is coated in an amount of preferably 1 to 400 mg/m$^2$, and more preferably 5 to 300 mg/m$^2$ when expressed in terms of the coating amount per square meter of the light-sensitive material.

Further, any matting degree of the emulsion surface is acceptable so long as stardust defects resulting in small spots on the image portion and leading to light leakage will not occur. However, Bekk smoothness is preferably 30 seconds or more and 2000 seconds or less, and in particular preferably 40 seconds or more and 1500 seconds or less. Bekk smoothness can be determined with ease by Japanese Industrial Standard (JIS) P8119 "Testing Method for Smoothness of Paper and Paperboard by Bekk Tester" and TAPPI Standard Method T479.

As the matting degree of the back layer in this embodiment, the Bekk smoothness is preferably 1200 seconds or less and 10 seconds or more, more preferably 800 seconds or less and 20 seconds or more, and furthermore preferably 500 seconds or less and 40 seconds or more.

In this embodiment, the matting agent is preferably contained in the outermost surface layer or a layer functioning as the outermost surface layer of the light-sensitive material, or in a layer near the outer surface thereof, or preferably contained in a layer serving as a so-called protective layer.

5) Polymer Latex

A polymer latex can be added to the surface protective layer and the back layer of this embodiment.

Such a polymer latex is described in *Gosei Jushi Emulsion*, (compiled by Taira Okuda and Hiroshi Inagaki, issued by Kobunshi Kanko Kai (1978)); *Gosei Latex no Oyo*, (compiled by Takaaki Sugimura, Yasuo Kataoka, Souichi Suzuki, and Keishi Kasahara, issued by Kobunshi Kanko Kai (1993)); *Gosei Latekkusu No Kagaku* (written by Soichi Muroi, issued by Kobunshi Kanko Kai (1970)), and the like. Specific example thereof may include latex of methyl methacrylate (33.5 weight %)/ethyl acrylate (50 weight %)/methacrylic acid (16.5 weight %) copolymer, latex of methyl methacrylate (47.5 weight %)/butadiene (47.5 weight %)/itaconic acid (5 weight %) copolymer, latex of ethyl acrylate/methacrylic acid copolymer, latex of methyl methacrylate (58.9 weight %)/2-ethylhexyl acrylate (25.4 weight %)/styrene (8.6 weight %)/2-hydroxyethyl methacrylate (5.1 weight %)/acrylic acid (2.0 weight %) copolymer, and latex of methyl methacrylate (64.0 weight %)/styrene (9.0 weight %)/butyl acrylate (20.0 weight %)/2-hydroxyethyl methacrylate (5.0 weight %)/acrylic acid (2.0 weight %) copolymer.

The polymer latex is used in an amount of preferably 10 weight % to 90 weight %, and in particular preferably 20 weight % to 80 weight % of the total binders (including the water-soluble polymer and the latex polymer) of the surface protective layer or the back layer.

6) Film Surface pH

The photothermographic material of this embodiment preferably has a film surface pH of 7.0 or less, and more preferably 6.6 or less, before heat development processing. The film surface pH has no particular restriction on the lower limit, but it is about 3. The pH is most preferably in the range of 4 to 6.2.

For controlling the film surface pH, an organic acid such as a phthalic acid derivative or a nonvolatile acid such as sulfuric acid, and a volatile base such as ammonia are preferably used from the viewpoint of reducing the film surface pH. In particular, ammonia is preferred to achieve a low film surface pH, because it tends to volatilize, and therefore it can be removed before the coating step or heat development. Whereas, the process in which a nonvolatile base such as sodium hydroxide, potassium hydroxide, or lithium hydroxide and ammonia are used in combination is also preferably employed. Incidentally, a method for measuring the film surface pH is described in paragraph No. 0123 of Japanese Patent Application No. 11-87297.

7) Hardening Agent

A hardening agent may also be used for respective layers such as the light-sensitive layer, the protective layer, and the back layer of this embodiment.

Examples of the hardening agent are mentioned in each method described in, *THE THEORY OF THE PHOTOGRAPHIC PROCESS, FOURTH EDITION*, written by T. H. James, (published by Macmillan Publishing Co., Inc., published in 1977), pp. 77–87. Other than chrome alum, 2,4-dichloro-6-hydroxy-s-triazine sodium salt, N,N-ethylenebis (vinylsulfonacetamide), and N,N-propylenebis (vinylsulfonacetamide), the polyvalent metal ions described on page 78 of the above article, and the like, polyisocyanates described in U.S. Pat. No. 4,281,060, JP-A-6-208193, and the like; epoxy compounds described in U.S. Pat. No. 4,791,042, and the like; vinylsulfone type compounds described in JP-A-62-89048, and the like may preferably be used.

The hardening agent is added in the form of a solution. The timing of adding the solution into a protective layer coating solution is from 180 minutes before to immediately before coating, and preferably from 60 minutes before to 10 seconds before coating. However, there is no particular restriction as to the mixing process and the mixing conditions so long as the effects of this embodiment satisfactorily occur.

As a specific mixing process, there are a method in which the mixing is performed in a tank configured such that the mean residence time therein calculated from the addition flow rate and the feeding amount to a coater becomes a desirable time; and a method using a static mixer described in Chapter 8 of *Ekitai Kongo Gijutsu* written by N. Harnby, M. F. Edwards, and A. W. Nienow, translated by Koji Takahashi, (published by Nikkan Kogyo Shinbunsha, 1989), and the like.

8) Surfactant

The surfactant applicable to this embodiment is described in paragraph No. 0132 of JP-A-11-65021.

In this embodiment, a fluorine-containing surfactant is preferably used. Specific preferred examples of the fluorine-containing surfactant may include the compounds described in JP-A-10-197985, JP-A-2000-19680, and JP-A-2000-214554. Further, the polymer fluorine-containing surfactants described in JP-A-9-281636 are also preferably used. In this embodiment, the fluorine-containing surfactants described in Japanese Patent Application No. 2000-206560 are in particular preferably used.

9) Antistatic Agent

Whereas, in this embodiment, the photothermographic material may have an antistatic layer containing various known metal oxides or conductive polymers. The antistatic layer may also serve as the undercoat layer, the back layer surface protective layer, or the like, or may also be separately provided. To the antistatic layer, the technologies described in paragraph No. 0135 of JP-A-11-65021, JP-A-56-143430, JP-A-56-143431, JP-A-58-62646, JP-A-56-120519, paragraph Nos. 0040 to 0051 of JP-A No. 11-84573, U. S. Pat. No. 5,575,957, and paragraph Nos. 0078 to 0084 of JP-A-11-223898 are applicable.

10) Support

For a transparent support, polyester, in particular, polyethylene terephthalate, subjected to a heat treatment at a temperature in the range of 130 to 185° C. is preferably used in order to relax the internal distortion remaining in the film during the biaxial stretching, and thereby to eliminate the thermal shrinkage distortion occurring during the heat development processing.

As a support of a photothermographic material to be used in combination with an ultraviolet emission screen, PEN can be preferably used. However, the support is not limited thereto. PEN is preferably polyethylene-2,6-naphthalate. The polyethylene 2,6-naphthalate as referred to in this embodiment may be any one of which the repeating structural unit is substantially composed of an ethylene 2,6-naphthalene dicarboxylate unit, inclusive of not only a non-copolymerized polyethylene 2,6-naphthalene dicarboxylate but also such a copolymer as that of which 10% or less, preferably 5% or less of the number of the repeating structural units are modified with other components, and a mixture with, and a composition of, other polymers.

Polyethylene 2,6-naphthalate is synthesized by linking naphthalene-2,6-dicarboxylicacid or its functional derivative, and ethylene glycol or its functional derivative in the presence of a catalyst under appropriate reaction conditions. The polyethylene 2,6-naphthalate as referred to in this embodiment may also be a copolymerized or mixed polyester obtained by adding one or, two or more appropriate third components (modifiers) to the polyethylene 2,6-naphthalate before the completion of the polymerization. As the appropriate third components, mention may be made of compounds having bivalent ester-forming functional groups, including, for example, compounds such as: dicarboxylic acids such as oxalic acid, adipic acid, phthalic acid, isophthalic acid, terephthalic acid, naphthalene-2,7-dicarboxylic acid, succinic acid, and diphenyl ether dicarboxylic acid, or lower alkyl esters thereof; oxycarboxylic acids such as p-oxybenzoic acid and p-oxyethoxybenzoic acid, or lower alkyl esters thereof; or dihydric alcohols such as propylene glycol and trimethylene glycol. Polyethylene 2,6-naphthalate or a modified polymer thereof may also be the one blocked at its terminal hydroxyl group and/or carboxyl group with monofunctional compounds such as benzoic acid, benzoylbenzoic acid, benzyloxybenzoic acid, and methoxy polyalkylene glycol. Alternatively, it may also be the one modified with a very small amount of tri-functional or tetra-functional ester-forming compound such as glycerin or pentaerythritol within such a range as to provide a substantially linear copolymer.

As for the photothermographic material for medical use, the transparent support may be colored by a blue dye (e.g., Dye-1 described in Example of JP-A-8-240877), or may be colorless.

Specific examples of the support are described in paragraph No. 0134 of JP-A-11-65021.

To the support, the undercoating techniques of the water-soluble polyester of JP-A-11-84574, the styrene-butadiene copolymer of JP-A-10-186565, the vinylidene chloride copolymer of JP-A-2000-39684 and paragraph Nos. 0063 to 0080 of Japanese Patent Application No. 11-106881, and the like are preferably applied.

11) Other Additives

To the photothermographic material, further, an antioxidant, a stabilizer, a plasticizer, a UV absorber, or a coating aid may also be added. The solvents described in paragraph No. 0133 of JP-A-11-65021 may also be added. Various additives are added to any of light-sensitive layers or non-light-sensitive layers. With regard to these, WO 98/36322, EP No. 803764A1, JP-A-10-186567, JP-A-10-18568, and the like can serve as references.

12) Coating Method

The photothermographic material in this embodiment may be coated by any method. Specifically, various coating operations including: extrusion coating, slide coating, curtain coating, dip coating, knife coating, flow coating, and extrusion coating using a hopper of the type described in U.S. Pat. No. 2,681,294 are used. Extrusion coating or slide coating described in LIQUID FILM COATING, written by Stephen F. Kistler, and Petert M. Schweizer, (published by CHAPMAN & HALL Co., Ltd., 1997), pp. 399 to 536 are preferably used. In particular, slide coating is preferably used.

An example of the shape of a slide coater for use in the slide coating is shown in FIG. 11b. 1, on page 427 of the same reference. Whereas, if desired, two layers or more layers may be applied at the same time with the method described from page 399 to page 536 of the same reference, and the methods described in U.S. Pat. No. 2,761,791 and GB No. 837,095.

The organic silver salt-containing layer coating solution in this embodiment is preferably a so-called thixotropy fluid. With regard to this technique, JP-A-11-52509 can serve as a reference.

The organic silver salt-containing layer coating solution in this embodiment has a viscosity at a shear rate of 0.1 $S^{-1}$ of preferably 400 mPa·s or more and 100,000 mPa·s or less, and more preferably 500 mPa·s or more and 20,000 mPa·s or less.

Whereas, at a shear rate of 1000 $S^{-1}$, the viscosity is preferably 1 mPa·s or more and 200 mPa·s or less, and further preferably 5 mPa·s or more and 80 mPa·s or less.

13) Packaging Material

The photothermographic material of this embodiment is preferably packaged hermetically in a packaging material with a low oxygen permeability and/or moisture permeability in order to suppress the degradation in photographic performances during storage before use, or in order to be prevented from falling into a curling or rolling habit for the product form in a roll state. The oxygen permeability is preferably 50 ml/atm/m²·day or less, more preferably 10 ml/atm/m²·day or less, and furthermore preferably 1.0 ml/atm/m²·day or less at 25° C. The moisture permeability is preferably 10 g/atm/m²·day or less, more preferably 5 g/atm/m²·day or less, and furthermore preferably 1 g/atm/m²·day or less. Specific examples of the usable packaging material with a low oxygen permeability and/or moisture permeability are the ones described in, for example, JP-A-8-254793 and JP-A-2000-206653.

14) Other Available Techniques

As the techniques usable for the photothermographic material of this embodiment, mention may also be made of: EP No. 803764A1, EP No. 883022A1, WO98/36322, JP-A-56-62648, JP-A-58-62644, JP-A-9-43766, JP-A-9-281637, JP-A-9-297367, JP-A-9-304869, JP-A-9-311405, JP-A-9-329865, JP-A-10-10669, JP-A-10-62899, JP-A-10-69023, JP-A-10-186568, JP-A-10-90823, JP-A-10-171063, JP-A-10-186565, JP-A-10-186567, JP-A-10-186569 to JP-A-10-186572, JP-A-10-197974, JP-A-10-197982, JP-A-10-197983, JP-A-10-197985 to JP-A-10-197987, JP-A-10-207001, JP-A-10-207004, JP-A-10-221807, JP-A-10-282601, JP-A-10-288823, JP-A-10-288824, JP-A-10-307365, JP-A-10-312038, JP-A-10-339934, JP-A-11-7100, JP-A-11-15105, JP-A-11-24200, JP-A-11-24201, JP-A-11-30832, JP-A-11-84574, JP-A-11-65021, JP-A-11-109547, JP-A-11-125880, JP-A-11-129629, JP-A-11-133536 to JP-A-11-133539, JP-A-11-133542, JP-A-11-133543, JP-A-11-223898, JP-A-11-352627, JP-A-11-305377, JP-A-11-305378, JP-A-11-305384, JP-A-11-305380, JP-A-11-316435, JP-A-11-327076, JP-A-11-338096, JP-A-11-358098, JP-A-11-338099, JP-A-11-343420, JP-A-2000-187298, JP-A-2001-200414, JP-A-2001-234635, JP-A-2002-20699, JP-A-2001-275471, JP-A-2001-275461, JP-A-2000-313204, JP-A-2001-292844, JP-A-2000-324888, JP-A-2001-293864, and JP-A-2001-348546.

15) Color Image Formation

A multicolor photothermographic material is configured such that it may contain a combination of these two layers for each color, or may contain all ingredients in a single layer as described in U.S. Pat. No. 4,708,928.

As for the multicolor photothermographic material, respective emulsion layers are generally kept in such a relation as to be distinct from each other by using a functional or non-functional barrier layer between the respective light-sensitive layers as described in U.S. Pat. No. 4,460,681.

3. Image Formation Method 3-1 Exposure

The photothermographic material of this embodiment may be either of a "single sided type" having an image forming layer only on one side of a support, or of a "double sided type" having image forming layers on opposite sides.

(Double Sided Type Photothermographic Material)

The photothermographic material of this embodiment can be preferably used for an image formation method for recording an X-ray image using an X-ray intensifying screen.

The image forming method preferably uses a photothermographic material requiring an exposure amount of $1 \times 10^{-6}$ W·sec/m² or more and $1 \times 10^{-3}$ W·sec/m² or less, preferably $6 \times 10^{31\ 6}$ W·sec/m² or more and $6 \times 10^{-4}$ W·sec/m² or less necessary for obtaining an image density of adding 0.5 to the lowest density of an image obtained by exposing with a monochromatic light having an wavelength identical with the wavelength of a peak main emission light of an X-ray intensifying screen and having a half-value width of 15±5 nm.

The process of forming an image using the photothermographic material comprises the following steps:

(a) a step of setting the photothermographic material between a pair of X-ray intensifying screens, and thereby obtaining an assembly for image formation;

(b) a step of arranging a specimen between the assembly and an X ray source;

(c) a step of irradiating the specimen with an X ray having an energy level within a range of 25 kVp to 125 kVp;

(d) a step of taking out the photothermographic material from the assembly; and (e) a step of heating the photothermographic material taken at a temperature within a range of 90° C. to 180 ° C.

The photothermographic material for use in the assembly in this embodiment is preferably prepared so as to provide, when subjected to stepwise exposure with an X ray and heat development, an image having a characteristic curve on rectangular coordinates equal in coordinate unit length of the optical density (D) and the exposure (logE), in which the mean gamma (γ) formed between the point of the minimum density (Dmin)+density 0.1 and the point of the minimum density (Dmin)+density 0.5 is 0.5 to 0.9, and the mean gamma (γ) formed between the point of the minimum density (Dmin)+density 1.2 and the point of the minimum density (Dmin)+density 1.6 is 3.2 to 4.0. Use of the photothermographic material having such a characteristic curve for the X ray photographing system of this embodiment can result in an X-ray image having excellent photographic characteristics such as a very elongated leg and high gamma in the medium density region. The photographic characteristics advantageously result in the favorable descriptive property of the low density region such as the mediastinum portion or the shadow of the heart, which allows a small amount of X-rays to be transmitted therethrough, also the easy-to-view density of the image of the lung field which allows a large amount of X-rays to be transmitted therethrough, and the favorable contrast.

The photothermographic material having the foregoing preferred characteristic curve can be manufactured with ease in the following manner. For example, each of the image forming layers on opposite sides is composed of two or more layers of silver halide emulsion layers having mutually different sensitivities. Particularly, each image forming layer is preferably formed by using a high sensitivity emulsion for the upper layer, and using an emulsion having a low sensitivity and a hard photographic characteristic for the lower layer. The difference in sensitivity of the silver halide emulsion between the respective layers when such image forming layers composed of two layers are used is 1.5 times or more and 20 times or less, and preferably 2 times or more and 15 times or less. Incidentally, the ratio of the emulsions to be used for the respective layers varies according to the difference in sensitivity between the emulsions to be used and the covering power. In general, the larger the sensitivity difference is, the more the ratio of the emulsion on the high sensitivity side to be used is reduced. For example, the preferred ratio of the respective emulsions to be used when the sensitivity difference is two times is controlled so as to be a value within a range of 1:20 or more and 1:50 or less in terms of the ratio of high sensitivity emulsion to low sensitivity emulsion in the silver equivalent amount in the case where the covering powers are substantially equal.

For the techniques of crossover cut (double-sided light-sensitive material) and antihalation (single-sided light-sensitive material), the dyes, or the dyes and the mordants described in JP-A-2-68539, line 1 in the lower left column, page 13, to line 9 in the lower left column, page 14, may be used.

Next, the fluorescent intensifying paper (radiation intensifying screen) of this embodiment will be described. The radiation intensifying screen is composed, as a basic structure, of a support and a phosphor layer formed on one side thereof. The phosphor layer is a layer containing a phosphor dispersed in a binder. Incidentally, a transparent protective layer is generally provided on the surface of the phosphor layer opposite to the support (the surface on the side not facing the support) to protect the phosphor layer from chemical change in quality and physical impact.

In this embodiment, as preferred phosphors, mention may be made of the following ones: tungstate type phosphors ($CaWO_4$, $MgWO_4$, $CaWO_4$:Pb, and the like), terbium-activated rare earth element oxysulfide type phosphors [$Y_2O_2S$:Tb, $Gd_2O_2S$:Tb, $La_2O_2S$:Tb, $(Y,Gd)_2O_2S$:Tb, $(Y,Gd)O_2S$:Tb, Tm, and the like], terbium-activated rare earth element phosphate type phosphors ($YPO_4$:Tb, $GdPO_4$:Tb, $LaPO_4$:Tb, and the like) terbium-activated rare earth element oxyhalide type phosphors [LaOBr:Tb, LaOBr:Tb, Tm, LaOCl:Tb, LaOCl:Tb, Tm, LaOBr:Tb, GdOBr:Tb, GdOCl:Tb, and the like], thulium-activated rare earth element oxyhalide type phosphors [LaOBr:Tm, LaOCl:Tm, and the like], a barium sulfate type phosphors [$BaSO_4$:Pb, $BaSO_4$:$Eu^{2+}$, $(Ba,Sr)SO_4$:$Eu^{2+}$, and the like], bivalent europium-activated alkaline earth metal phosphate type phosphors [$(Ba_2PO_4)_2$:$Eu^{2+}$, $(Ba_2PO_4)_2$:$Eu^{2+}$, and the like], bivalent europium-activated alkaline earth metal fluorohalide type phosphors [$BaFCl$:$Eu^{2+}$, $BaFBr$:$Eu^{2+}$, $BaFCl$:$Eu^{2+}$, Tb, $BaFBr$:$Eu^{2+}$, Tb, $BaF_2.BaCl.KCl$:$Eu^{2+}$, (Ba,Mg) $F_2.BaCl.KCl$:$Eu^{2+}$, and the like], iodide type phosphors (CsI:Na, CsI:Tl, NaI, KI:Tl, and the like), sulfide type phosphors [ZnS:Ag, (Zn, Cd)S:Ag, (Zn,Cd)S:Cu, (Zn,Cd)S:Cu, Al, and the like], hafnium phosphate type phosphors ($HfP_2O_7$:Cu, and the like), and $YTaO_4$, and the ones obtained by adding various activators thereto as luminescent centers. However, the phosphors for use in this embodiment are not limited thereto, and any phosphors are usable so long as they are the phosphors showing light emission in the visible or near-ultraviolet region through irradiation with a radiation.

In the X-ray fluorescence intensifying screen used preferably in the invention, 50% or more of emission light is in a range from 350 nm to 420 nm wavelength. Particularly, the fluorescent material is preferably a bivalent Eu-activated fluorescent material and, more preferably, bivalent Eu-activated barium halide series fluorescent material. The emission wavelength region is, preferably, from 360 nm to 420 nm and, more preferably, 370 nm to 420 nm. Further, a more preferred fluorescent screen has emission of 70% or more and, more preferably. 85% or more in the region described above.

The ratio of the emission light is calculated by the following method. That is, the emission spectrum is measured while taking the emission wavelength at an equal distance as the anti-logarithm on the abscissa and taking the number of emitted photons on the ordinate. The value obtained by dividing the area from 350 nm or more and 420 nm or less by the area for the entire emission spectrum on the chart is defined as the emitting ratio at a wavelength of 350 nm or more and 420 nm or less. When the emission light is present in such wavelength region, high sensitivity is attained by the combination with the photothermographic material of the invention.

In order that most of emission light of the fluorescent material exist in the wavelength region described above, the half-value width of the emission light is preferably narrower. A preferred half-value width is 1 nm or more and 70 nm or less, more preferably, 5 nm or more and 50 nm or less and, further preferably, 10 nm or more and 40 nm or less.

There is no particular restriction on the fluorescent material to be used so long as the light emission described above is obtained. For the improvement of the sensitivity as an object of the invention, the fluorescent material is preferably an Eu-activated fluorescent material having bivalent Eu as an emission center.

Specific examples of such fluorescent material are shown below but the invention is not limited thereto.

They include, for example, BaFCl:Eu, BaFBr:Eu, BaFI:Eu and halogen compositions modified therefrom, $BaSO_4$:Eu, SrFBr:Eu, SrFCl:Eu, SrFI:Eu, $(Sr,Ba)Al_2Si_2O_8$:Eu, $SrB_4O_7F$:Eu, $SrMgP_2O_7$:Eu, $Sr_3(PO_4)_2$:Eu, and $Sr_2P_2O_7$:Eu.

A more preferred fluorescent material is a bivalent Eu activated barium halide fluorescent material represented by the formula:$MX_1X_2$:Eu. M comprises Ba as a main ingredient which can preferably contain a small amount of other compounds such as Mg, Ca and Sr. $X_1$ and $X_2$ each represents a halogen atom which can be selected optionally from F, Cl, Br and I. $X_1$ is preferably fluorine. $X_2$ can be selected from Cl, Br and I, and a composition comprising several of the halogen compounds in admixture can also be used preferably.

More preferably, X=Br. Eu is europium. Eu as the emission center is contained at a ratio to Ba preferably of $10^{-7}$ or more and 0.1 or less, more preferably, $10^{-4}$ or more and 0.05 or less. A small amount of other compound may also be mixed preferably. Most preferred fluorescent material includes BaFCl:Eu, BaFBr:Eu, and $BaFBr_{1-x}I_x$:Eu.

<Fluourescence Intensifying Screen>

The fluorescence intensifying screen comprises, preferably, a support, an undercoat layer on the support, a fluorescent material layer, and a surface protective layer.

The fluorescent material layer can be formed by dispersing particles of the fluorescent material into a solution of an organic solvent containing a binder resin to prepare a liquid dispersion, and then directly coating the liquid dispersion on a support (or on an undercoat layer in a case where the undercoat layer such as a light reflection layer is formed on the support), followed by drying. Alternatively, the liquid dispersion may be coated on a separately prepared provisional support, followed by drying to prepare a fluorescent body sheet, and then the fluorescent material may be peeled from the provisional support and appended on a usual support by using an adhesive.

The grain size of the fluorescent material particles is not limited particularly and it is usually within a range about from 1 μm to 15 μm and, preferably, within a range about from 2 μm to 10 μm. The volumetric packaging rate of the fluorescent material particles in the fluorescent material layer is preferably higher. It is usually within a range from 60 to 85%, preferably, within a range from 65 to 80% and, particularly preferably, within a range from 68 to 75% (the ratio of the fluorescent material particles in the fluorescent material layer is usually 80 weight % or more, preferably, 90 weight % or more and, particularly preferably, 95 weight % or more). The binder resin, the organic solvent, and various kinds of optional additives used for forming the fluorescent material layer are described in various known literatures. The thickness of the fluorescent material layer can be set optionally depending on the aimed sensitivity. Preferably, it is within a range from 70 μm to 150 μm for the screen on the front side, and within a range from 80 μm to 400 μm for the screen on the back side. The X-ray absorbability of the fluorescent material layer is determined depending on the coating amount of the fluorescent material particles.

The fluorescent material layer may be a single layer or may comprise two or more layers. It is preferably one to three layers and, more preferably, one or two layers. For example, layers each comprising fluorescent material particles of different grain size with a relatively narrow grain size distribution may be stacked, in which the grain size may be smaller in the layer nearer to the support. It is particularly preferred to coat fluorescent material particles of larger grain size on the side of a surface protective layer and to coat fluorescent material particles of smaller grain size on the side of the support. Preferably, those of the smaller grain size are within a range from 0.5 μm to 2.0 μm and those of the larger grain size are within a range from 10 μm to 30 μm. Further, the fluorescent material layer may be formed by mixing fluorescent material particles of different grain size. Alternatively, as described in JP-B No. 55-33560, page 3, left column, line 3 to page 4, left column, line 39, a fluorescent material layer may be of a structure in which the grain size distribution of the fluorescent material particles has a gradient. Usually, the fluctuation coefficient for the grain size distribution of the fluorescent material is within a range from 30 to 50% but mono-dispersed fluorescent material particles with the fluctuation coefficient of 30% or less may also be used preferably.

It has been attempted to provide a preferred sharpness by dying the fluorescent material layer to the emission wavelength. However, a layer design to retain the dying as less as possible is used preferably. The absorption length of the fluorescent material layer is, preferably, 100 μm or more and, more preferably, 1000 μm or more.

The scattering length is designed, preferably, to 0.1 μm or more and 100 μm or less and, more preferably, 1 μm or more and 100 μm or less. The scattering length and the absorption length can be calculated according to the calculation formula based on the Kubelka-Munk's theory.

The support can be appropriately selected for use depending on the purpose from various kinds of supports used for known radiation intensifying screens. For example, a polymer film containing a white pigment such as titanium dioxide or a polymer film containing a black pigment such as carbon black can be used preferably. An undercoat layer such as a light reflection layer containing a light reflection material may also be provided to the surface of the support (surface on the side provided with the fluorescent material layer). A light reflection layer as described in JP-A No. 2001-124898 can also be used preferably. Particularly, a light reflection layer using yttrium oxide as described in Example 1 of the above mentioned patent document or a light reflection layer as described in Example 4 of this patent document is used preferably. For the preferred light reflection layer, descriptions in JP-A No. 2001-124898, from page 3, right column, line 15 to page 4, right column, line 23 can be referred to.

A surface protective layer is provided preferably on the surface of the fluorescent material layer. The light scattering length measured at the main emission wavelength of the fluorescent material is preferably within a range from 5 μm to 80 μm and, more preferably, within a range from 10 μm to 70 μm and, particularly preferably, within a range from 10 μm to 60 μm. The light scattering length represents a mean distance for the straight propagation of light till scattering for once, and shorter scattering length means higher light scattering property. Further, while the light absorption length expressing the mean free distance till the absorption of light is optional, it is preferred that the surface protective layer has no adsorption with a view point of the screen sensitivity since this results in less desensitization. In order to compensate the insufficiency of scattering, a slight absorbability may be provided. The absorption length is, preferably, 800 μm or more and, particularly preferably, 1200 μm or more. The light scattering length and the light absorption length can be calculated according to the calculation formula based on the Kubelka-Munk's theory by using the values measured by the following method.

At first, three or more film specimens each having a composition identical with that of the surface protective layer to be measured and having thickness different from each other are prepared. Then, the thickness (μm) and the diffuse transmittance factor (%) for each of the film specimens is measured. The diffusion transmittance can be measured by a device in which an integrating sphere is attached to a usual spectrophotometer. Upon measurement in the invention, a self-recording spectrophotometer (Model U-3210, manufactured by Hitachi Ltd.) provided with a 150 φ integrating sphere (150-0901) is used. It is necessary that the measuring wavelength is aligned with the peak wavelength of the main emission light of the fluorescent material in the fluorescent material layer as an object to which the surface protective layer is attached. Then, the measured values for the thickness (μm) and the diffuse transmittance (%) of the film are introduced into the following formula (A) derived from the Kubelka-Munk's theoretical formula. The formula (A) can be introduced simply, for example, from the formulae in 5.1.12 to 5.1.15, page 403, in "Fluorescent Material Handbook" (edited by Fluorescent Material Dogakukai, published from Ohm Co in 1987) under the boundary condition for the diffuse transmittance factor T (%).

$$T/100 = 4\beta[(1+\beta)^2 \cdot \exp(\alpha d) - (1-\beta)^2 \cdot \exp(-\alpha d)] \text{formula (A)} \quad \text{[Equation 1]}$$

In the formula, T represents diffuse a transmittance factor (%), d represents a film thickness (μm), and each of α and β is defined by the following formulae:

$$\alpha = [K \cdot (K+2S)]^{1/2}$$

$$\beta = [K/(K+2S)]^{1/2} \quad \text{[Equation 2]}$$

T (diffuse transmittance factor %) and d (film thickness: μm) measured for three or more films are introduced respectively into the formula (A) above to calculate K and S that satisfy the formula (A). The scattering length (μm) is defined by 1/S and the absorption wavelength (μm) is defined by 1/K.

It is preferred that the surface protective layer has a constitution in which the light scattering particles are dispersed and contained in the resin material. The optical refractive index of the light scattering particles is usually 1.6 or more and, preferably, 1.9 or more. Further, the grain size of the light scattering particles is usually within a range from 0.1 μm to 1.0 μm. Examples of the light scattering particles can include, for example, fine particles of aluminum oxide, magnesium oxide, zinc oxide, zinc sulfide, titanium oxide, niobium oxide, barium sulfate, lead carbonate, silicon oxide, polymethyl methacrylate, styrene, and melamine.

The resin material used for forming the surface protective layer has no particular restriction, and polyethylene terephthalate, polyethylene naphthalate, polyamide, alamide, fluoro resin and polyester resin can be used preferably. The surface protective layer can be formed by dispersing the light scattering particles into a solution of an organic solvent containing a resin material (binder resin) to prepare a liquid dispersion and directly coating the liquid dispersion on the fluorescent material layer (or by way of an optional auxiliary layer), followed by drying. Alternatively, a sheet for use in the protective layer formed separately may be attached onto the fluorescent material layer by using an adhesive. The thickness of the surface protective layer is usually within a range from 2 μm to 12 μm and, preferably, within a range from 3.5. μm to 10 μm.

Further, preferred manufacturing methods for radiation-intensifying screens and materials used therefor are described specifically, for example, in JP-A No. 9-21899, page 6, left column, line 47 to page 8, left column, line 5, JP-A No. 6-347598, page 2, right column, line 17 to page 3, left column line 33, and page 3, left column line 42 to page 4, left column, line 22 thereof, and the descriptions of them can be referred to.

The fluorescent intensifying paper for use in this embodiment is preferably filled with a phosphor in a gradient particle diameter structure. In particular, preferably, large-diameter phosphor particles are applied on the surface protective layer side, and small-diameter phosphor particles are applied on the support side. Preferably, the diameter of the small-diameter particle is in the range of 0.5 to 2.0 μm, and the diameter of the large-diameter particle is in the range of 10 to 30 μm.

(Single-sided Photothermographic Material)

The single-sided photothermographic material in this embodiment is in particular preferably used as a mammographic X-ray sensitive material.

It is important that the single-sided photothermographic material to be used for the object of the invention is designed so as to provide an image with a contrast within a proper range.

As for the preferred constituent features as the mammographic X-ray sensitive material, JP-A-5-45807, JP-A-10-62881, JP-A-10-54900, and JP-A-11-109564 can serve as references.

(Combination with Ultraviolet Fluorescent Screen)

As an image formation method using the photothermographic material of this embodiment, a method for forming an image by the combination with a phosphor having a main peak at 400 nm or less may be preferably used. A method for forming an image by the combination with a phosphor having a main peak at 380 nm or less is further preferably used. Either of the double-sided light-sensitive material and the single-sided light-sensitive material maybe used in the form of an assembly. As the screen having a main light emission peak at 400 nm or less, the screens described in JP-A-6-11804 and WO 93/01521, and the like are used, but the usable screens are not limited thereto. As the techniques of ultraviolet crossover cut (double-sided light-sensitive material) and antihalation (single-sided light-sensitive material), the techniques described in JP-A-8-76307 are usable. The ultraviolet absorbing dyes are in particular preferably the dyes described in Japanese Patent Application No. 2000-320809.

3-2 Heat Development

The photothermographic material of this embodiment may be developed in any manner. However, in general, the imagewise exposed photothermographic material is developed by heating. The preferred development temperature is 80 to 250° C., and further preferably 100 to 140° C.

The development time is preferably 1 to 60 seconds, further preferably 5 to 30 seconds, and in particular preferably 5 to 20 seconds.

As a system for heat development, a plate heater system may be used other than the system by the heat development apparatus in accordance with the invention. For a heat development system by the plate heater system, the method described in JP-A-11-133572 is preferred. The system is a heat development apparatus whereby a photothermographic material on which a latent image has been formed is brought into contact with a heating unit in a heat development unit to obtain a visible image. The heat development apparatus is characterized in that the heating unit comprises a plate heater, a plurality of presser rollers are disposed along one surface of the plate heater and in positions opposite thereto, and that heat development is performed by allowing the photothermographic material to pass between the presser rollers and the plate heater. Preferably, the plate heater is sectioned into 2 to 6 stages, and the tip is reduced in temperature by about 1 to 10° C.

Such a method is also described in JP-A-54-30032. This can remove the moisture and the organic solvent contained in the photothermographic material out of the system, and can suppress the change in shape of the support of the photothermographic material caused by rapidly heating the photothermographic material.

3-3. System

Other than the heat development apparatus in accordance with the invention, as a laser imager having an exposure part and a heat development part for the medical use, Fuji Medical Dry Imager FM-DPL can be mentioned. The system is described in Fuji Medical Review No. 8, pp. 39 to 55. The techniques are applicable. Whereas, these techniques are also applicable as the photothermographic material for the laser imager in "AD network" proposed by Fuji Medical System, Co., Ltd., as a network system adapted to the DICOM Standards.

4. Application of this Embodiment

The photothermographic material using the high silver iodide photographic emulsion of this embodiment forms a black and white image based on a silver image. It is preferably used as a photothermographic material for the medical diagnosis, as a photothermographic material for the industrial photography, as a photothermographic material for the printing use, and as a photothermographic material for the COM use.

EXAMPLES

Below, a specific description will be given to the photothermographic material by way of examples, which should not be construed as liming the photothermographic material of this embodiment.

1. Preparation of PET Support and Undercoating

1-1. Film Formation

PET having an intrinsic viscosity IV=0.66 (measured at 25° C. in phenol/tetrachloroethane=6/4 (weight ratio)) was obtained according to an ordinary method by using terephthalic acid and ethylene glycol. This was pelletized, and then dried at 130° C. for 4 hours. The dried PET was colored in blue by a blue dye (1,4-bis(2,6-diethylanilino)anthraquinone), and then extruded through a T-die, and cooled rapidly to prepare an unstreched film.

Using rolls different in circumferential speed, this was longitudinally stretched to 3.3 times, and then laterally stretched to 4.5 times by means of a tenter. The temperatures at this step were 110° C. and 130° C., respectively. Thereafter, the stretched film was thermally fixed at 240° C. for 20 seconds, and then subjected to relaxation in the lateral direction by 4% at the same temperature. Then, after slitting the chuck portion of the tenter, the opposite ends were subjected to knurl processing, and the film was wound at 4 kg/cm² to obtain a 175 μm-thick roll.

1-2. Surface Corona Treatment

Using a 6-KVA model of solid state corona treatment apparatus manufactured by Pillar Corporation, the opposite surfaces of the support were treated at 20 m/minute under room temperature. From the read values of current and voltage at this step, it was confirmed that the support was treated at 0.375 kV·A·minute/m². The treatment frequency at this step was 9.6 kHz, and the gap clearance between the electrode and a dielectric roll was 1.6 mm.

1-3 Preparation of Undercoated Support

| (1) Preparation of an undercoat layer coating solution Formulation (1) (for undercoat layer on the side of light sensitive layer) | |
|---|---|
| $SnO_2/SbO$ (9/1 weight ratio, average particle size 0.5 μm, 17 weight % dispersion) | 84 g |
| PESRESIN A-520 (30 weight % solution) manufactured by Takamatsu Yushi. Co. | 46.8 g |
| Baironal MD-1200 manufactured by Toyo Boseki K.K. | 10.4 g |
| Polyethylene glycol monononylphenyl ether (average ethylene oxide number = 8.5) 1 weight % solution | 11.0 g |
| MP-1000 (fine PMMA polymer particles, average particle size 0.4 μm) manufactured by Soken Chemical Co. | 0.91 g |

Distilled Water 847 ml

Both surfaces of the 175 μm-thick biaxially stretched polyethylene terephthalate support were respectively subjected to the corona discharge treatment. Then, one surface was coated with the undercoating solution formulation (1) by a wire bar in a wet coating amount of 6.6 ml/m² (per side), and dried at 180° C. for 5 minutes. This operation was carried out on both the surfaces, thereby to prepare an undercoated support.

2. Preparation of Materials for Coating

1) Silver Halide Emulsion
(Preparation of Silver Halide Emulsion A)

To 1421 ml of distilled water, 4.3 ml of a 1 weight % potassium iodide solution was added, and further, 3.5 ml of 0.5 mol/L sulfuric acid, 36.5 g of phthalated gelatin, and 160 ml of a 5 weight % methanol solution of 2,2'-(ethylene-dithio)diethanol were added. The resulting solution was kept at a temperature of 75° C. with stirring in a reaction jar made of stainless steel. Solution A was prepared by diluting 22.22 g of silver nitrate with the addition of distilled water to 218 ml, and Solution B was prepared by diluting 36.6 g of potassium iodide with the addition of distilled water to a volume of 366 ml. The whole amount of Solution A was added thereto at a constant flow rate over 16 minutes. Solution B was added thereto while keeping the pAg at 10.2 with a controlled double jet method. Then, 10 ml of a 3.5 weight % hydrogen peroxide aqueous solution was added thereto, and further, 10.8 ml of a 10 weight % aqueous solution of benzimidazole was added thereto. Further, Solution C was prepared by diluting 51.86 g of silver nitrate with the addition of distilled water to 508.2 ml, and Solution D was prepared by diluting 63.9 g of potassium iodide to a volume of 639 ml with distilled water. The whole amount of Solution C was added at a given flow rate over 80 minutes. Whereas, Solution D was added while keeping the pAg at 10.2 with a controlled double jet method. Potassium hexachloroiridate (III) was added in an amount of $1 \times 10^{-4}$ mol per mole of silver all at once after 10 minutes from the start of addition of Solutions C and D. Whereas, an aqueous solution of potassium iron (II) hexacyanide was added in an amount of $3 \times 10^{-4}$ mol per mole of silver all at once after 5 seconds from the completion of addition of Solution C. The pH was adjusted to 3.8 using a sulfuric acid with a concentration of 0.5 mol/L, and stirring was stopped. Then, steps of sedimentation/desalting/washing with water were carried out. The resulting mixture was adjusted to a pH of 5.9 with sodium hydroxide with a concentration of 1 mol/L. Thus, a silver halide dispersion with a pAg 11.0 was prepared.

Silver halide emulsion A was a pure silver iodide emulsion. The tabular grains having a mean projected area diameter of 0.93 μm, a variation coefficient of the mean projected area diameter of 17.7%, a mean thickness of 0.057 μm, and a mean aspect ratio of 16.3 accounted for 80% or more of the whole projected area. The sphere equivalent diameter was 0.42 μm. The results of an X-ray powder diffraction analysis indicated that 30% or more of the silver iodide was present in the γ phase form.

(Preparation of Silver Halide Emulsion B)

One mole of a tabular grain AgI emulsion prepared with Silver halide emulsion A was placed in a reaction vessel. The pAg was measured at 38° C., and found to be 10.2. Then, by double jet addition, a 0.5 mol/l KBr solution and a 0.5 mol/l AgNO$_3$ solution were added at 10 ml/min over 20 minutes, thereby to substantially precipitate a 10 mol % silver bromide in the epitaxial form on a AgI host emulsion. During the operation, the pAg was maintained at 10.2. Further, the pH was adjusted to 3.8 using a sulfuric acid with a concentration of 0.5 mol/L, and stirring was stopped. Then, steps of sedimentation/desalting/washing with water were carried out. The resulting mixture was adjusted to a pH of 5.9 with sodium hydroxide with a concentration of 1 mol/L. Thus, a silver halide dispersion with a pAg of 11.0 was prepared.

The silver halide dispersion was kept at 38° C. with stirring, to which was added 5 ml of a 0.34 weight % methanol solution of 1,2-benzisothiazolin-3-one, and the mixture was heated to 47° C. after 40 minutes. After 20 minutes from the heating, sodium benzenethiosulfonate was added in an amount of $7.6 \times 10^{-5}$ mol per mole of silver in the form of methanol solution. Further, after 5 minutes, Tellurium sensitizer C was added thereto in an amount of $2.9 \times 10^{-5}$ mol per mole of silver in the form of methanol solution, followed by aging for 91 minutes. Then, 1.3 ml of a 0.8 weight % methanol solution of N,N'-dihydroxy-N''-diethylmelamine was added thereto, and after another 4 minutes, thereto were added 5-methyl-2-mercaptobenzimidazole in the form of methanol solution in an amount of $4.8 \times 10^{-3}$ mol per mole of silver, 1-phenyl-2-heptyl-5-mercapto-1,3,4-triazole in the form of methanol solution in an amount of $5.4 \times 10^{-3}$ mol per mole of silver, and 1-(3-methylureidophenyl)-5-mercaptotetrazole in the form of aqueous solution in an amount of $8.5 \times 10^{-3}$ mol per mole of silver. As a result, Silver halide emulsion B was prepared.

<Preparation of Silver Halide Emulsion C>

A solution A was prepared by forming a solution by adding 8 ml of 10 weight % potassium iodide solution to 1421 ml of distilled water and further 4.6 g of gelatin phthalide and 160 ml of a 5 weight % methanol solution of 2,2'-(ethylenedithio) diethanol, keeping the liquid temperature at 75° C. in a stainless steel reaction pot while stirring and adding distilled water to 22.7 g of silver nitrate to dilute to 223 ml, and a solution B was formed by diluting 36.6 g of potassium iodide with distilled water to 366 ml volume. The solution A was added entirely at a constant flow rate for 15 min. 22 sec, and the solution B was added by a controlled double jet method while keeping pAg to 9.96. Then, 10 ml of an aqueous 3.5 weight % solution of hydrogen peroxide was added and, further, 10.8 ml of an aqueous 10 weight % solution of benzoimidazole was added. Further, a solution C formed by adding distilled water to 53.1 g of silver nitrate to dilute to 520.2 ml and a solution D formed by adding distilled water to 63.9 g of potassium iodide to dilute to 639 ml were added such that the solution C was added entirely at a constant flow rate for 80 min and the solution D was added by a controlled bubble jet method while keeping pAg at 9.96. Potassium hexachloroiridate (III) was added by the entire amount so as to be $1 \times 10^{-4}$ per one mol of silver 10 min after the start of addition of the solution C and the solution D. Further, an aqueous solution of potassium hexacyano ferrate (II) was added by $3 \times 10^{-4}$ mol per one mol of silver by the entire amount 5 sec after the completion of addition of the solution C. pH was adjusted to 3.8 using sulfuric acid at 0.5 mol/L concentration, stirring was stopped and settling/desalting/water washing step was carried out. pH was adjusted to 5.9 using sodium hydroxide at 1 mol/L concentration to prepare a silver halide dispersion at pAg of 11.0.

The obtained host particles are a pure silver iodide emulsion, comprising 80% or more, for the entire projection area, of tabular particles having an average projection area diameter of 0.93 μm, a fluctuation coefficient of average projection area diameter of 17.7%, an average thickness of 0.057 μm and an average aspect ratio of 16.3. The sphere equivalent diameter was 0.42 μm. As a result of analysis by X-ray powder diffraction analysis, 90% or more of silver iodide was present as the γ-phase.

Preparation of Silver Halide Emulsion D

One mol of AgI particles was put in a reaction vessel. pAg was 10.2 as measured at 40° C. Then, a halogen solution containing 0.088 mol of KBr and 0.038 mol of NaCl in one liter and 0.125 mol/L of an AgNO$_3$ solution were added at 28.7 ml/min for 31 min by a double jet addition and silver chlorobromide was precipitated epitaxially in an amount of 10 mol % base on entire silver amount at 6 point corners on the AgI host emulsion. pAg was kept at 7.13 during operation.

Further, pH was adjusted to 3.8 using sulfuric acid at 0.5 mol/L concentration, stirring was stopped and precipitation/desalting/washing step was carried out. pH was adjusted to 5.9 using sodium hydroxide at 1 mol/L concentration and silver halide dispersion at pAg of 11.0 was prepared. When the average halogen composition for the epitaxial portion was determined by preparing a micro thin slice for the silver halide particle epitaxial portion and determining by a field emission type analysis electron microscope, it was 80 mol % of bromine, 17 mol % of chlorine and 3 mol % of iodine.

The silver halide dispersion was kept at 38° C. while stirring, 5 ml of a 0.34 weight % methanol solution of 1,2-benzoisothiazoline-3-one was added and, 40 min after, temperature was elevated to 60° C. 20 min after the temperature elevation, sodium benzenethiosulfonate in a methanol solution was added by $7.6 \times 10^{-5}$ mol per one mol of silver and, further 5 min after, a methanol solution of a tellurium sensitizer C was added by $2.9 \times 10^{-5}$ mol per one mol of silver and aged for 91 min. Then, 1.3 ml of 0.8 weight % methanol solution of N,N'-dihydroxy-N'',N'''-diethylmelamine was added. Further 4 min after, 5-methyl-2-mercaptobenzoimidazole as a methanol solution was added by $4.8 \times 10^{-3}$ mol per one mol of silver and 1-phenyl-2-heptyl-5-mercapto-1,3,4-triazole as a methanol solution was added by $5.4 \times 10^{-3}$ mol per one mol of silver and 1-(3-methylureido-5-mercapto-tetrazole as an aqueous solution was added by $8.5 \times 10^{-3}$ mol per one mol of silver to prepare silver halide emulsion D.

(Preparation of Mixed Emulsion for Coating Solution)

Silver halide emulsion B and Silver halide emulsion D were mixed and dissolved together in a silver molar ratio of 5:1. Thereto, benzothiazolium iodide was added in the form of a 1 weight % aqueous solution in an amount of $7 \times 10^{-3}$ mol per mole of silver. Further, Compounds 1, 2, and 3 capable of being one-electron oxidized to become a one-electron oxidation product, and releasing one or more electrons were each added in an amount of $2\times10^{-3}$ mol per mole of silver of the silver halide.

Whereas, Compounds 1, 2, and 3 having an adsorbing group and a reducing group were each added in an amount of $8\times10^{-3}$ mol per mole of silver of the silver halide.

Further, water was added so that the content of the silver halide per liter of the mixed emulsion for coating solution became 15.6 g.

2) Preparation of Fatty Acid Silver Dispersion (Preparation of Recrystallized Behenic Acid)

100 Kg of behenic acid (trade name: Edenor C22-85R) manufactured by Henckel Co., was mixed with 1200 Kg of isopropyl alcohol, and dissolved at 50° C. The resulting mixture was filtrated through a 10-μm filter, and then cooled to 30° C. to perform recrystallization. The cooling speed for performing recrystallization was controlled to 3° C./hour. The obtained crystals were subjected to centrifugal filtration, and applied and washed with 100 Kg of isopropyl alcohol, followed by drying. The obtained crystals were subjected to esterification and a GC-FID measurement. This indicated that the silver behenate content was 96%, and that, other than this, lignoceric acid in an amount of 2%, arachidic acid in an amount of 2%, and erucic acid in an amount of 0.001% were contained therein.

(Preparation of Fatty Acid Silver Dispersion)

88 Kg of recrystallized behenic acid, 422 L of distilled water, 49.2 L of an aqueous solution of NaOH with a concentration of 5 mol/L, and 120 L of t-butyl alcohol were mixed, and stirred at 75° C. for 1 hour to effect the reaction, thereby obtaining Sodium behenate solution B. Separately, 206.2 L of an aqueous solution of 40.4 kg of silver nitrate (pH 4.0) was prepared, and kept at a temperature of 10° C. A reaction vessel containing 635 L of distilled water and 30 L of t-butyl alcohol therein was kept at a temperature of 30° C., and the whole amount of Sodium behenate solution previously prepared and the whole amount of the aqueous solution of silver nitrate were added with sufficient stirring thereto at a constant flow rate over 93 minutes and 15 seconds and over 90 minutes, respectively. This step was carried out in the following manner. Only the aqueous solution of silver nitrate was added for 11 minutes after the start of addition of the aqueous solution of silver nitrate. Thereafter, addition of the sodium behenate solution was started, and only the sodium behenate solution was added for 14 minute and 15 seconds after completion of the addition of the aqueous solution of silver nitrate. At this step, the temperature in the reaction vessel was set at 30° C., and the temperature of the outside was controlled so that the liquid temperature was maintained constant. Further, the piping of the addition system for the sodium behenate solution was heat-insulated by circulating warm water outside the double pipe, and adjusted so that the liquid temperature at the outlet of the tip of the addition nozzle became 75° C. Whereas, the piping of the addition system for the aqueous solution of silver nitrate was heat-insulated by circulating cool water outside the double pipe. The position of adding the sodium behenate solution and the position of adding the aqueous solution of silver nitrate were arranged symmetrically with respect to the stirring shaft as the center, and adjusted at such a height as not to cause contact with the reaction solution.

After completion of the addition of the sodium behenate solution, the mixture was allowed to stand with stirring for 20 minutes with the temperature unchanged, and heated to 35° C. over 30 minutes, followed by aging for 210 minutes. Immediately after completion of aging, the solid content was separated by centrifugal filtration, and then the solid content was washed with water until the conductivity of the filtrate water became 30 μS/cm. A fatty acid silver salt was obtained in this manner. The obtained solid content was not dried, and stored in the form of a wet cake.

The shapes of the obtained silver behenate grains were evaluated by an electron microscopic photography, so that the grains were found to be crystals having a=0.21 μm, b=0.4 μm, and c=0.4 μm, in average values, an average aspect ratio of 2.1, and a variation coefficient of sphere equivalent diameter of 11% (a, b, and c are defined in this specification).

To the wet cake corresponding to 260 kg of the dry solid content, 19.3 Kg of polyvinyl alcohol (trade name: PVA-217) and water were added to make the total amount 1000 Kg. Then, the resulting mixture was made into a slurry by means of a dissolver blade, and further pre-dispersed by means of a pipeline mixer (PM-10 model: manufactured by MIZUHO Industrial Co., Ltd.).

Then, the pre-dispersed stock dispersion was treated three times by means of a dispersing machine (trade name: Microfluidizer M-610, manufactured by Microfluidex International Corporation, using a Z model interaction chamber) with the pressure controlled to be 1150 kg/cm$^2$ to obtain a silver behenate dispersion. During the cooling operation, the dispersion temperature was set at 18° C. by providing coiled heat exchangers fixed before and after the interaction chamber, and controlling the temperature of the refrigerant.

(3) Preparation of Reducing Agent Dispersion

Preparation of Reducing Agent-1 Dispersion 10 kg of water was added to 10 kg of a reducing agent-1 (1,1-bis(2-hydroxy-3,5-dimethylphenyl)-3,5,5-trimethyl-hexane and 16 kg of an aqueous 10 weight % solution of modified polyvinyl alcohol (Poval MP203, manufactured by Kuraray Co.) and mixed thoroughly to form a slurry. The slurry was fed by a diaphragm pump, dispersed for 3 hours by a horizontal sand mil (UVM-2; manufactured by Imex Co.) filled with zirconia beads of an average diameter of 0.5 mm, then 0.2 g of sodium salt of benzoisothiazolinon and water were added to control such that the concentration of the reducing agent was 25 weight %. The liquid dispersion was heat treated at 60° C. for 5 hrs to obtain a reducing agent-1 dispersion. The reducing agent particles contained in the thus obtained reducing agent dispersion had a median diameter of 0.40 μm and a maximum grain size of 1.4 μm or less. The thus obtained reducing agent dispersion was filtered through a polypropylene filter of 3.0 μm pore size to remove obstacles such as dusts and then stored.

4) Preparation of Hydrogen Bonding Compound Dispersion (Preparation of Hydrogen Bonding Compound-1)

To 10 Kg of Hydrogen bonding compound-1 (tri(4-t-butylphenyl)phosphine oxide), and 16 Kg of a 10 weight % aqueous solution of modified polyvinyl alcohol (POVAL MP203 manufactured by Kuraray Co., Ltd.), 10 Kg of water was added, and well mixed, resulting in a slurry. The slurry was fed through a diaphragm pump to a sand mill of horizontal type (UVM-2: manufactured by Imex Co., Ltd.) filled with zirconia beads having an average diameter of 0.5 mm, and dispersed therein for 4 hours. Then, 0.2 g of benzothiazolinone sodium salt and water were added thereto, so that the concentration of the hydrogen bonding compound was adjusted to 25 weight %. The dispersion was heated at 40° C. for 1 hour, and subsequently further warmed at 80° C. for another hour to obtain Hydrogen bonding compound-1 dispersion. The hydrogen bonding compound grains contained in the hydrogen bonding compound dispersion thus obtained had a median diameter of 0.45 μm and a maximum grain diameter of 1.3 μm or less. The hydrogen bonding compound dispersion obtained was filtered through a filter made of polypropylene, having a pore size of 3.0 μm, to remove foreign matters such as dusts, and stored.

5) Preparation of Development Accelerator Dispersion and Tone Modifier Dispersion (Preparation of Development Accelerator-1 Dispersion)

To 10 Kg of Development accelerator-1, and 20 Kg of a 10 weight % aqueous solution of modified polyvinyl alcohol (POVAL MP203 manufactured by Kuraray Co., Ltd.), 10 Kg of water was added, and well mixed, resulting in a slurry. The slurry was fed through a diaphragm pump to a sand mill of horizontal type (UVM-2, manufactured by Imex Co., Ltd.) filled with zirconia beads having an average diameter of 0.5 mm, and dispersed therein for 3 hours and 30 minutes. Then, 0.2 g of benzothiazolinone sodium salt and water were added thereto, so that the concentration of the development accelerator was adjusted to 20 weight %. Thus, Development accelerator-1 dispersion was obtained. The development accelerator grains contained in the development accelerator dispersion thus obtained had a median diameter of 0.48 μm and a maximum grain diameter of 1.4 μm or less. The development accelerator dispersion obtained was filtered through a filter made of polypropylene, having a pore size of 3.0 μm, to remove foreign matters such as dusts, and stored.

Also for the solid dispersions of Development accelerator-2 and Tone modifier-1, dispersion was carried out in the same manner as with Development accelerator-1, to obtain 20 weight % and 15 weight % dispersions, respectively.

6) Preparation of Polyhalogen Compound Dispersion (Preparation of Organic Polyhalogen Compound-1 Dispersion)

10 Kg of Organic polyhalogen compound-1 (tribromomethane sulfonylbenzene), 10 Kg of a 20 weight % aqueous solution of modified polyvinyl alcohol (POVAL MP203 manufactured by Kuraray Co., Ltd.), 0.4 Kg of a 20 weight % aqueous solution of sodium triisopropyl naphthalene sulfonate, and 14 Kg of water were added together, and well mixed, resulting in a slurry. The slurry was fed through a diaphragm pump to a sand mill of horizontal type (UVM-2, manufactured by Imex Co., Ltd.) filled with zirconia beads having an average diameter of 0.5 mm, and dispersed therein for 5 hours. Then, 0.2 g of benzothiazolinone sodium salt and water were added thereto, so that the concentration of the organic polyhalogen compound was adjusted to 30 weight %. Thus, Organicpolyhalogen compound-1 dispersion was obtained. The organic polyhalogen compound grains contained in the organic polyhalogen compound dispersion thus obtained had a median diameter of 0.41 μm and a maximum grain diameter of 2.0 μm or less. The organic polyhalogen compound dispersion obtained was filtered through a filter made of polypropylene having a pore size of 10.0 μm to remove foreign matters such as dusts, and stored.

(Preparation of Organic Polyhalogen Compound-2 Dispersion)

10 Kg of Organic polyhalogen compound-2 (N-butyl-3-tribromomethane sulfonyl benzamide), 20 Kg of a 10 weight % aqueous solution of modified polyvinyl alcohol (POVAL MP203 manufactured by Kuraray Co., Ltd.), and 0.4 Kg of a 20 weight % aqueous solution of sodium triisopropyl naphthalene sulfonate were added together, and well mixed, resulting in a slurry. The slurry was fed through a diaphragm pump to a sand mill of horizontal type (UVM-2, manufactured by Imex Co., Ltd.) filled with zirconia beads having an average diameter of 0.5 mm, and dispersed therein for 5 hours. Then, 0.2 g of benzothiazolinone sodium salt and water were added thereto, so that the concentration of the organic polyhalogen compound was adjusted to 30 weight %. The resulting dispersion was warmed at 40° C. for 5 hours to obtain Organic polyhalogen compound-2 dispersion. The organic polyhalogen compound grains contained in the polyhalogen compound dispersion thus obtained had a median diameter of 0.40 μm and a maximum grain diameter of 1.3 μm or less. The organic polyhalogen compound dispersion obtained was filtered through a filter made of polypropylene, having a pore size of 3.0 μm, to remove foreign matters such as dusts, and stored.

7) Preparation of Silver Iodide Complex Forming Agent

8 Kg of modified polyvinyl alcohol MP203 was dissolved in 174.57 Kg of water. Then, 3.15 Kg of a 20 weight % aqueous solution of sodium triisopropyl naphthalene sulfonate and 14.28 Kg of a 70 weight % aqueous solution of 6-isopropylphthalazine were added thereto to prepare a 5 weight % solution of a silver iodide complex forming agent compound.

8) Preparation of Mercapto Compound (Preparation of Mercapto Compound)

(Preparation of Mercapto Compound-1 Aqueous Solution)

7 g of Mercapto compound-1 (1-(3-sulfophenyl)-5-mercaptotetrazole sodium salt) was dissolved in 993 g of water, resulting in a 0.7 weight % aqueous solution.

(Preparation of Mercapto Compound-2 Aqueous Solution)

20 g of Mercapto compound-2 (1-(3-methylureidephenyl)-5-mercaptotetrazole) was dissolved in 980 g of water, resulting in a 2.0 weight % aqueous solution.

9-1 Preparation of SBR Latex Liquid

SBR latex (TP-1) was prepared as described below.

287 g of distilled water, 7.73 g of a surfactant (Pionin A-43-S (manufactured by Takemoto Yushi Co.): solid content, 48.5 weight %), 14.06 ml of 1 mol/L NaOH, 0.15 g of tetrasodium ethylenediamine tetraacetate, 255 g of styrene, 11.25 g of acrylic acid and 3.0 g of tert-dodecylmercaptane were charged in a polymerization vessel of a gas monomer reaction device (model TAS-2J, manufactured by Taiatsu Glass Industry Co.), the reaction vessel was tightly closed and they were stirred at a stirring speed of 200 rpm. After evacuating by a vacuum pump and repeating nitrogen gas substitution for several times, 108.75 g of 1,3-butadiene was charged under pressure and the temperature was elevated to an internal temperature of 60° C. A solution containing 1.875 g of ammonium persulfate dissolved in 50 ml of water was added and stirred for 5 hours as it was. Further, stirring was conducted for three hours under temperature elevation to 90° C., and after lowering the internal temperature to a room temperature after the completion of the reaction, pH was adjusted to 8.4 by using LiOH at 1 mol/L. Then, the filtration was carry out by a polypropylene filter with a pore size of 1.0 μm to remove obstacles such as dusts and stored to obtain 774.7 g of an SBR latex. When halogen ions were measured by ion chromatography, chloride concentration was 3 ppm. As a result of measuring the concentration of the chelating agent by high speed liquid chromatography, it was 145 ppm.

The latex had an average particle size of 90 nm, Tg=17° C., a solid concentration of 44 weight %, an equilibrium water content of 0.6 weight % at 25° C. and 60% RH, and an ionic conductivity of 4.80 mS/cm (ionic conductivity was measured by using a conductivity meter CM-30S manufactured by Toa Denpa Industry Co. for the stock latex solution (44 weight %) at 25° C.).

9-2) Preparation of Isoprene Latex Liquid

Isoprene latex (TP-2) was prepared as described below.

1500 g of distilled water was added to a polymerization vessel of a gas monomer reaction device (model TAS-2J, manufactured by Taiatsu Glass Industry Co.) and heated at 90° C. for 3 hours to form passivated films on the stainless surface of the polymerization vessel or members of a stirring device made of stainless steel. To the thus treated polymerization vessel, 582.28 g of distilled water bubbled with a nitrogen gas for one hour, 9.49 g of a surfactant (Pionin A-43-S, manufactured by Takemoto Yushi Co.), 19.5 g of NaoH of 1 mol/L, 0.20 g of tetrasodium ethylenediamine tetraacetate, 314.99 g of styrene, 190.87 g of isoprene, 10.43 g of acrylic acid, and 2.09 g of tert-dodecyl mercaptane were charged, the reaction vessel was tightly closed and they were stirred at a stirring speed of 225 rpm and the internal temperature was elevated to 65° C. A solution containing 2.61 g of ammonium persulfate dissolved in 40 ml of water was added and stirred for 6 hours as it was. The polymerization conversion ratio at this time was 90% based on the measurement for solid content. Then, a solution containing 5.22 g of acrylic acid dissolved in 46.98 g of water was added and, successively, 10 g of water was added and a solution containing 1.30 g of ammonium persulfate dissolved in 50.7 ml of water was further added. After addition, temperature was elevated to 90° C., and they were stirred for 3 hours. After completion of the reaction and lowering the internal temperature to the room temperature, pH was adjusted to 8.4 by using 1 mol/L LiOH. Then, they were filtered by a filter made of polypropylene having 1.0 μm pore size removed with obstacles such as dusts and stored, to obtain 1248 g of isoprene latex TP-1. When halogen ions were measured by ion chromatography, the chloride ion concentration was 3 ppm. As a result of measuring the concentration of chelating agent by high speed liquid chromatography, it was 142 ppm.

The latex had an average particle size of 113 nm, Tg=15° C., a solid concentration of 41.3 weight %, an equilibrium water content at 25° C. and 60% RH of 0.4 weight %, and an ionic conductivity of 5.23 mS/cm (ionic conductivity was measured by using a conductivity meter CM-30S manufactured by Toa Denpa Industry Co).

10) Preparation of Nucleating Agent Dispersion 2.5 g of polyvinyl alcohol (PVA-217 manufactured by Kuraray) and 87.5 g of water were added to 10 g of a compound No. SH-7 as the nucleating agent and stirred thoroughly to form a slurry which was left for 3 hours. Then, 240 g of 0.5 mm zirconia beads were charged in a vessel together with the slurry, and dispersed for 10 hours by a dispersing machine (¼ G sand grinder mill: manufactured by Imex Co.), to prepare a fine solid particle dispersion of the nucleating agent. 80 weight % of the particles had grain size of 0.1 μm to 1.0 μm, and the average grain size was 0.5 μm.

1-3-2 Preparation of Coating Solution

1) Preparation of Emulsion Layer (Light Sensitive Layer) Coating Solution-1

To 1,000 g of the fatty acid silver salt dispersion obtained as described above and 276 ml of water, were added organic polyhalogen compound-1 dispersion, organic polyhalogen compound-2 dispersion, SBR latex (TP-1) solution, isoprene latex (TP-2) solution, reducing agent-1 dispersion, nucleating agent dispersion, hydrogen bonding compound-1 dispersion, development promotor-1 dispersion, development promoter-2 dispersion, color toning agent-1 dispersion, aqueous mercapto compound-1 solution, and aqueous mercapto compound-2 solution, successively, and, after adding the silver iodide complex forming agent, the silver halide emulsion mixture for silver halide coating solution was added just before coating by 0.22 mol as the amount of silver per 1 mol of a silver salt of a fatty acid, thoroughly mixed and fed as it was to a coating dye and coated.

The viscosity of the emulsion layer coating solution was determined by means of a B-model viscometer from Tokyo Instrument Co., Ltd., and was found to be 25 [mPa·s] at 40° C. (No. 1 rotor, 60 rpm).

The viscosities of the coating solution at 25° C. determined by means of a RFS fluid spectrometer produced by Rheometrics Far East Co., Ltd., were 242, 65, 48, 26, and 20 [mPa·s] at shear rates of 0.1, 1, 10, 100, and 1000 [1/sec], respectively.

The amount of zirconium in the coating solution was 0.52 mg per gram of silver.

2) Preparation of Emulsion-side Intermediate Layer Coating Solution

To 1000 g of polyvinyl alcohol PVA-205 (manufactured by Kuraray Co., Ltd.), 4200 ml of a 19 weight % solution of methyl methacrylate/styrene/butyl acrylate/hydroxyethyl methacrylate/acrylic acid copolymer (copolymerization weight ratio 64/9/20/5/2) latex, 27 ml of a 5 weight % aqueous solution of Aerosol OT (manufactured by American Cyanamide Co.), and 135 ml of a 20 weight % aqueous solution of diammonium phthalate, water was added to make the total amount 10000 g. The mixture was adjusted to pH 7.5 with NaOH, resulting in an intermediate layer coating solution. The solution was fed to a coating die so as to achieve 9.1 ml/m².

The viscosity of the coating solution was determined by means of a B-model viscometer, and found to be 58 [mPa·s] at 40° C. (No. 1 rotor, 60 rpm).

3) Preparation of Emulsion-side Protective-layer First Layer Coating Solution 64 g of inert gelatin was dissolved in water. To the resulting solution, 112 g of a 19.0 weight % solution of methyl methacrylate/styrene/butyl acrylate/hydroxyethyl methacrylate/acrylic acid copolymer (copolymerization weight ratio 64/9/20/5/2) latex, 30 ml of a 15 weight % methanol solution of phthalic acid, 23 ml of a 10 weight % aqueous solution of 4-methylphthalic acid, 28 ml of sulfuric acid with a concentration of 0.5 ml/L, 5 ml of a 5 weight % aqueous solution of Aerosol OT (manufactured by American Cyanamide Co.), 0.5 g of phenoxy ethanol, and 0.1 g of benzisothiazolinone were added. To the mixture, water was added to make the total amount 750 g, resulting in a coating solution. 26 ml of 4 weight % chrome alum was mixed therein by a static mixer immediately before coating. The resulting mixture was fed to a coating die so as to achieve 18.6 ml/m².

The viscosity of the coating solution was determined by means of a B-model viscometer, and found to be 20 [mPa·s] at 40° C. (No. 1 rotor, 60 rpm).

4) Preparation of Emulsion-side Protective-layer Second Layer Coating Solution 80 g of inert gelatin was dissolved in water. To the resulting solution, 102 g of a 27.5 weight % solution of methyl methacrylate/styrene/butyl acrylate/hydroxyethyl methacrylate/acrylic acid copolymer (copolymerization weight ratio 64/9/20/5/2) latex, 5.4 ml of a 2 weight % solution of fluorine-containing surfactant (F-1), 5.4 ml of a 2 weight % aqueous solution of fluorine-containing surfactant (F-2), 23 ml of a 5 weight % solution of Aerosol OT (manufactured by American Cyanamide Co.), 4 g of polymethyl methacrylate fine particles (average particle diameter 0.7 μm, and body weighted mean distribution 30%), 21 g of polymethyl methacrylate fine particles (average particle diameter 3.6 μm, and body weighted mean distribution 60%), 1.6 g of 4-methylphthalic acid, 4.8 g of phthalic acid, 44 ml of sulfuric acid with a concentration of 0.5 mol/L, and 10 mg of benzisothiazolinone were added. To the mixture, water was added to make the total amount 650 g. 445 ml of an aqueous solution containing 4 weight % chrome alum and 0.67 weight % phthalic acid were mixed therein by a static mixer immediately before coating, resulting in a surface protective layer coating solution. The solution was fed to a coating die so as to achieve 8.3 ml/m².

The viscosity of the coating solution was determined by means of a B-model viscometer, and found to be 19 [mPa·s] at 40° C. (No. 1 rotor, 60 rpm).

1-4 Preparation of Photothermographic Material-1

An image forming layer, an intermediate layer, a first surface protective layer, and a second surface protective layer were coated in this order from the undercoat surface by simultaneous stack coating by a slide bead coating method to prepare specimens 1 to 7 for the photothermographic material. The temperature was controlled to 31° C. for the image forming layer and the intermediate layer, to 36° C. for the first surface protective layer and to 37° C. for the second surface protective layer.

The coating amount of silver as the total of the silver fatty acid salt and the silver halide was 0.821 g/m² per one surface and 1.72 g/m² for both surfaces in total in the image forming layer.

The coating amount (g/m²) for each of the compounds in the image forming layer per one surface is as described below.

| | |
|---|---|
| Silver fatty acid salt (as silver) | 0.686 |
| Polyhalogen compound-1 | 0.028 |
| Polyhalogen compound-2 | 0.094 |
| Silver iodide complex forming agent | 0.46 |
| SBR latex | 5.20 |
| SBR latex (TP-1) | 2.09 |
| Isoprene latex (TP-2) | 3.13 |
| Reducing agent-1 | 0.46 |
| Nucleating agent | 0.036 |
| Hydrogen bonding compound-1 | 0.15 |
| Development promoter-1 | 0.005 |
| Development promoter-2 | 0.035 |
| Color toning agent-1 | 0.002 |
| Mercapto compound-1 | 0.001 |
| Mercapto compound-2 | 0.003 |
| Silver halide (as Ag) | 0.175 |

The coating and drying conditions were as follows.

Electrostatic charges were eliminated from the support by ionic air before coating, and the coating was carried out at a speed of 160 m/min. The coating and drying conditions were controlled within the following ranges for each sample, and set to be the conditions capable of providing the most stable surface conditions.

The clearance between the tip of the coating die and the support was set at 0.10 to 0.30 mm;

The pressure in a reduced pressure chamber was set at a pressure lower than atmospheric pressure by 196 to 882 Pa;

In a subsequent chilling zone, the coating solutions were cooled by air having a dry-bulb temperature of 10 to 20 ° C.;

Through non-contact type transfer, the sample was dried by dry air having a dry-bulb temperature of 23 to 45 ° C., and a wet-bulb temperature of 15 to 21° C. in a helical non-contact type drying apparatus;

After drying, the sample was subjected to moisture conditioning at 25° C. and humidify 40% to 60% RH; and Subsequently, the sample was heated so that the temperature of the film surface was elevated to 70 to 90° C. After heating, the film surface was cooled to 25° C.

The prepared photothermographic material showed matting degrees of 250 seconds, in terms of Bekk smoothness. Whereas, the pH of the film surface on the light-sensitive layer surface side was determined, and found to be 6.0.

[0345]

Below, the chemical structures of the compounds used in this example will be shown.

Tellurium Sensitizer C

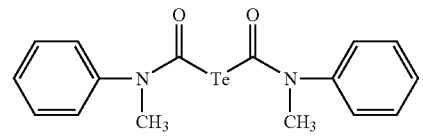

Compound 1 capable of being one-electron oxidized to become a one-electron oxidation product, and releasing one or more electrons:

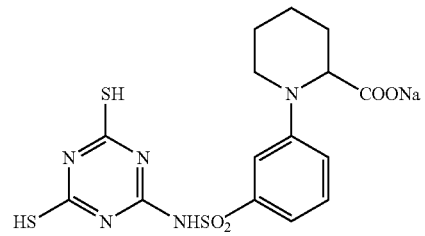

Compound 2 capable of being one-electron oxidized to become a one-electron oxidation product, and releasing one or more electrons:

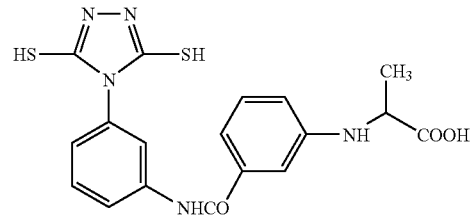

Compound 3 capable of being one-electron oxidized to become a one-electron oxidation product, and releasing one or more electrons:

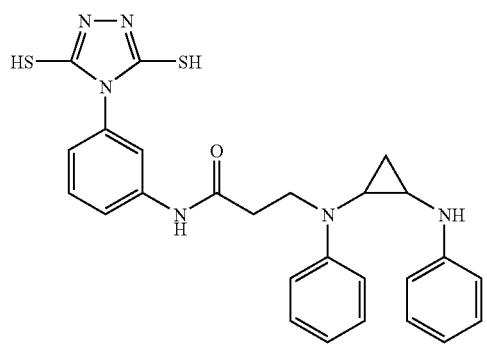
Compound 1 having an adsorbing group and a reducing group
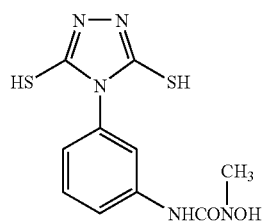
Compound 2 having an adsorbing group and a reducing group
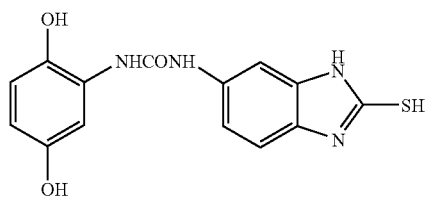
Compound 3 having an adsorbing group and a reducing group
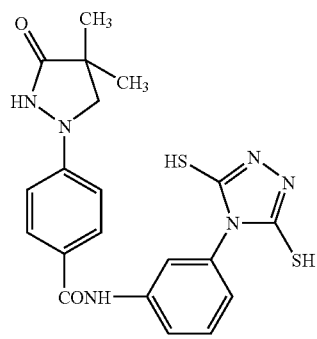
-continued
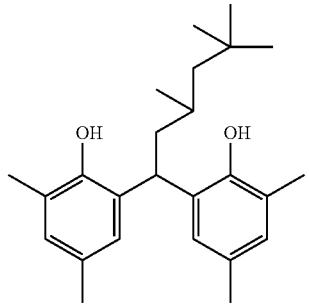
(Reducing agent-1)
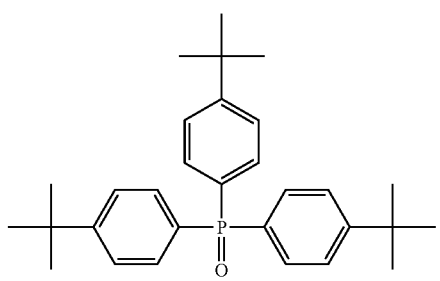
(Hydrogen bonding compound-1)
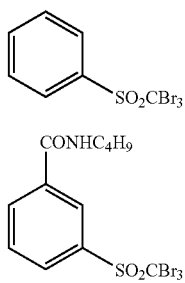
(Polyhalogen compound-1)
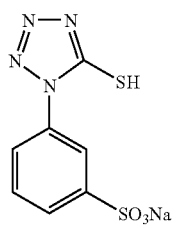
(Polyhalogen compound-2)
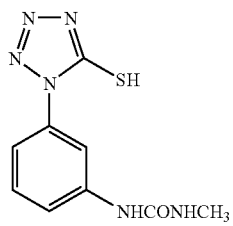
(Mercapto compound-1)
(Mercapto compound-2)
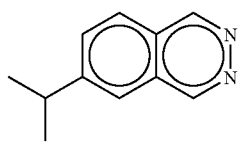
(Silver iodide complex forming agent)

-continued (Development accelerator-1)

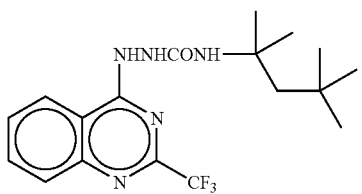

(Development accelerator-2)

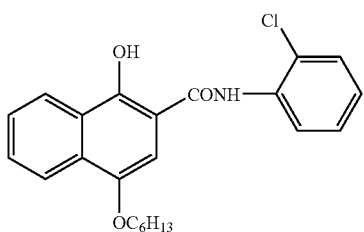

(Tone modifier-1)

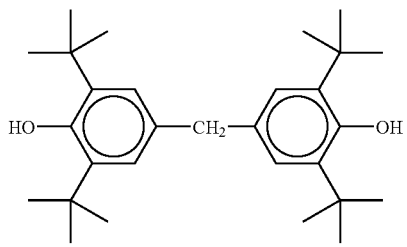

(F-1)

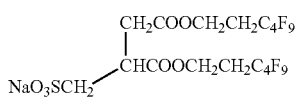

(F-2)

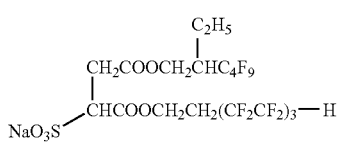

(Evaluation of Photographic Performances)

Each sample obtained was cut into a half size, and each cut sample was packaged in the following packaging material under the environment of 25° C. and 50% RH, and stored at ordinary temperatures for 2 weeks. Then, the following evaluations were carried out.

(Packaging Material)

PET 10μ/PE 12μ/aluminum foil 9μ/Ny 15μ/3 weight % carbon-containing polyethylene 50μ, Oxygen permeability: 0.02 ml/atm·m$^2$·25° C.·day, Moisture permeability: 0.10 g/atm·m$^2$·25g° C.·day.

The thus prepared double-sided coated light sensitive materials were evaluated as described below.

Two sheets of fluorescence intensifying screen A were used and a specimen was put therebetween to prepare an image forming assembly. The assembly was put to X-ray exposure for 0.05 sec and X-ray sensitometry was carried out. The X-ray apparatus used was DRX-3724HD; trade name of products manufactured by Toshiba Co., in which a tungsten target was used. X-rays obtained by applying a voltage at 80 kVp to three phases by a pulse generator and passing through a 7 cm water filter having absorption substantially equivalent with a human body were used as a light source. The X-ray exposure amount was changed by a distance method and stepwise exposure was carried out at a notch of logE=0.15. After exposure, heat development was carried out under the following heat development conditions. The obtained images were evaluated by a densitometer.

1. Preparation of Fluorescence Intensifying Screen A (1) Preparation of Undercoat Layer.

A light reflection layer made of an alumina powder having a film thickness of 50 μm after dying was formed on a 250 μm polyethylene terephthalate (support) in the same manner as in Example 4 of JP-A-2001-0124898.

(2) Preparation of Fluorescent Material Sheet 250 g of BaFBr:Eu fluorescent material (average grain size 3.5 μm), 8 g of a polyurethane binder resin (trade name: Pandex T 5265M, manufactured by Dai Nippon Ink Chemical Industry), 2 g of an epoxy binder resin (trade name: Epicoat 1001, manufactured by Yuka Shell Epoxy Co.) and 0.5 g of an isocyanate compound (trade name: Colonate HX, manufactured by Nippon Polyurethane Industry) were added to methyl ethyl ketone, which were dispersed by a propeller mixer to prepare a coating solution for forming a fluorescent material layer having a viscosity of 25 PS (at 25° C.). The coating solution was coated on a surface of a provisional support (a polyethylene terephthalate sheet previously coated with a silicone releasing agent) and dried to form a fluorescent material layer. The fluorescent material layer was peeled off from the provisional support to obtain a fluorescent material sheet.

(3) Provision of Fluorescent Material Sheet on Light Reflection Layer

The fluorescent material described above was overlaid on the surface of the light reflection layer of a support with a light reflection layer manufactured in the step 1) described above, which was pressed by a calendar roll under a pressure of 400 kgw/cm$^2$ at a temperature of 80° C., to form a fluorescent material layer on the light reflection layer. The thickness of the fluorescent material layer was 125 μm and the volume filling ratio of the fluorescent particles in the fluorescent material layer was 68%.

(4) Formation of Surface Protective Layer

A polyester adhesive was coated on one surface of a polyethylene terephthalate (PET) having a thickness of 6 μm, and a surface protective layer was formed on the fluorescent material layer by a lamination method. Thus, a fluorescence intensifying screen A comprising the support, the light reflection layer, the fluorescent material layer and the surface protection layer was obtained.

(5) Light Emitting Characteristics

Figure 5:
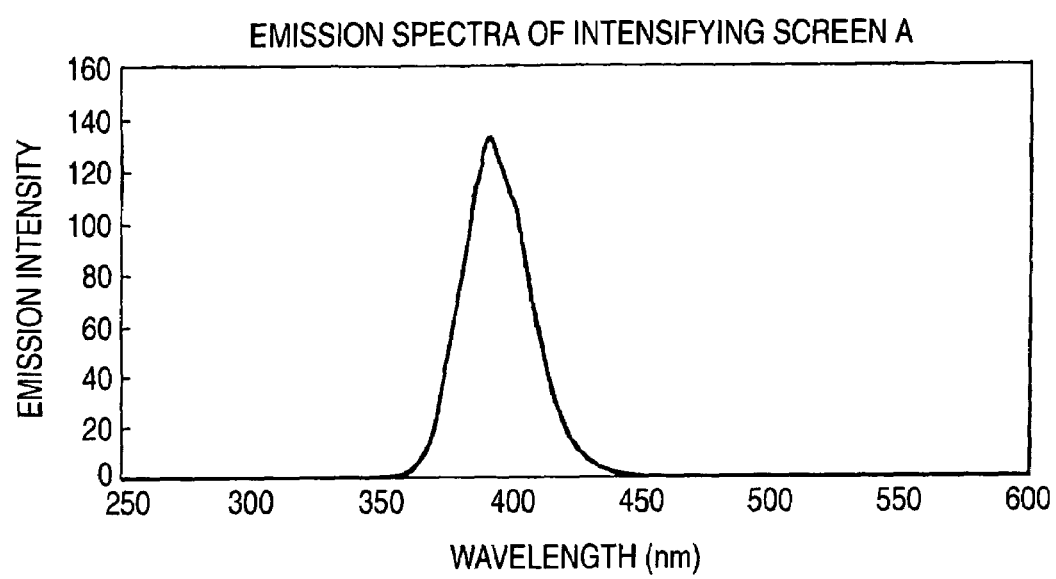
FIG. 5 is a graph showing emission spectra of the intensifying screen.
Figure 6:
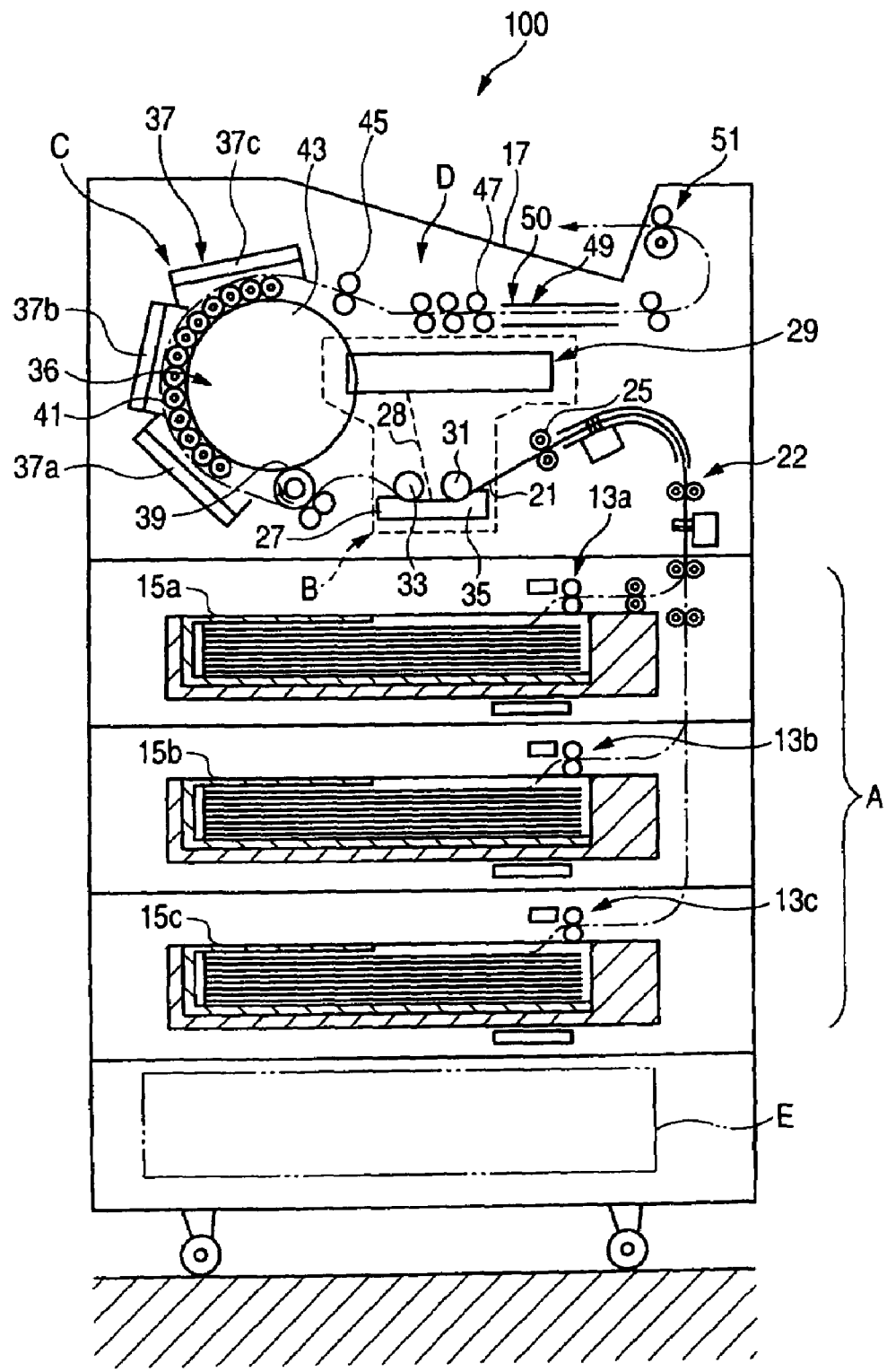
FIG. 6 is a cross sectional view showing a schematic structure of a conventional heat development recording apparatus for use in medical image recording as a dry system not including a wet processing.

FIG. 5 shows emission spectra of the intensifying screen A measured by X-rays at 40 kVp. The fluorescent intensifying screen A showed emission of narrow half-value width with a peak at 390 nm.

On the other hand, a regular light-sensitive material RX-U of a wet development system manufactured by Fuji Photo Co., Ltd., was exposed under the same conditions by use of two sheets of X-ray regular screen HI-SCREEN B3 (light-emission peak wavelength: 425 nm; CaWO$_4$ being used as a phosphor) (manufactured by Fuji Photo Film Co., Ltd.), and subjected to the processing for 45 seconds in a processing solution CE-D1 by means of an automatic development processing apparatus CEPROS-M2 manufactured by Fuji Photo Co., Ltd.

The photographic characteristics of the images obtained with the photothermographic materials of this embodiment and the images obtained with the wet development system were compared with each other. As a result, both the images exhibited the same favorable performances.

This application is based on Japanese Patent application JP 2003-311546, filed Sep. 3, 2003, and Japanese Patent application JP 2004-196850, filed Jul. 2, 2004, the entire contents of which are hereby incorporated by reference, the same as if set forth at length.

What is claimed is:

1. A heat development apparatus for heat developing a heat-developable recording material from one surface side by a heating unit, while transporting the heat-developable recording material by a transportation unit, the apparatus comprising:

a transportation path from a beginning end to a terminal end of a heating region in which the heat developing is made by the heating unit, the transportation path being formed in an annular path having a substantially equal length with a transportation length of the heat-developable recording material, so that the beginning end and the terminal end of the heating region are arranged in proximity with each other, and further comprising, at the terminal end of the heating region, an inversion processing mechanism for inverting the heat-developable recording material transported by the transportation unit, and returning it to the beginning end of the heating region; and a transportation route switching unit for selectively switching a route of the heat-developable recording material transported by the transportation unit to a side of the inversion processing mechanism or a discharge-side transportation route.

2. The heat development apparatus according to claim 1, wherein the discharge-side transportation route connected to the terminal end of the heating region is equipped with a cooling unit communicating to the terminal end through an area nearer to the beginning end than to the terminal end, and longitudinally mounted in a rear of the annular transportation path, thereby for cooling the heat-developable recording material after the heat developing.

3. The heat development apparatus according to claim 1, which further comprises a case having at least two functions of: accommodating the heat-developable recording material before the heat developing; and temporarily storing the heat-developable recording material to be inverted by the inversion processing mechanism.

4. The heat development apparatus according to claim 1, wherein the transportation unit is configured to be speed-adjustable, and the heating unit is configured to be output-adjustable.

5. A heat development method for heat developing a heat-developable recording material containing recording layers on its opposite sides, using the heat development apparatus according to claim 1, the method comprising:

heat developing the heat-developable recording material on its one side by the heating unit inverting the heat-developable recording material heat developed on its one side with the inversion processing mechanism;

returning the inverted heat-developable recording material to the beginning end of the heating region; and heat developing the returned heat-developable recording material on its other side, and discharging it, by operations of the heating unit and the transportation unit.

6. The heat development method according to claim 5, wherein the heat developing of the other side of the heat-developable recording material, to which the heat developing on its one side is made, is carried out by increasing transportation speed by the transportation unit higher than with the heat developing of the one side, or reducing a heating amount by the heating unit smaller than with the heat developing of the one side.

7. The heat development method according to claim 5, wherein the heat developing is repeatedly carried out by allowing the heat-developable recording material to pass through the heating region plural times.

8. A heat development apparatus for heat developing a heat-developable recording material from one surface side by a heating unit, while transporting the heat-developable recording material by a transportation unit, the apparatus comprising:

a transportation path from a beginning end to a terminal end of a heating region in which the heat developing is made by the heating unit, the transportation path being formed in an annular path having a substantially equal length with a transportation length of the heat-developable recording material, so that the beginning end and the terminal end of the heating region are arranged in proximity with each other, and wherein the heating region covers $5/6$ or more of the annular path.

9. The heat development apparatus according to claim 8, further comprising, at the terminal end of the heating region, an inversion processing mechanism for inverting the heat-developable recording material transported by the transportation unit, and returning it to the beginning end of the heating region; and a transportation route switching unit for selectively switching a route of the heat-developable recording material transported by the transportation unit to a side of the inversion processing mechanism or a discharge-side transportation route.

10. The heat development apparatus according to claim 9, wherein the discharge-side transportation route connected to the terminal end of the heating region is equipped with a cooling unit communicating to the terminal end through an area nearer to the beginning end than to the terminal end, and longitudinally mounted in a rear of the annular transportation path, thereby for cooling the heat-developable recording material after the heat developing.

11. The heat development apparatus according to claim 9, which further comprises a case having at least two functions of: accommodating the heat-developable recording material before the heat developing; and temporarily storing the heat-developable recording material to be inverted by the inversion processing mechanism.

12. The heat development apparatus according to claim 8, wherein the transportation unit is configured to be speed-adjustable, and the heating unit is configured to be output-adjustable.

13. A heat development method for heat developing a heat-developable recording material containing recording layers on its opposite sides, using the heat development apparatus according to claim 9, the method comprising:

heat developing the heat-developable recording material on its one side by the heating unit inverting the heat-developable recording material heat developed on its one side with the inversion processing mechanism;

returning the inverted heat-developable recording material to the beginning end of the heating region; and heat developing the returned heat-developable recording material on its other side, and discharging it, by operations of the heating unit and the transportation unit.

14. The heat development method according to claim 13, wherein the heat developing of the other side of the heat-developable recording material, to which the heat developing on its one side is made, is carried out by increasing transportation speed by the transportation unit higher than with the heat developing of the one side, or reducing a heating amount by the heating unit smaller than with the heat developing of the one side.

15. The heat development method according to claim 13, wherein the heat developing is repeatedly carried out by allowing the heat-developable recording material to pass through the heating region plural times.

* * * * *